(12) United States Patent
Mogil

(10) Patent No.: US 8,459,058 B2
(45) Date of Patent: Jun. 11, 2013

(54) CONTAINER WITH COVER AND CLOSURE MEMBER

(75) Inventor: Melvin S. Mogil, Toronto (CA)

(73) Assignee: California Innovations Inc., Toronto (CA)

( * ) Notice: Subject to any disclaimer, the term of this patent is extended or adjusted under 35 U.S.C. 154(b) by 0 days.

(21) Appl. No.: 12/956,861

(22) Filed: Nov. 30, 2010

(65) Prior Publication Data

US 2011/0127274 A1    Jun. 2, 2011

Related U.S. Application Data

(63) Continuation of application No. 10/954,419, filed on Oct. 1, 2004, now Pat. No. 7,841,207, which is a continuation-in-part of application No. 10/674,795, filed on Oct. 1, 2003, now Pat. No. 7,162,890.

(51) Int. Cl.
*F25D 3/08*    (2006.01)

(52) U.S. Cl.
USPC .................................................. 62/457.7

(58) Field of Classification Search
USPC ................ 62/457.1, 457.4, 457.5, 457.7
See application file for complete search history.

(56) References Cited

U.S. PATENT DOCUMENTS 5,501,338 A * 3/1996 Preston .......................... 206/545

* cited by examiner

*Primary Examiner* — Melvin Jones
(74) *Attorney, Agent, or Firm* — Bereskin & Parr LLP/S.E.N.C.R.L., s.r.l.; Kenneth L. Bousfield; Isis Caulder

(57) ABSTRACT

A soft sided insulated container assembly includes a first portion having an insulated, soft sided external wall structure, and an internal, substantially rigid molded plastic receptacle mounted therein. It has a cover structure that includes a reinforcement member for engaging a land region of the molded receptacle, thereby tending to yield an interface tending to have a sealing relationship. The container may also include a thermal storage element, and the container may have an accommodation for receiving the thermal storage element.

14 Claims, 74 Drawing Sheets

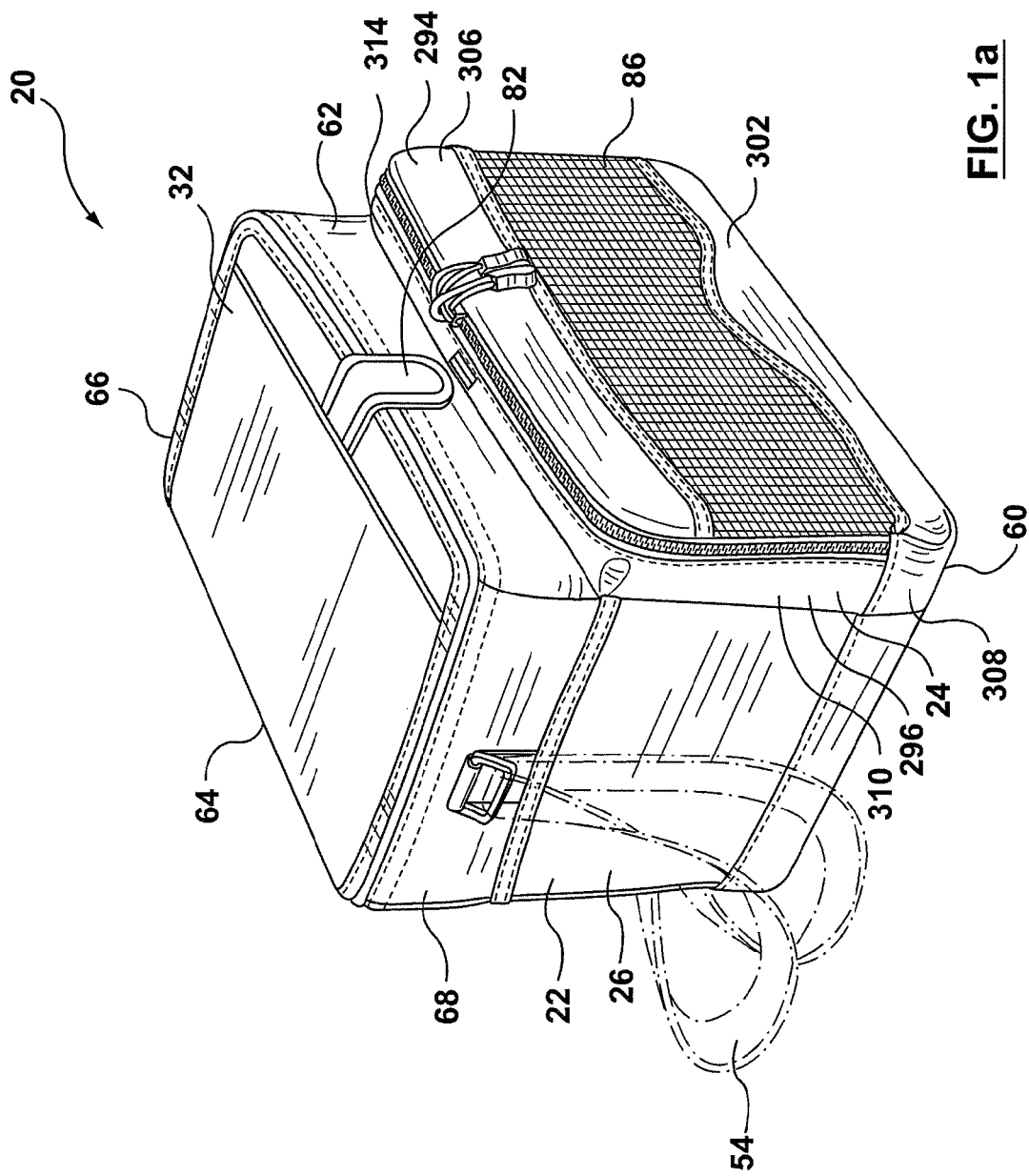

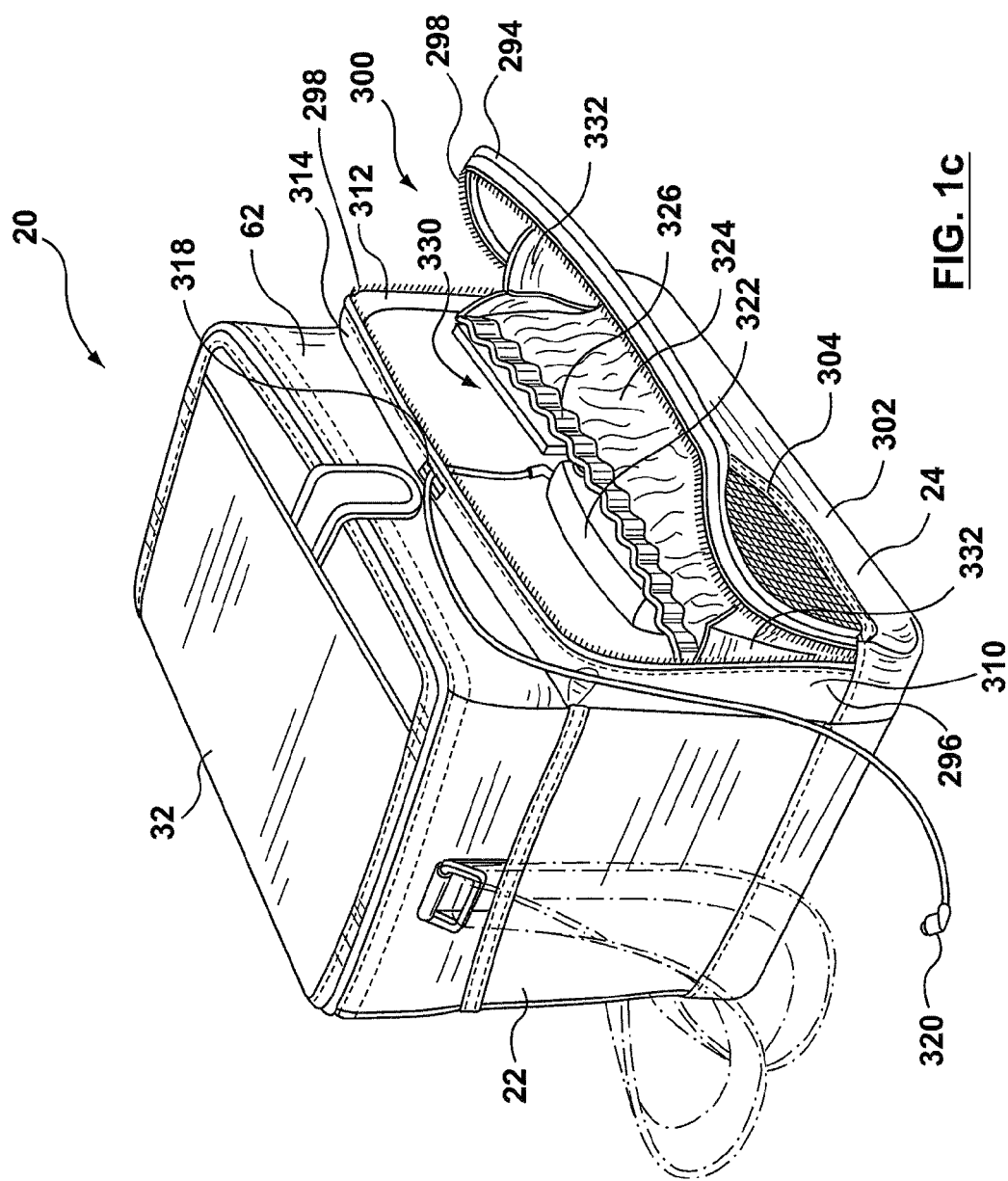

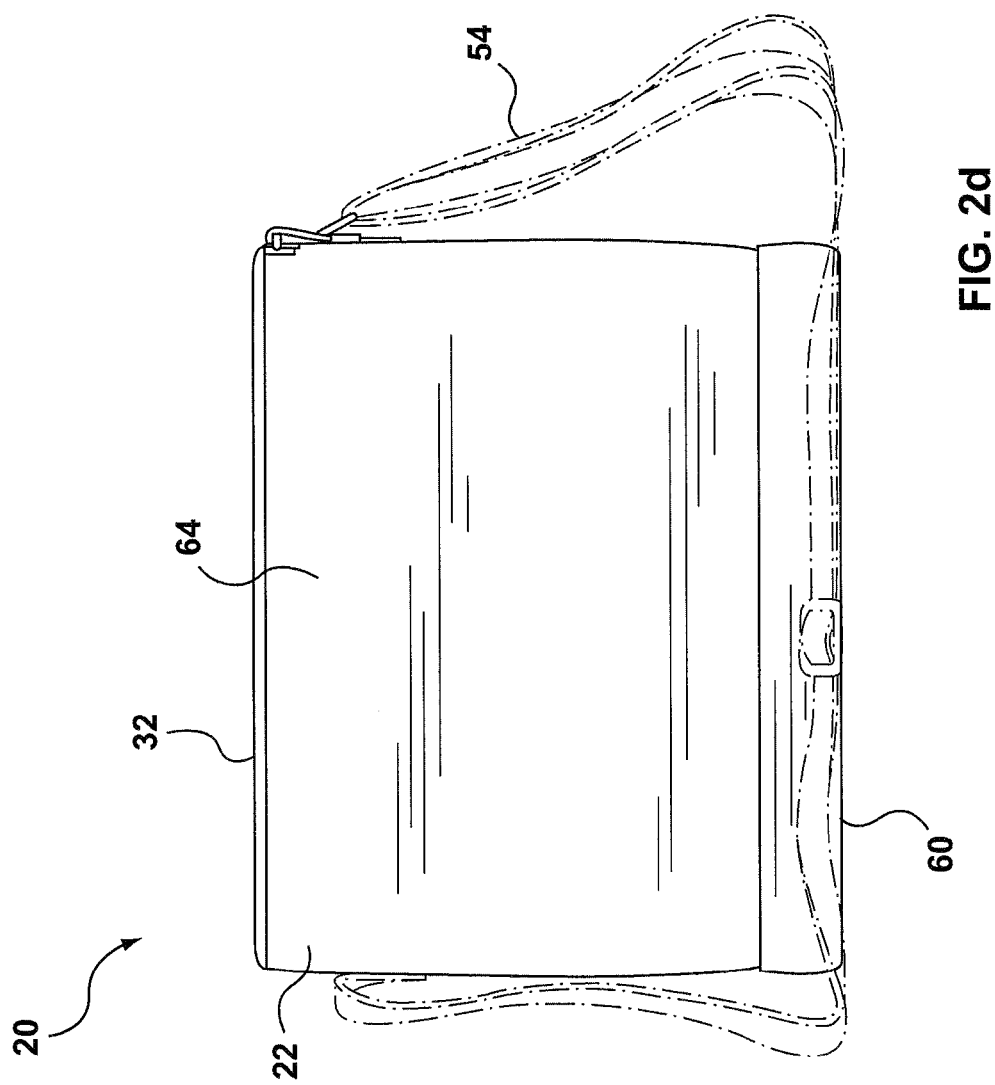

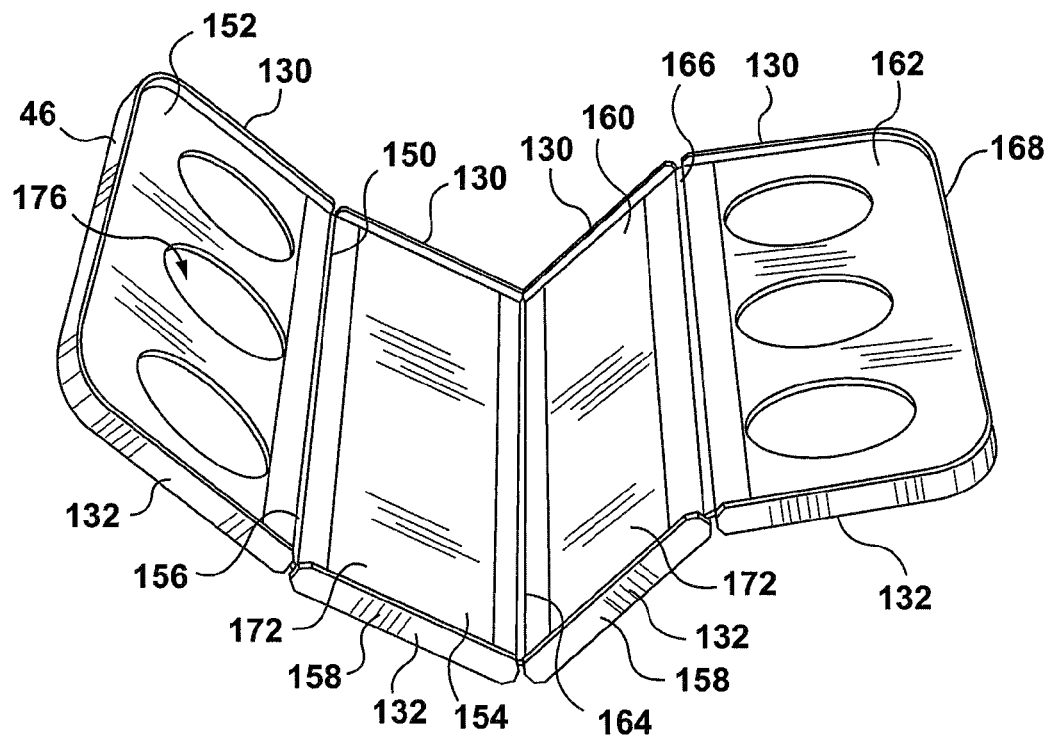
FIG. 2j
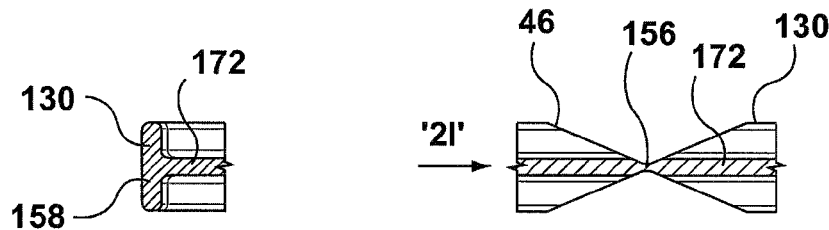
FIG. 2l                    FIG. 2k

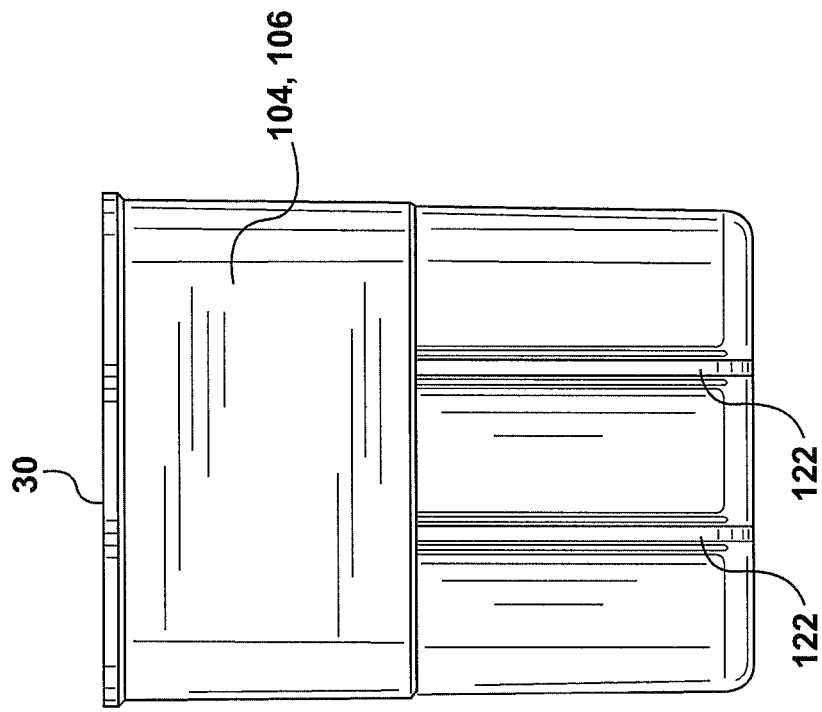
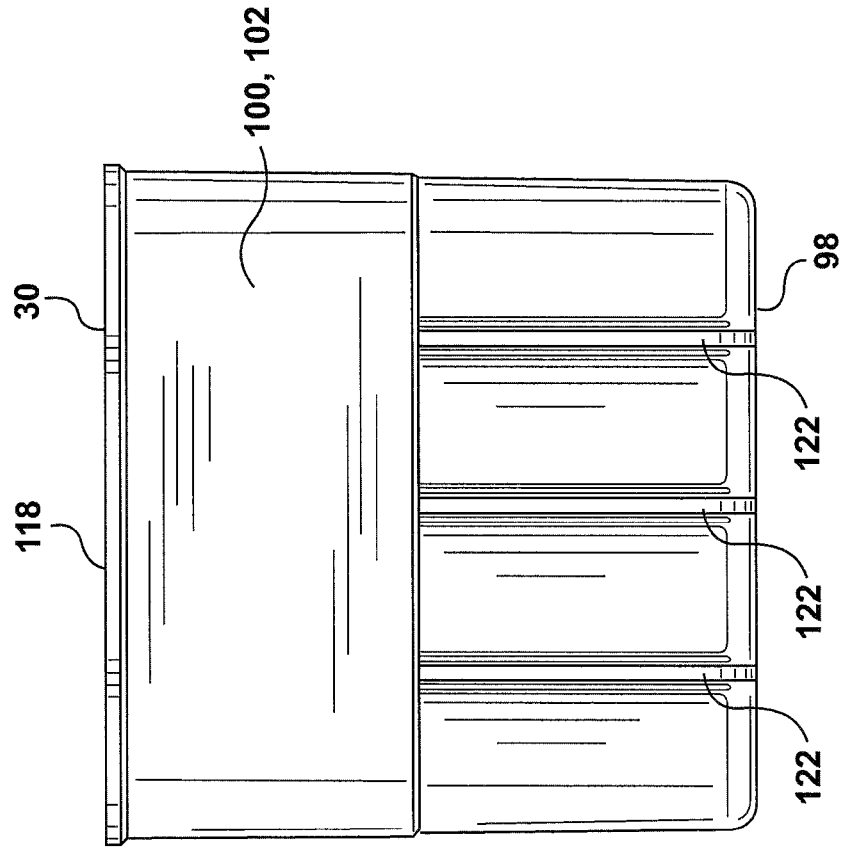

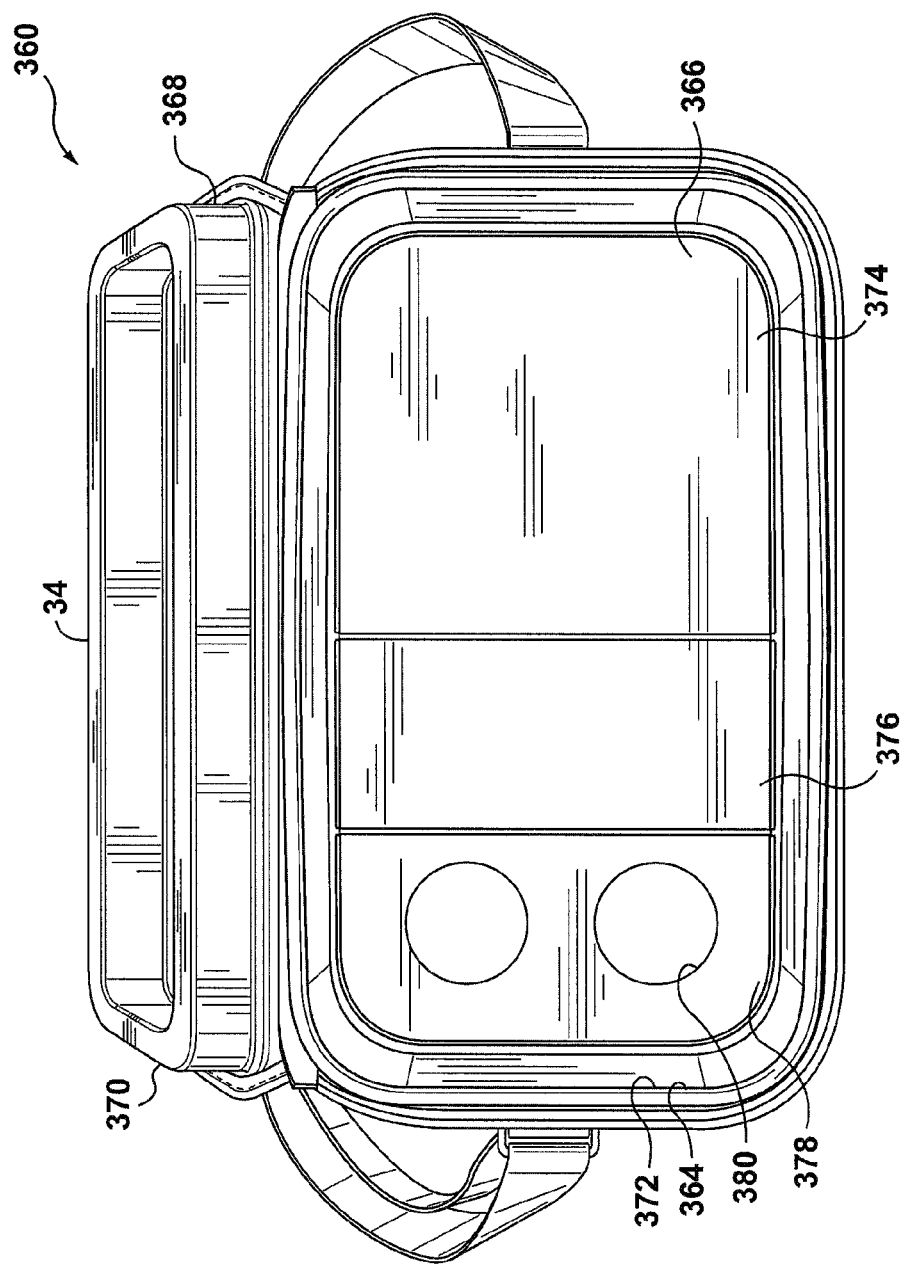

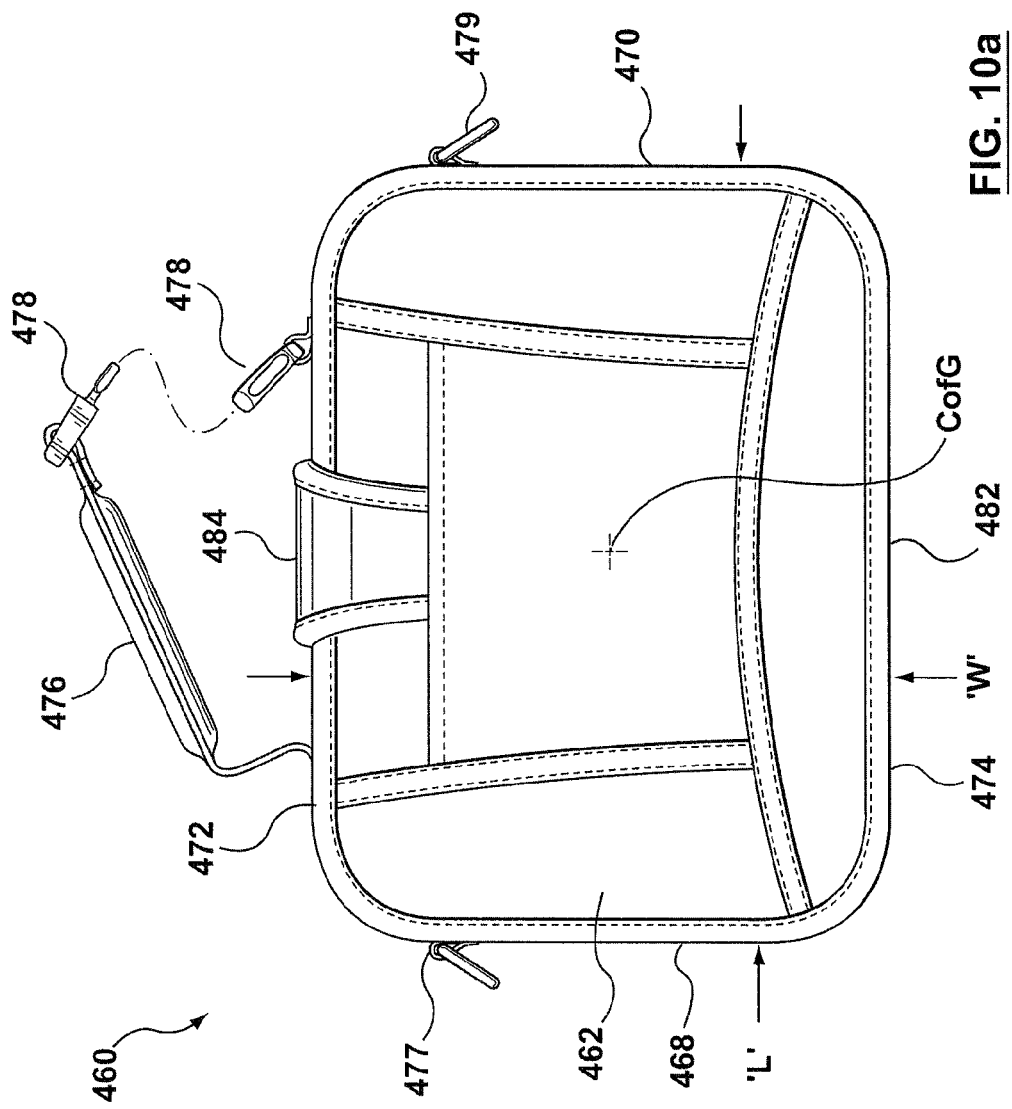

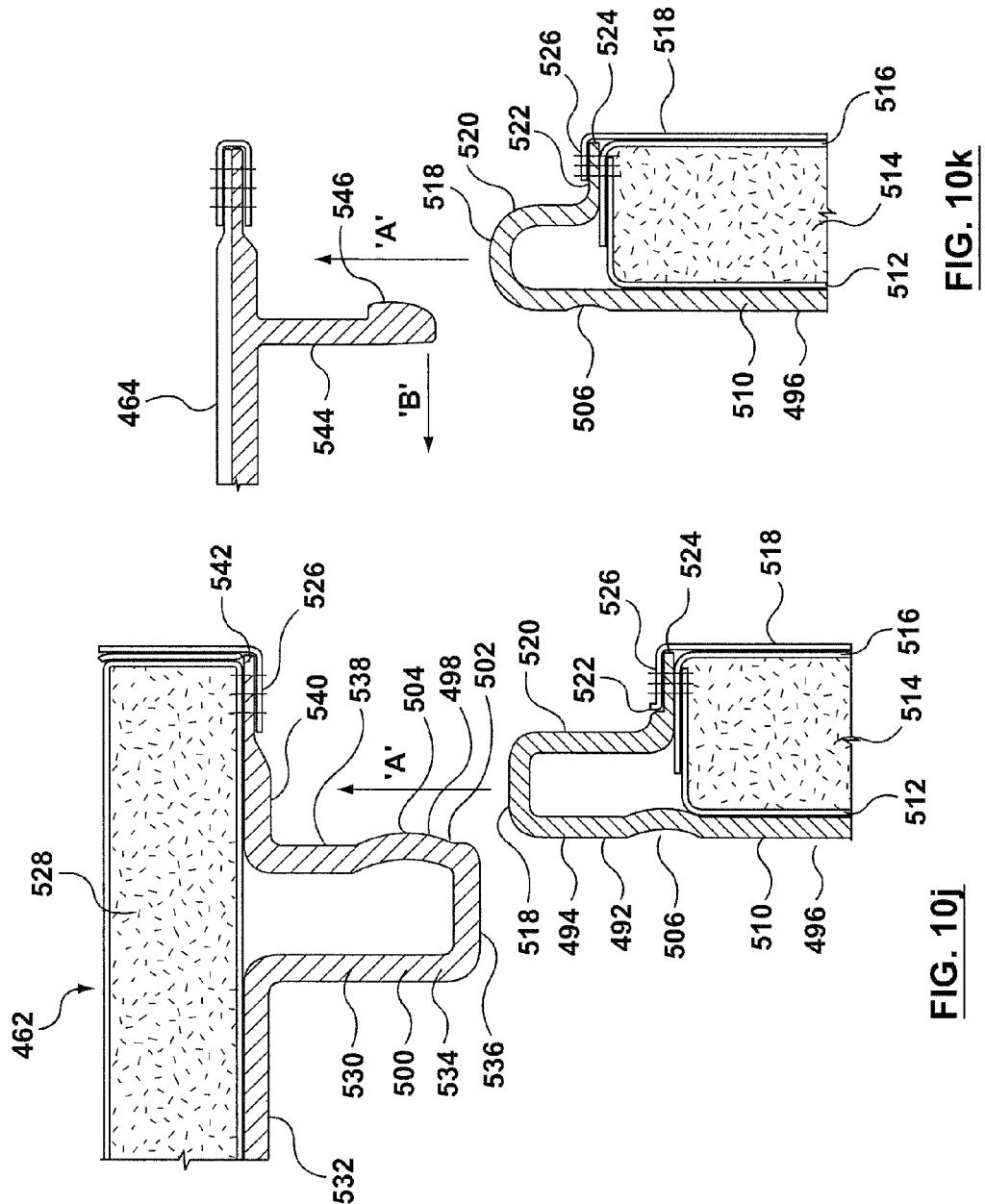

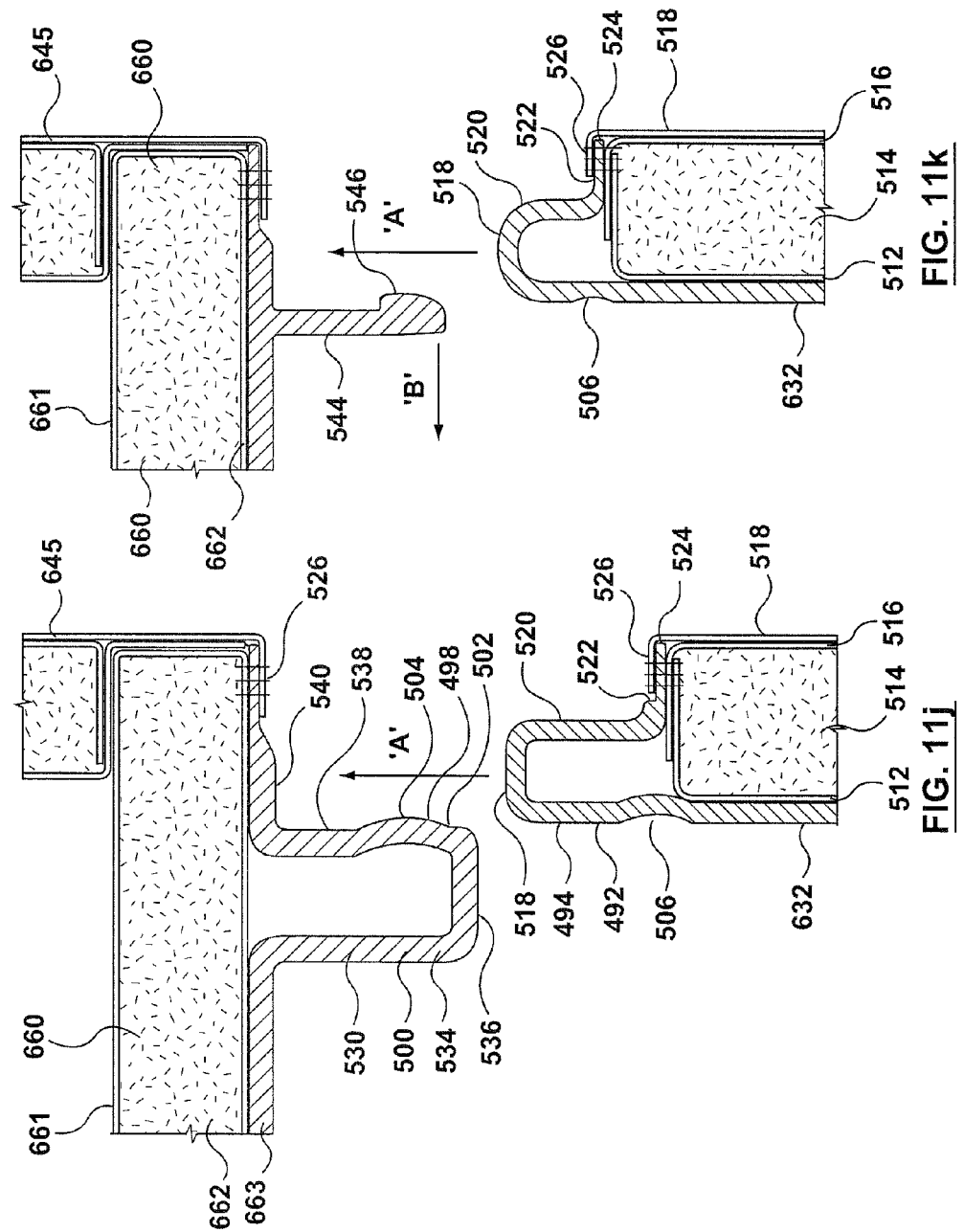

CONTAINER WITH COVER AND CLOSURE MEMBER

This application is a continuation of, and claims the benefit under 35 USC 120 of the priority of, U.S. patent application Ser. No. 10/954,419 filed Oct. 1, 2004, issued as U.S. Pat. No. 7,841,207, on Nov. 30, 2010 which application was itself a continuation in part of U.S. patent application Ser. No. 10/674,795 filed Oct. 1, 2003, issued as U.S. Pat. No. 7,162,890 the specification and claims of those applications being incorporated herein by reference.

FIELD OF THE INVENTION

This invention relates to the field of portable insulated containers.

BACKGROUND OF THE INVENTION

Soft sided insulated containers have become popular for carrying either articles that may best be served cool, such as beverages or salads, or warm, such as appetizers, hot dogs, and so on. Such containers are frequently used to carry liquids, whether hot liquids, such as soup containers, coffee or tea, or cold liquids such as beer, soft drinks, or other carbonated beverages, juices and milk. The containers are typically made in a generally cube-like or rectangular parallelepiped shape, whether of sides of equal length or not, having a base, four upstanding walls, and a top. The top is generally a lid which opens to permit articles to be placed in, or retrieved from, the container.

While soft sided containers are, in general, quite convenient, the flexible structure may not provide adequate protection for items stored within the container. For example, sandwiches or other non-durable items may become crushed or squished when the container is carried or otherwise transported. It may be desirable that other objects that may be carried in a cooler, such as, for example, egg sandwiches or cucumber sandwiches, or items of a similar nature for a picnic, be kept cool before being eaten. Alternatively, if one has warmed canapes or hors d'oeuvres, it may be desirable that those appetizers be kept warm until served. However, such items as sandwiches or pastries may tend not to be overly amenable to immersion in water, and, even if placed in a supposedly waterproof bag or plastic container may tend to become damp or clammy. Further, sandwiches or appetizers tend not to be particularly resilient, and once squashed may tend not to return to their former state.

To alleviate this problem, a rigid insert such as a plastic receptacle, which may conform to the interior walls of the soft sided container, may be used to impart structural rigidity to the soft side container. As a result of this increased rigidity, items placed within the rigid insert may be less apt to be affected by bumps or other forces applied to the soft sided container.

While items placed within the rigid insert may be provided with a measure of protection from external forces, they may be adversely affected by other items located within the rigid insert. For example, more durable items such as bottles and cans, may come into contact with less durable items such as sandwiches and buns when the items are jostled during transport of the container. This could cause the less durable items to become damaged.

The contents of items such as soft drink or beer bottles, may also be affected. As the container is moved, any item contained therein may move, and contact a side of the rigid receptacle, or contact other items located within the container. This movement may lead to damage or breakage of the items themselves. Movement may also cause the contents of durable items such as soft drink and beer bottles to become agitated, causing the contents of such items to be expressed in an undesirable spray when opened.

Another possible disadvantage of such soft sided containers is that contained items may tip or fall from a preferred orientation when the container is moved. For example, a cork partially inserted into the spout of a previously opened wine bottle may become dislodged if the bottle is knocked from a generally vertical orientation to a generally horizontal orientation. As a result, the contained wine may be released within the rigid insert, contaminating both the insert and any other items located therein.

For all of these reasons, in addition to providing a stiff reinforcement to protect contents from damage due to external causes, it may also be desirable to have an internal bracing or reinforcement member to aid in the protection of the various objects to be protected from each other.

Further still, in soft sided coolers heretofore, the closure of the lid has tended to depend on the closing of a zipper, often a zipper running around three sides of a rectangle, with the fourth side being hinged. The lid may rest on a foam lip or bad. When a container of this nature falls over, its resistance to the spilling of liquid through the closure may not be as effective as might be desired. It might be advantageous to have a somewhat tighter seal, such as might be made by stiffer materials in an interference fit. A soft-sided panel would not normally be sufficiently stiff to achieve such a seal. The use of a seal in this nature might also permit the elimination of the main peripheral zipper of the main closure of the container.

Further, it may be advantageous to provide a mounting for a thermal storage device, such as an ice pack or an exothermic package, that could be carried in the container. It would be advantageous for the thermal storage element to be removable, to permit it to be re-frozen in the freezer or refrigerator, or reheated, or recharged, as the case may be. Alternatively, it may be desirable to be able to choose between a number of various positions for the thermal storage element, depending on what might be carried in the insulated container. That is, in some cases it might be desirable to have the thermal storage element below objects in the insulated, sometimes above, and sometimes in the middle. Further still, it might be advantageous to be able to remove the thermal storage element from the insulated container entirely, and to use it as a flat surface upon which to serve or eat objects taken out of the container. This role might be advantageously enhanced by forming a recess, or recesses in the thermal storage element such as might be used as drink holders, or retainers for drinks or other objects, to prevent them from sliding in the event the surface is not precisely level (as may be the case on a picnic, or in a vehicle, or from spilling if jostled slightly, in the event the vehicle is moving). Further still, it may be advantageous to permit the thermal storage element to be held in the lids of the container when the container is open, to serve either of the above mentioned roles.

SUMMARY OF THE INVENTION

In an aspect of the invention there is an insulated container assembly. The insulated container assembly has a first portion and a second portion co-operable therewith. The first portion has a soft-sided insulated wall structure and a receptacle therein. The receptacle has an opening, and the opening has a land adjacent thereto. The second portion is movably connected to the first portion. The second portion includes a closure member operable to control access to the receptacle.

The closure member includes a stiffened member operable to engage the land in an interference fit.

In another feature of that aspect of the invention, the land and the stiffened member are co-operable to form a seal. In yet another feature, the stiffened member includes a bead and the bead is engageable with the land. In still another feature, the stiffened member is a surround. The receptacle is made of a stiffer material than the soft sided wall structure, and the land is a region of the receptacle extending about the opening. In still yet another feature, when the surround engages the land, hoop stresses are developed in at least one of (a) the land; and (b) the surround. In a further feature, when the surround engages the land, a compressive hoop stress is generated in one of (a) the land; and (b) the surround, and tensile hoop stresses are generated in the other.

In another feature, the insulated container assembly includes a removable thermal storage element. In yet another feature, the thermal storage element is matingly engageable with the second portion. In still another feature, the thermal storage element is matingly engageable with the stiffened member of the second portion of the insulated container assembly. In still yet another feature, the thermal storage element is alternately locatable in the second portion of the container assembly and in the first portion of the container assembly. In a further feature, when the closure member is in an open position, and the thermal storage member is engaged in the second portion, the thermal storage member presents a support surface for objects withdrawn from the first portion of the container assembly. In still a further feature, the thermal storage member includes a flat surface, and the thermal storage member is movable to permit the flat surface to act as a support surface for objects removed from the first portion of the container assembly.

In yet a further feature, the thermal storage member includes at least one recess formed therein. In still yet a further feature, the thermal storage container has at least one cup-holder recess formed therein. In another feature, the thermal storage container has an internal cavity for containing a thermal storage medium, and the cavity is refillable. In yet another feature, the insulated container assembly has a mechanical attachment element operable to secure the second portion in a closed position relative to the first portion. In still another feature, the insulated container assembly has a grip member by which to urge the stiffened member to a disengaged position relative to the land. In another feature, the land and the stiffened member define an engagement interface of the second portion of the container assembly with the first portion of the container assembly, and the interface is zipperless.

In another aspect of the invention there is an insulated, soft-sided container assembly. The container has a body assembly and a lid assembly hingedly joined to the body assembly. The body assembly includes a soft-sided outer casing and an internal hard-shell receptacle. Inc receptacle has a mouth. The lid includes a formed structural member having a periphery for mating engagement with the mouth of the receptacle. The structural member is engageable in an interference fit with the mouth of the receptacle.

In another feature of that aspect of the invention, the structural member has a deformable bead mounted thereto for contacting the receptacle. In still another feature, the receptacle includes a receptacle wall region extending peripherally to define the mouth, and when matingly engaged, the structural member is biased toward the peripherally extending wall region of the receptacle. In yet another feature, the insulated container assembly has a removable thermal storage element. The thermal storage element and the structural member of the lid are releasably engageable. In still yet another feature, the thermal storage element is variably positionable within the container assembly. In a further feature, the thermal storage element is variably positionable within a set of positions in the container assembly. The set of positions includes at least a first position releasably engaged with the structural member, and a second position seated in the receptacle.

In still a further feature, the receptacle has a bottom wall and the thermal storage element is positionable in a set of positions within the container assembly. The set of positions includes a first position releasably engaged with the structural member, a second position nested above the bottom wall and a third position intermediate the first and second positions. In another feature, the insulated container assembly has a shelf positionable within the receptacle. In still another feature, the thermal storage element is placeable within the receptacle upon the shelf. In yet another feature, the lid has an outwardly facing surface, and the outwardly facing surface has at least one rebate formed therein for inhibiting movement of objects placed on the lid within the rebates.

In another aspect of the invention there is an insulated soft-sided container assembly. The container assembly has a soft sided insulted wall structure including a base panel, an upstanding sidewall, and a lid. The lid is hingedly mounted to the upstanding sidewall. A receptacle is mounted within the soft sided wall structure. The receptacle is made from a stiffer material than the soft-sided wall structure. The receptacle has a mouth. The lid has a stop for the mouth. The stop is made from a stiffer material than the soft-sided wall structure. The lid is movable between an open position and a closed position to control access to the receptacle. When the lid is in the closed position, the stop is engaged with the mouth in an interference fit.

In another feature of that aspect of the invention, the stop includes a moulded surround member having a peripherally outwardly facing surface. The surface has a contact region, and the surround member is resiliently displaceable on engagement with the receptacle. In another feature, the surround includes an inwardly facing peripheral surface, and a releasably engageable thermal storage element is mounted inwardly of the inwardly facing peripheral surface.

In another aspect of the invention there is the combination of a thermal storage element and a thermal storage element retention fitting for an insulated container. The container has at least one substantially planar panel, wherein the thermal storage element has a hollow body for containing a thermal storage medium liquid, a port by which to introduce the thermal storage medium liquid into the hollow body, a removable closure member operable to control access to the hollow body, and at least one engagement fitting operable releasably to mate the thermal storage element with the thermal storage retention apparatus. The thermal storage retention apparatus is mounted to form at least a portion of the substantially planar panel.

BRIEF DESCRIPTION OF THE DRAWINGS

These aspects and other features of the invention can be understood with the aid of the following illustrations of a number of exemplary, and non-limiting, embodiments of the principles of the invention in which:

FIG. 1a shows an isometric view taken from in front, above, and to the left, of an embodiment of a container assembly in a closed position;

FIG. 1c shows the container assembly of FIG. 1a with an auxiliary portion thereof in an open position;

FIG. 2a shows a front view of the container assembly of FIG. 1a;

FIG. 2b shows a left hand side view of the container assembly of FIG. 1a;

FIG. 2c shows a right hand side view of the container assembly of FIG. 1a; FIG. 2d shows a rear view of the container assembly of FIG. 1a;

FIG. 2e shows a top view of the container assembly of FIG. 1a;

FIG. 2f shows a bottom view of the container assembly of FIG. 1a;

FIG. 2g shows a partial sectional view of the structure of the container assembly of FIG. 1a;

FIG. 2h shows an alternate multi-position dividing partition for container assemblies similar to the container of FIG. 1a;

FIG. 2i shows an alternate three-panel, two fold, multi-partition dividing partition for the container assembly of FIG. 1a;

FIG. 2j is a perspective view of the multi-position dividing partition of FIG. 1b;

FIG. 2k is a hinge detail of the dividing partition of FIG. 2j;

FIG. 2l is a cross-sectional detail taken on arrow '2l' of FIG. 2k;

FIG. 3b shows an opposite isometric of the receptacle of FIG. 3a;

FIG. 3c shows a side elevation of the receptacle of FIG. 3a;

FIG. 3d shows an end elevation of the receptacle of FIG. 3a;

FIG. 3e shows a top view of the receptacle of FIG. 3a;

FIG. 3f shows a bottom view of the receptacle of FIG. 3a;

FIG. 4a shows a top view of a lid structural member and thermal storage element subassembly of the container assembly of FIG. 1a;

FIG. 4b shows a view from above of the lid structural member of FIG. 4a;

FIG. 4f shows an alternate installation of thermal storage member in the receptacle of the container assembly of FIG. 1a;

FIG. 4g shows an alternate installation of thermal storage members in a lid structural member similar to FIG. 4a;

FIG. 5a is a diagonal perspective view from one corner of a thermal storage element as shown in FIG. 4a;

FIG. 5b is an opposite diagonal perspective view of the thermal storage member of FIG. 5a;

FIG. 5c is a top view of the thermal storage member of FIG. 5a;

FIG. 5d is a bottom view of the thermal storage member of FIG. 5a;

FIG. 5e is a filler end view of the thermal storage element of FIG. 5a;

FIG. 6a is a view of an alternate foam lid construction for the container assembly of FIG. 1a;

FIG. 6b is a top view of an alternate receptacle structure to that of FIG. 3a;

FIG. 7a shows a perspective view from above, in front, and to one corner of an alternate embodiment of container assembly to that of FIG. 1a;

FIG. 7d shows a top view of the container assembly of FIG. 7a;

FIG. 7e shows a front view of the container assembly of FIG. 7a;

FIG. 7f shows a left hand side view of the container assembly of FIG. 7a;

FIG. 7g shows a right hand side view of the container of FIG. 7a;

FIG. 7h shows a rear view of the container assembly of FIG. 7a;

FIG. 7i shows a bottom view of the container of FIG. 7a;

FIG. 8a is a top view of the container assembly of FIG. 7a in an open position;

FIG. 9a shows a perspective view from above, in front, and to one corner of a further alternate embodiment of container assembly to that of FIG. 1a;

FIG. 9c shows a front view of the container assembly of FIG. 9a;

FIG. 9d shows a left hand side view of the container assembly of FIG. 9a;

FIG. 9e shows a right hand side view of the container of FIG. 9a;

FIG. 9f shows a rear view of the container assembly of FIG. 9a;

FIG. 9g shows a bottom view of the container of FIG. 9a;

FIG. 9i is a scab cross-section of a sidewall portion of the container assembly of FIG. 9a;

FIG. 9j is a cross-section of a lid portion of the container assembly of FIG. 9a;

FIG. 10a shows a front view of further alternate embodiment of container assembly to that of FIG. 1a;

FIG. 10b shows a rear view of the container assembly of FIG. 10a;

FIG. 10c is a top, or first long sidewall view of the assembly of FIG. 10a;

FIG. 10d is a bottom or second long side view of the assembly of FIG. 10a;

FIG. 10e shows a left hand side view of the container assembly of FIG. 10a;

FIG. 10f shows a right hand side view of the container of FIG. 10a;

FIG. 10i is an alternate embodiment of the container assembly of FIG. 10a;

FIG. 10j is a section showing engaging closure members of the container assembly of FIG. 10a;

FIG. 10k shows a section of a alternate set of engaging closure members to that of FIG. 10j;

FIG. 11a shows an isometric view from above, in front, and to one side of an alternate container assembly to that of FIG. 1a;

FIG. 11b shows a front view of the container assembly of FIG. 11a;

FIG. 11c shows a rear view of the container assembly of FIG. 11a;

FIG. 11d shows a left hand side view of the container assembly of FIG. 11a;

FIG. 11e shows a right hand side view of the container of FIG. 11a;

FIG. 11f is a top view of the assembly of FIG. 11a;

FIG. 11g is a bottom view of the assembly of FIG. 11a;

FIG. 11j is a section showing engaging closure members of the container assembly of FIG. 11a;

FIG. 11k shows a section of a alternate set of engaging closure members to that of FIG. 11j;

FIG. 12a shows an isometric view from above, in front, and to one side of an alternate container assembly to that of FIG. 1a;

FIG. 12c shows a front view of the container assembly of FIG. 12a;

FIG. 12d shows a rear view of the container assembly of FIG. 12a;

FIG. 12e shows a left hand side view of the container assembly of FIG. 12a;

FIG. 12f shows a right hand side view of the container of FIG. 12a;

FIG. 12g is a top view of the assembly of FIG. 12a; and

DETAILED DESCRIPTION OF THE INVENTION

Figure 1B:
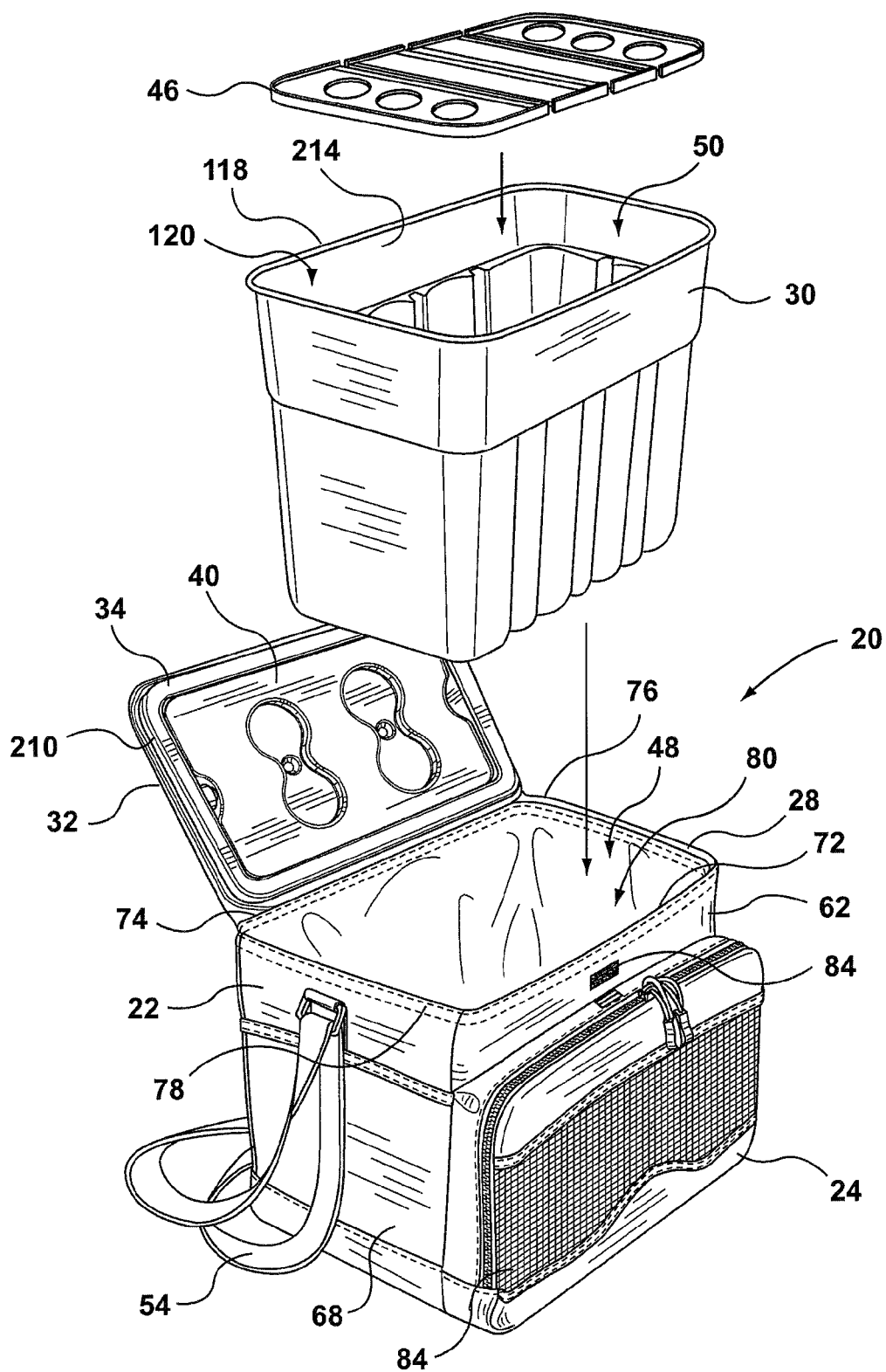
FIG. 1b shows the container assembly of FIG. 1a in an open, exploded position showing a soft-sided wall structure, a receptacle for seating in the sift-sided wall structure, and a multi-position dividing partition for seating in the receptacle.

The description that follows, and the embodiments described therein, are provided way of illustration of an example, or examples of particular embodiments of me principles of the present invention. These examples are provided for the purposes of explanation, and not of limitation, of those principles and of the invention. In the description, like parts are marked throughout the specification and the drawings with the same respective reference numerals. The drawings are not necessarily to scale and in some instances proportions may have been exaggerated in order to more clearly depict certain features of the invention.

In the description and drawings herein, reference may be made to a Cartesian co-ordinate system in which the vertical direction, or z-axis, extends in an up and down orientation from bottom to top. The x-axis extends in the shorter dimension of the container assembly, when fully expanded, running in the front-to-back direction. The y-axis extends cross-wise horizontally relative to the x-axis, running in the side-to-side direction. Unless noted otherwise, the terms "inside" and "outside", "inwardly" and "outwardly", refer to location or orientation relative to the enclosed spaces of the first and second portions of the container assembly, as may be.

Referring to FIGS. 1a and 1b, and by way of a general overview, a container assembly is indicated generally as 20. Container assembly 20 has a first, or main portion 22, that may include an optional auxiliary portion 24 mounted on the forward face thereof. Main portion 22 includes an outer casing 26 in the nature of a soft-sided, insulated wall structure 28, and a reinforcement member, or stiff wall structure, in the nature of a relatively rigid, resilient, molded plastic tub, indicated as receptacle 30, mounted within soft-sided insulated wall structure 28. Receptacle 30 is watertight, and is removable from within wall structure 28, and of container assembly 20 more generally, to facilitate washing thereof. When receptacle 30 is in place, container portion 22 is intended to be maintained in the shape shown in the Figures, and is not intended to be collapsible.

A second portion of container assembly 20 is indicated as a top panel, or lid 32, that has an internal structural member 34 for engagement with the upper portion of receptacle 30, thereby acting as a closure member to control access to the enclosed chamber 50 defined within receptacle 30. Internal structural member 34 has a peripherally extending seal member 210 for interferingly engaging the mouth of receptacle 30. Lid 32 as such may tend to deter the egress of materials, such as liquids, that might otherwise occur when container assembly 20 is inadvertently tipped over or jostled excessively energetically, internal structural member 34 also has a recess defined therein for receiving a removable and re-usable thermal storage member 40, such as may be employed to influence the environmental condition inside chamber 50, or alternatively, may be remove and employed as a chilled (or warmed) element upon which to rest foods, such as, for example, appetizers, or beverages. Lid 32 may also include such features as may permit lid 32 to provide a relatively stiff surface upon which to place objects, such as, for example, foods or beverages.

These assemblies of container assembly 20, are illustrated co-operatively in FIGS. 1*a* and 1*b*. They will now be described in greater detail.

First Portion 22

First insulated container portion 22 has an outer casing 26, an insert, namely receptacle 30, and a divider or partition 46. Outer casing 26 has a compartment 48 for receiving receptacle 30, and receptacle 30 has a chamber 50 which may be divided by placement of partition 46 therein. Partition 46 may be used to separate items placed within chamber 50. Items may also be retained by partition 46, as described in detail below. A closure member such as lid 32, attached to outer casing 26, may be used to enclose receptacle 30 within compartment 48. FIG. 1*a* shows container assembly 20 with lid 32 in a closed position. An optional carrying means such as strap 54 may be attached to outer casing 26 to facilitate transport of container assembly 20.

Outer Casing 26

Outer casing 26 is preferably made of an insulative material for thermally insulating receptacle 30. The insulative material inhibits heat transfer between chamber 50 and the surroundings of container assembly 20. This may tend to help to maintain a preferred temperature of items such as food products stored within receptacle 30. For example, if items such as bottles of liquid 58, which are stored within chamber 50, have a lower temperature than the container assembly's surroundings, then the insulative material may reduce the rate of heat transfer to bottles of liquid 58, keeping the soft drink or wine at a low temperature for a longer period than if it were not placed within container assembly 20. When lid 32 is in a closed position, heat transfer may be inhibited to a greater extent.

The insulative material may additionally be soft, such as resilient foam so that the container may tend not to damage, or be damaged by, objects with which it may come into contact. If a suitable plastic or other material or stain resistant surface coating or surface treatment is used, then outer casing 26 may also be readily cleaned to remove dirt and other debris acquired through use.

Outer casing 26 preferably has an insulated bottom panel 60, and insulated wall panels, namely a front panel 62, a rear panel 64, and a pair of right and left hand side panels 66 and 68. In the description of the embodiments of the claimed invention, the choice of front and rear, left and right, orientations is arbitrary. Each panel 60, 62, 64, 66 and 68 is preferably located at substantially right angles to two adjacent wall panels. For example, panel 64 is located adjacent panel 66 at one end, and adjacent panel 68 at an opposite end. The bottom panel may be attached to all four panels 62, 64, 66 and 68, along edges thereof. The combination of panels 62, 64, 66 and 68, and bottom panel 60, define compartment 48. Bottom panel 60 and panels 62, 64, 66 and 68, each are preferably rectangular, with respective opposite panels 62 and 64, and 66 and 68, being congruent to one another. In this preferred configuration, compartment 48 has a generally cube-like or rectangular parallelepiped shape. Panels 62, 64, 66 and 68, and bottom panel 60 may be fastened to one another by sewing, gluing or some other suitable fastening means. Alternatively, two or more panels (including the bottom panel) may be formed from a single piece of material having one or more folds therein to define the two or more panels. In the preferred embodiment, the front, bottom and rear panels may be made from a single piece of insulated material. Lid 32 and an adjacent wall may also be formed from a single piece of material. For example, rear panel 64 and lid 32 may be formed from a single piece of material having a fold therein to define rear panel 64 and lid 32. It may be noted that lid 32 may thusly be connected to the upper margin of rear panel 64 by a flexible fabric hinge.

In an alternative embodiment, outer casing 26 may have either less than four, or more than four, panels (not shown). For example, outer casing 26 may be configured to have one continuous panel defining a round wall, thereby forming a right cylinder, or some other generally rounded shape.

In one embodiment, connected panels 62, 64, 66 and 68 may each have an upper, or distal, edge 72, 74, 76 and 78, respectively, which in the case of edges 72, 76 and 78 is also a free edge, and edge 74 being a fabric hinge, the four edges co-operating to define container opening 80 through which receptacle 30 may be placed into compartment 48. Lid 32 is hingedly, or pivotally attached to rear panel edge 74. Rather than employing a zipper (or, optionally, in addition to a zipper, if a zipper is desired), internal structural member 34 engages the mouth of receptacle 30 in a relatively tight interference fit, thus effectively securing lid 32 to inhibit heat transfer to and from chamber 50. A strap, or flexible handle 82 is grasped to release the mating portions of a hook and eye fabric strip securement 84 (e.g., Velcro™) mounted to handle 82 and front panel 62 respectively, and to permit the interference fit seal of lid 32 inside receptacle 30 to be broken, and lid 32 moved pivotally about its rearward hinged edge between the closed, or sealed position, and an open, and unsealed, position.

Outer casing 26 may have shoulder strap 54 attached thereto, for example, at side panels 66 and 68. As noted above, outer casing 26 may also have an auxiliary portion or pouch 24. Pouch 24 may have a see-through mesh pocket 86, such as may be convenient for viewing the contents thereof, which may include knives, forks, spoons or other objects.

Figure 2A:
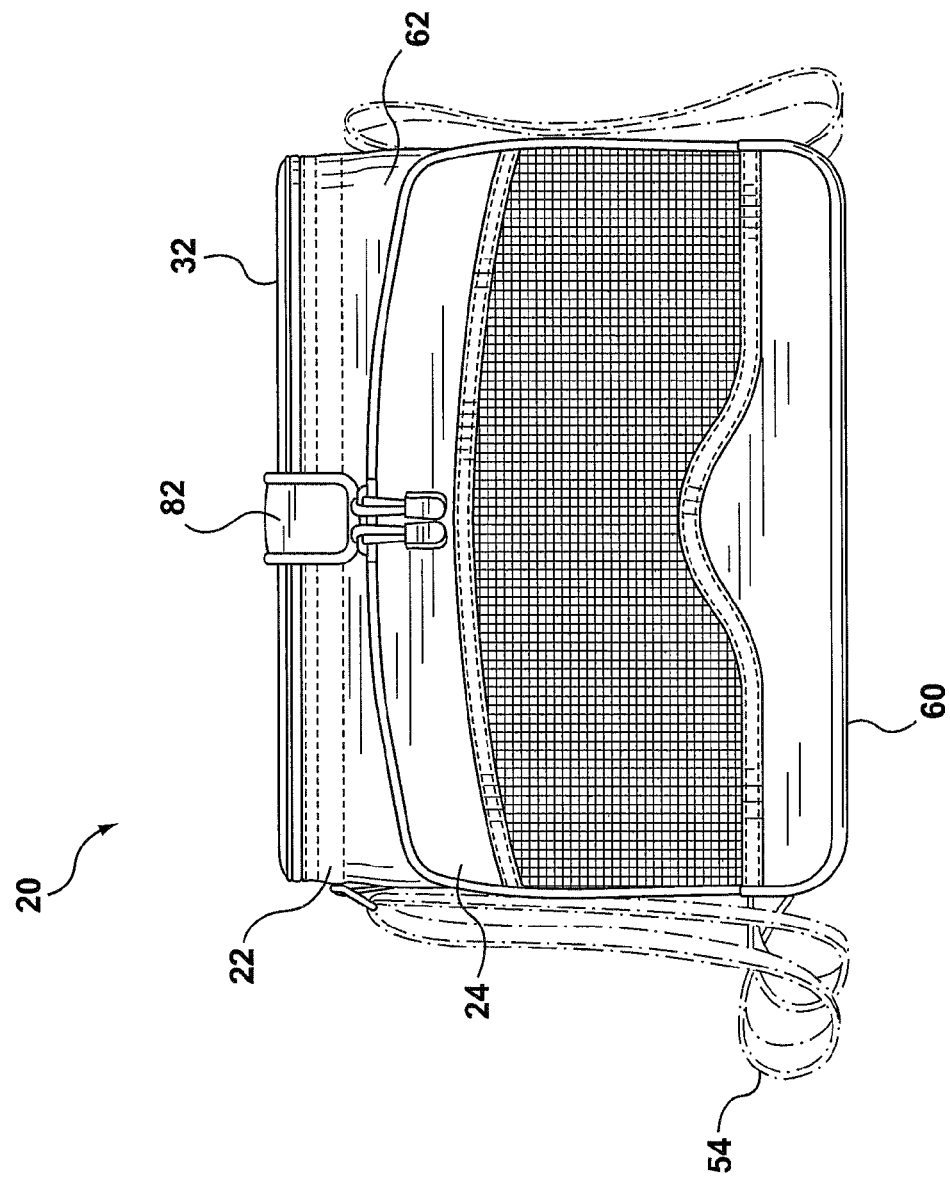
Figure 2B:
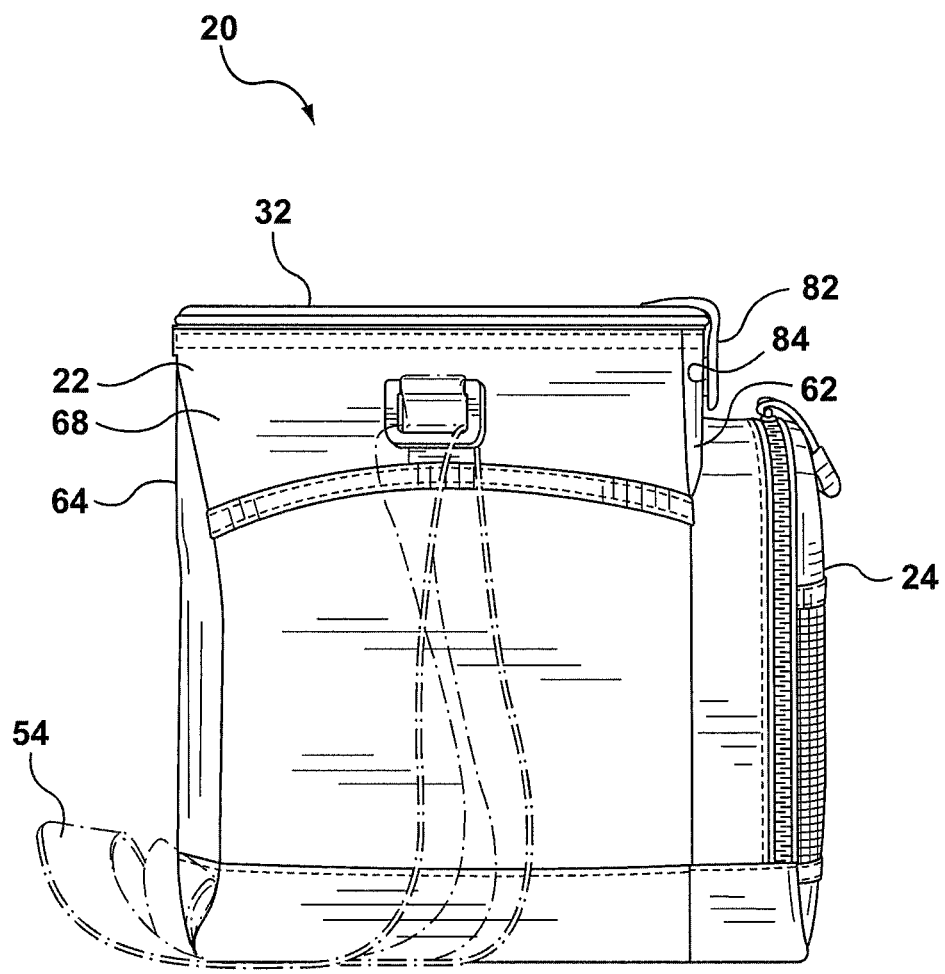
Figure 2C:
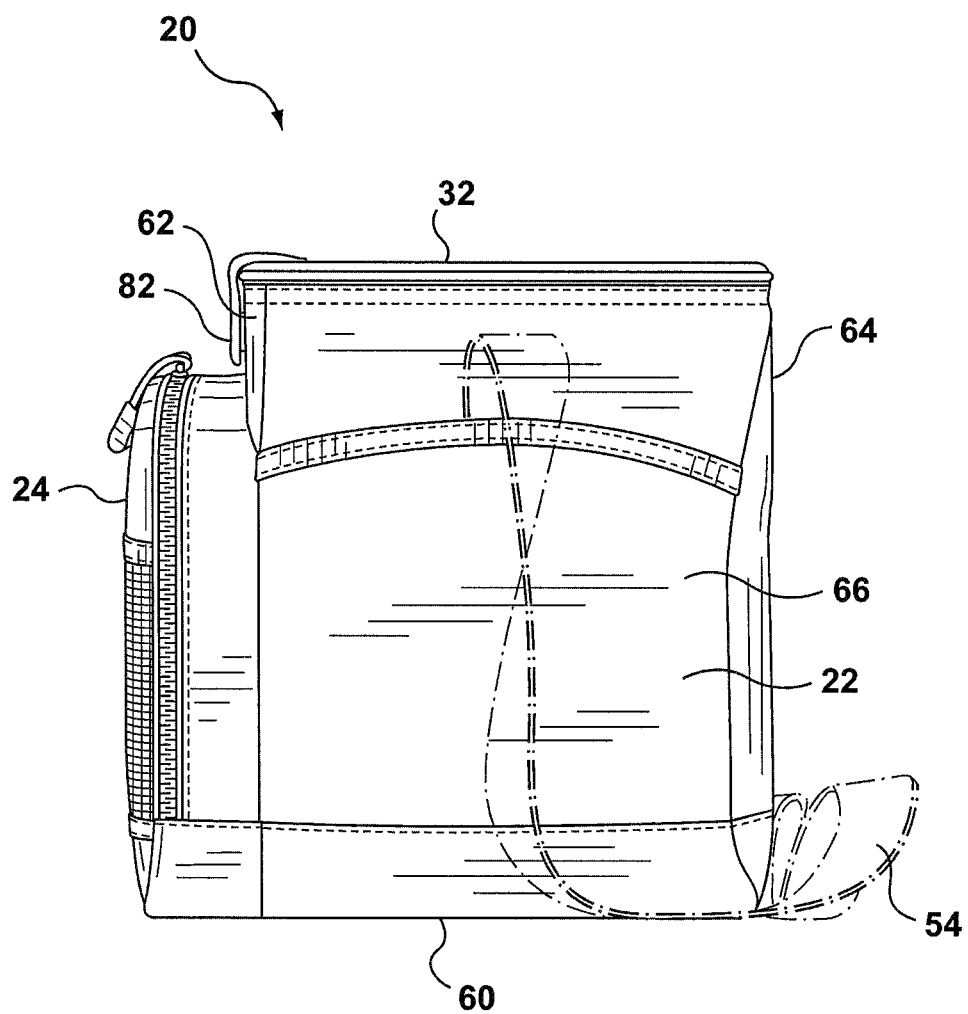
Figure 2E:
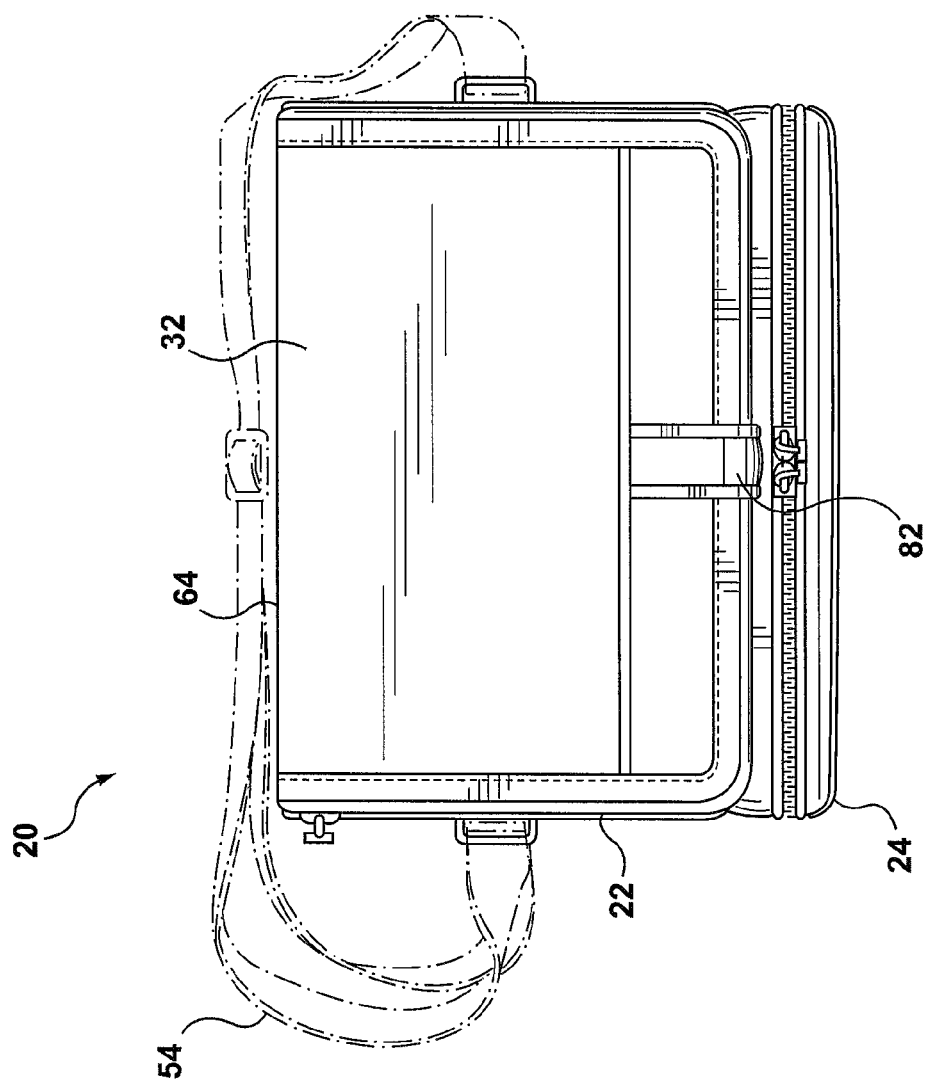
Figure 2F:
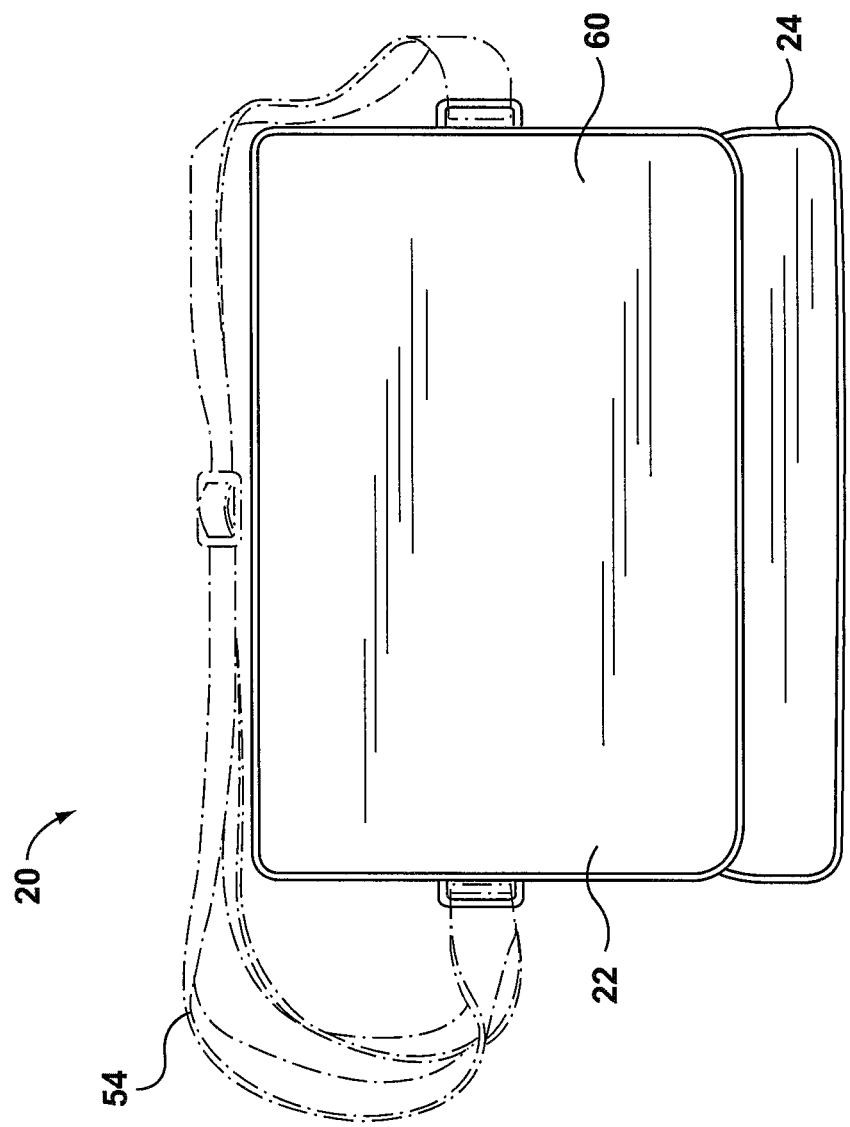
Figure 2H:
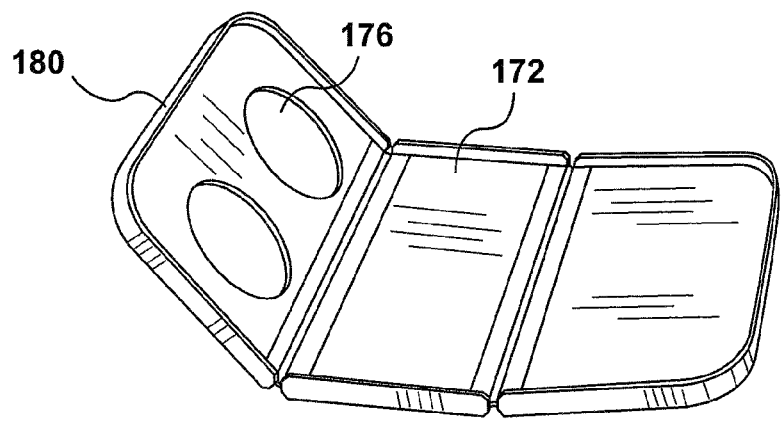
Figure 2G:
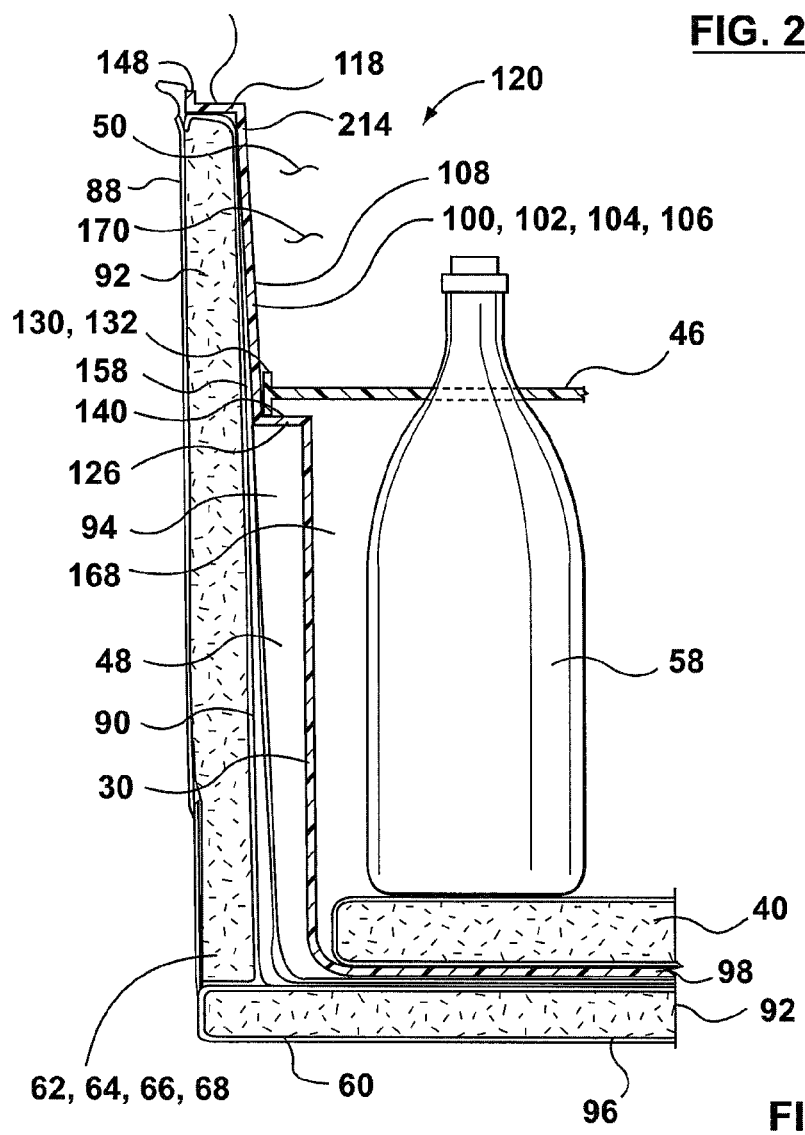

FIG. 2*g* shows the general structure of a cross-section of any of the insulated wall panels, such as left hand side wall panel 68 with receptacle 30 and partition 46 in place. A scab section of bottom panel 60 is also shown to reveal its layers of construction, as is a scab section of thermal storage member 40. With the exception of auxiliary pouch 24, this section is typical not only of front panel 62 but also, generally, of rear panel 64, side panels 66 and 68, bottom panel 60. The outer facing layer of the panel (be it 62, 64, 66 or 68) is an outer skin in the nature of a canvas covering layer 88 for resisting abrasion. It overlays an intermediate thermal insulation medium, such as may be in the nature of closed cell foam insulation layer 92 for impeding, which is to say discouraging, heat transfer between the interior of container assembly 20 and external ambient. The inner face of insulation layer 92 is covered by an inner skin in the nature of a flexible sheet 90, whether of Vinyl™ or of plasticised metallic foil sheeting that is shiny and reflective. The metallic foil sheeting material may be the type sold under the name Therma-Flect™ The inside of compartment 48 is lined with white vinyl sheeting on its forward and bottom sides.

This same general structural arrangement prevails in bottom panel 60, although outer covering layer 96 may be a rather thicker, scuff-resistant material than the outer skin of the upwardly extending side walls.

In the example illustrated in FIG. 2*g*, the bottle of liquid 58 rests upon thermal storage element 40, which, in this view being shown in one of its alternate positions, is seated, resting on the bottom of receptacle 30. The weight in receptacle 30 is then carried into bottom panel 60, and heat transfer from thermal storage element 40 is preferably biased (i.e., generally made easier by direct contact with item 40, rather than harder) toward the objects within receptacle 30, and generally impeded or resisted through panel 60.

Receptacle 30

As a preliminary matter, FIGS. 3g to 3n are perspective views, not orthogonal views, such that the foreshortening of the taper of the walls appears to be pronounced in an exaggerated, or somewhat disproportionate fashion. A top view, with partition 46 removed, and a bottom view, in FIGS. 3e and 3f, respectively, and a top view of an alternate embodiment, shown in FIG. 6b, provide a contrasting analogous orthogonal view.

Figure 3A:
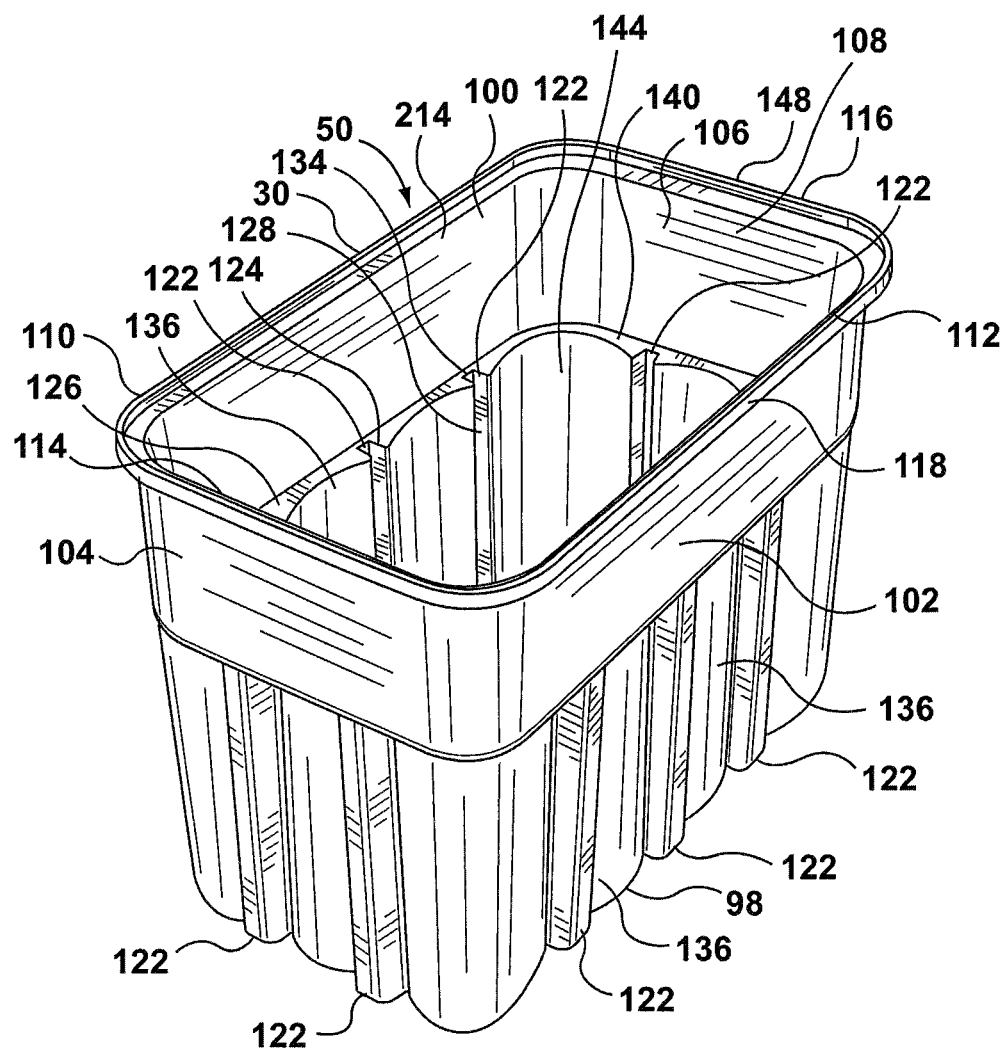
FIG. 3a shows an isometric view of a receptacle for use in the container assembly of FIG. 1a, taken from above one corner thereof.
Figure 3B:
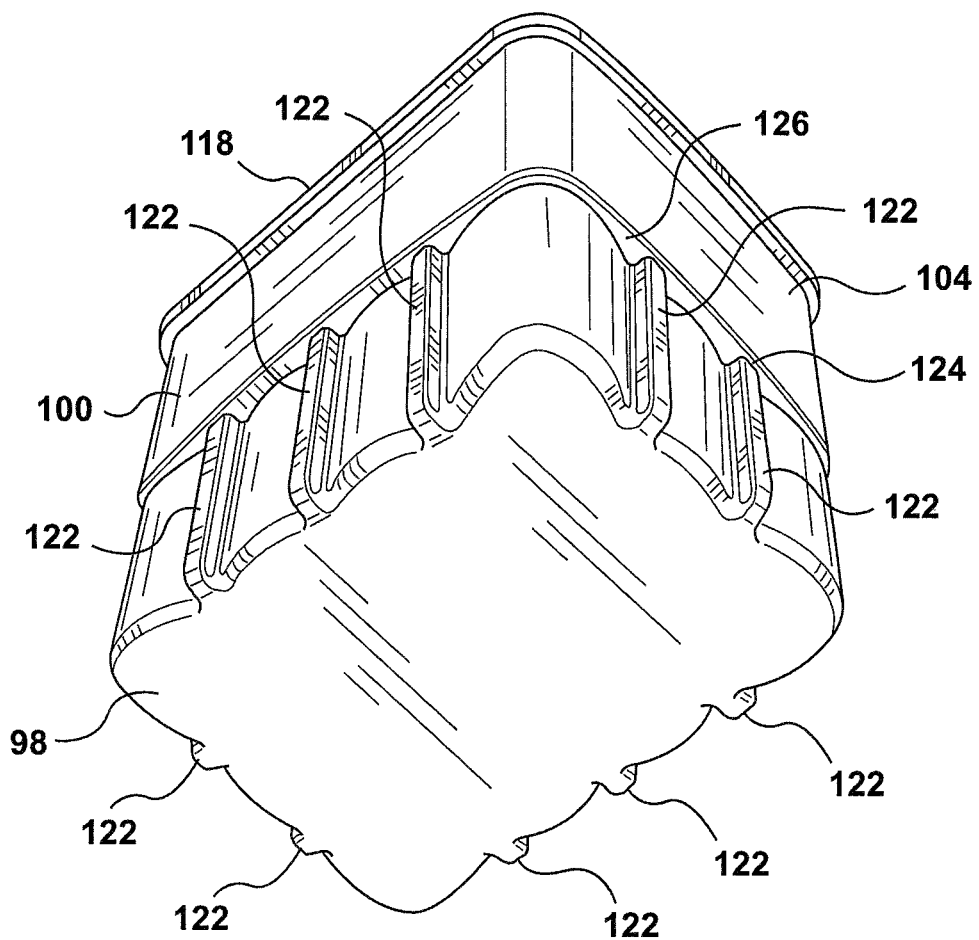
Figure 3E:
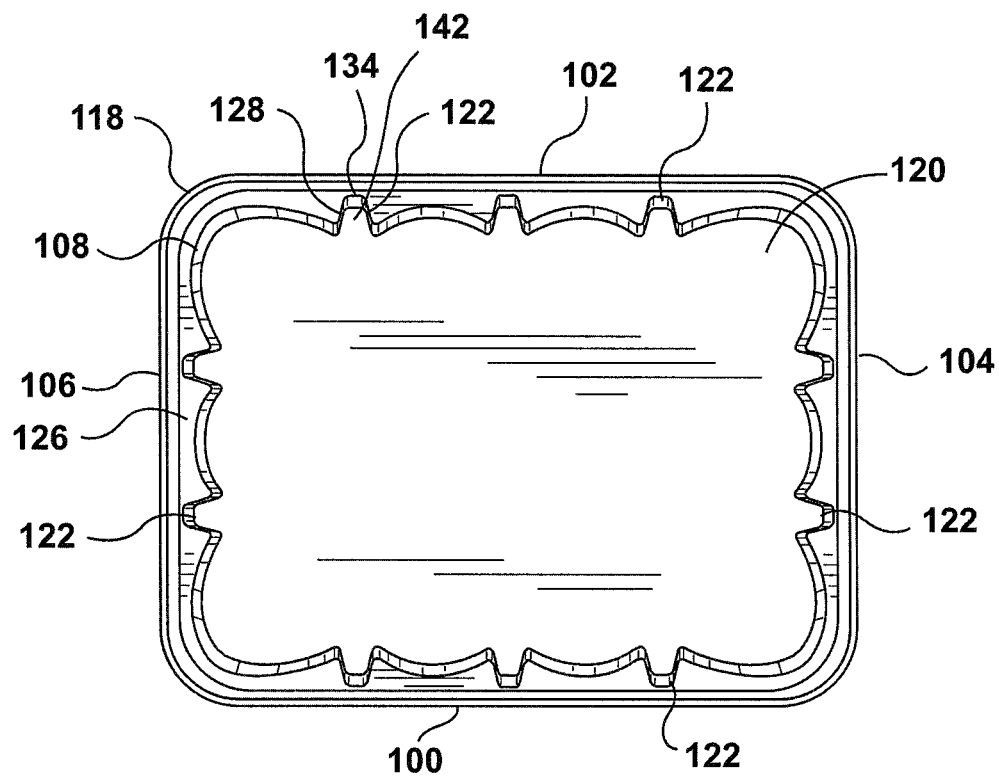
Figure 3F:
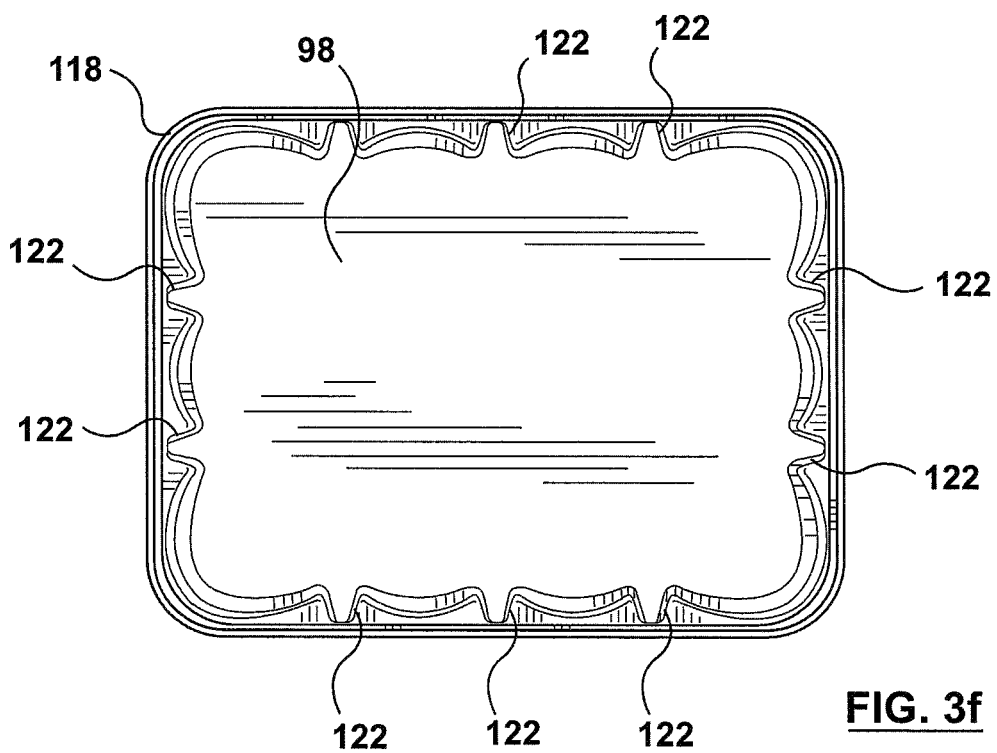
Figure 3G:
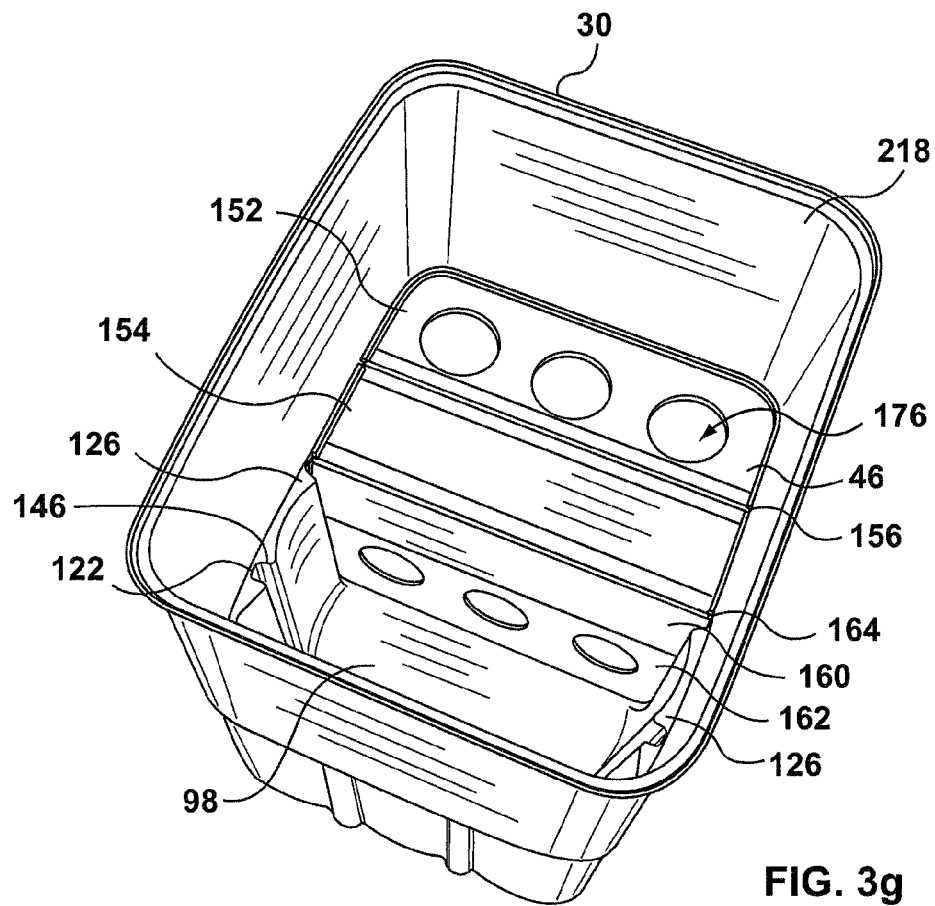
FIG. 3g shows an isometric view of the receptacle of FIG. 3a with a multi-position dividing partition mounted therein.
Figure 3H:
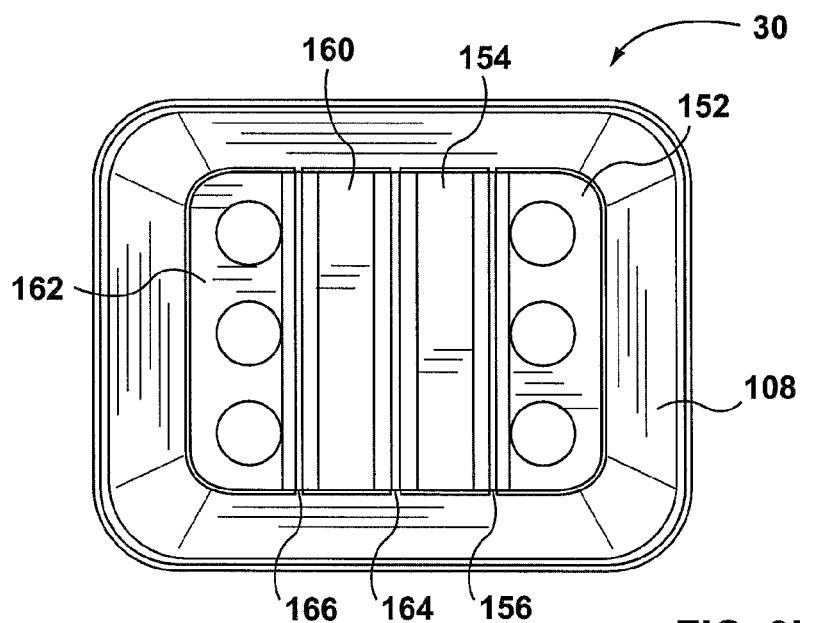
FIG. 3h shows a top view of the receptacle and dividing partition of FIG. 3g with the partition in a substantially planar mid-height position inside the receptacle.
Figure 3I:
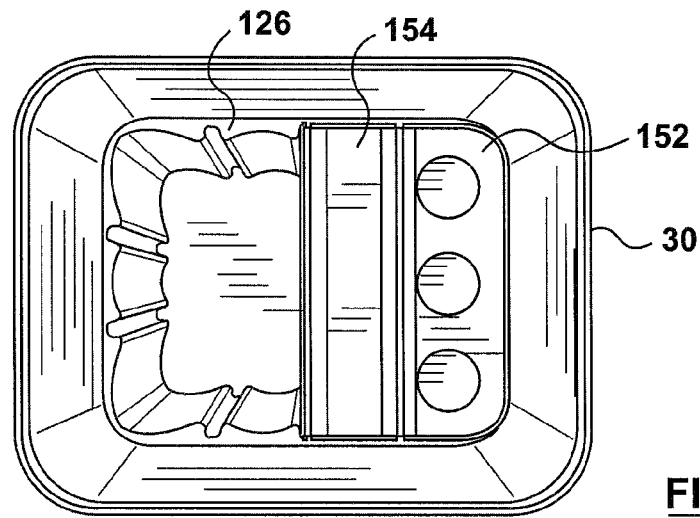
FIG. 3i shows a top view of the receptacle and dividing partition of FIG. 3g with the partition in a half vertical, half horizontal position inside the receptacle.
Figure 3J:
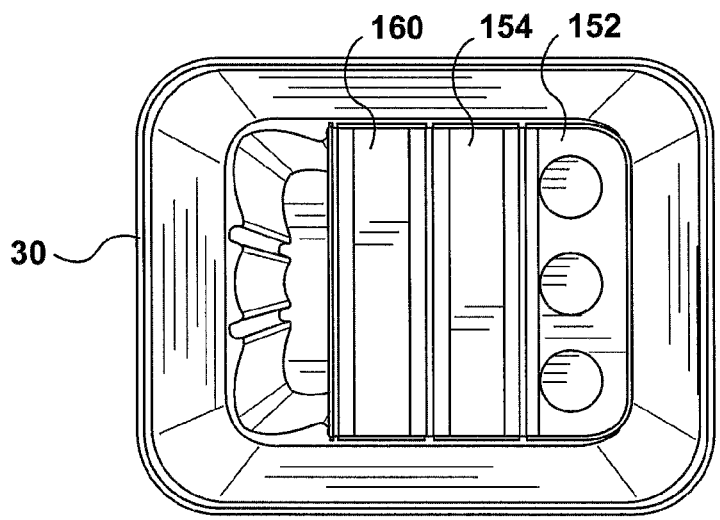
FIG. 3j shows a top view of the receptacle and dividing partition of FIG. 3g with the partition in a three quarter horizontal, one quarter vertical position inside the receptacle.
Figure 3K:
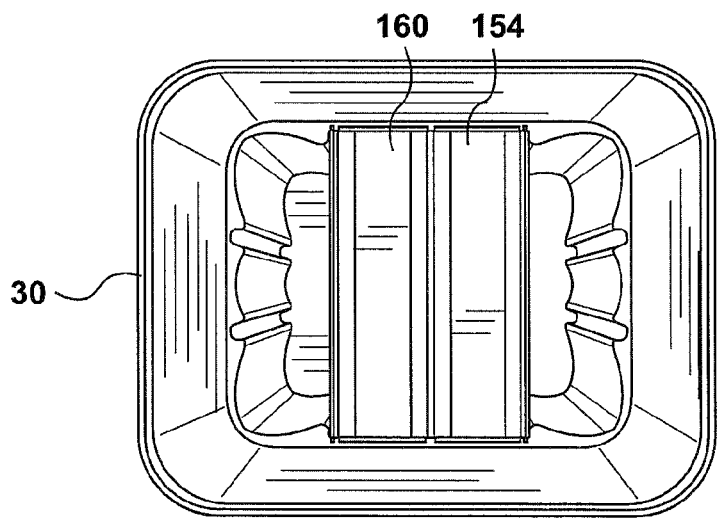
FIG. 3k shows a top view of the receptacle and dividing partition of FIG. 3g with the partition in a half horizontal, centered position inside the receptacle with both end quarters oriented vertically.
Figure 3L:
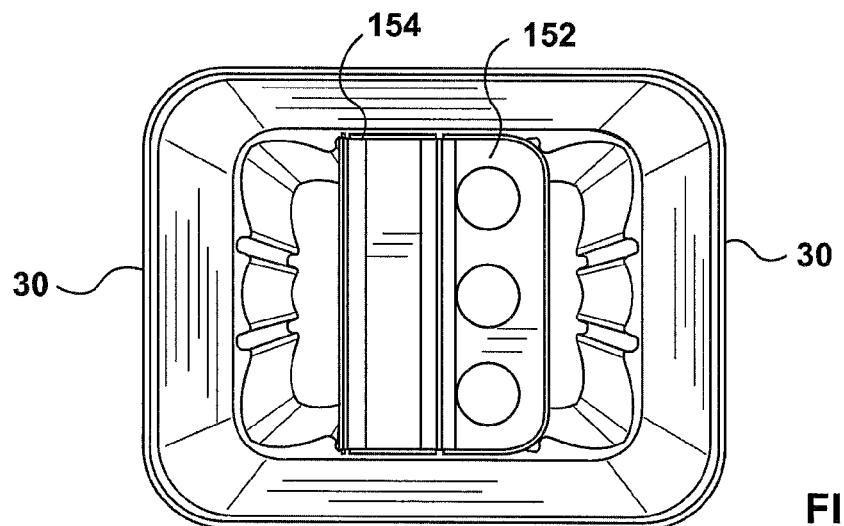
FIG. 3l shows a top view of the receptacle and dividing partition of FIG. 3g with the partition in a half horizontal, centered position, with one perforated panel portion and one solid panel portion being oriented horizontally.
Figure 3M:
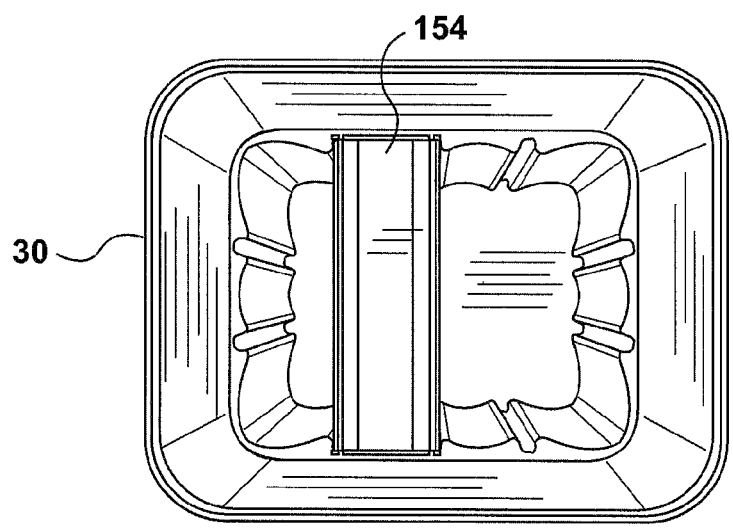
FIG. 3m shows a top view of the receptacle and dividing partition of FIG. 3g with one quarter of the partition in a planar horizontal position, and the remainder in vertical orientation inside the receptacle.
Figure 3N:
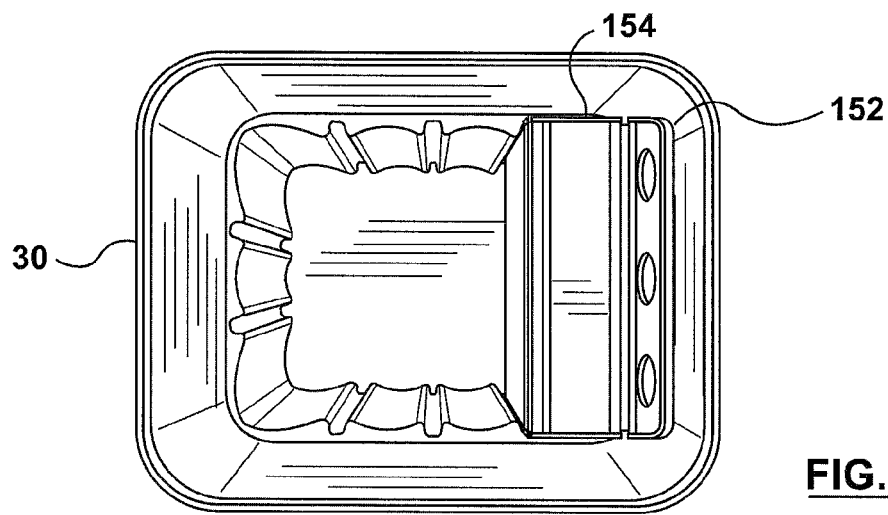
FIG. 3n shows a top view of the receptacle and dividing partition of FIG. 3g with one quarter of the partition in a substantially planar, side offset mid-height position inside the receptacle.

Referring to FIGS. 3a to 3n, receptacle 30 is preferably configured to be the same general size and shape as compartment 48 so that receptacle 30 may be placed within compartment 48 and lid 32 may be closed using flexible handle 82 to contain receptacle 30. While receptacle 30 preferably conforms to compartment 48, it may have some other configuration that fits within compartment 48. For example, receptacle 30 may have fewer than four, or greater than four walls. In an alternative embodiment, receptacle 30 may be configured to have one continuous wall defining a round cylindrical segment or another generally rounded shape.

In the preferred embodiment, receptacle 30 has a base or bottom wall indicated as bottom 98, a receptacle front wall 100, a rear wall 102, and a pair of right and left hand side walls 104 and 106. Each wall 100, 102, 104 and 106 is preferably generally located at a generally square corner to two adjacent walls, aside from the slight generally flared taper of the adjacent walls. For example, wall 102 is located adjacent wall 104 at one end of wall 102, and adjacent wall 106 at an opposite end of wall 102. Bottom 98 is be attached to all four walls 100, 102, 104 and 106, along edges thereof, the general structure of receptacle 30 being a molded plastic part such as may be used to contain liquids. Walls 100, 102, 104 and 106, and bottom 98, co-operate to define an interior surface 108 of receptacle 30, which bound chamber 50. Bottom 98 and walls 100, 102, 104 and 106, each are preferably generally rectangular in shape with opposite walls 100 and 102, and 104 and 106, being substantially congruent to one another. In this configuration, chamber 50 has a generally cube-like or rectangular parallelepiped shape having contours, as described in detail below. It should be noted that receptacle 30 may be configured without a bottom 98.

Walls 100, 102, 104 and 106 extend from receptacle bottom 98, and each wall terminates at free edges 110, 112, 114 and 116, respectively. Free edges 110, 112, 114 and 116 together define a receptacle rim, or edge 118 of generally rectangular plan form, with radiused corners. Receptacle edge 118 is preferably generally equidistant from bottom 98 (i.e., lies in a parallel, upwardly spaced plane) and defines a receptacle, identified as opening 120 by which to obtain access to chamber 50. While bottom 98 is generally planar, it may alternatively have portions defining indents (not shown) that conform to the profiles of one or more items to be contained within receptacle 30. Such indents may inhibit movement of these items when placed within the indents corresponding to their respective profiles.

Receptacle 30 is preferably rigid to provide a degree of protection to items stored therein from external forces caused, for example, by bumping, jostling, or knocking of container assembly 20 when it is transported or otherwise used. At the same time, receptacle 30 may tend to be sufficiently lightweight that it may not make container assembly 20 unduly heavy to carry when container assembly 20 is filled with items such as bottles of liquid 58 or sandwiches. A plastic, for example, may be used to form receptacle 30. A relatively tough plastic is preferred because it may tend to resist breakage, it can contain melting ice and spilled liquids, and it may be readily cleaned.

Receptacle 30 may be stiffened further by including one or more strengtheners, such as an array of ribs 122, that extend in a generally upwardly direction from bottom 98, to increase the rigidity of receptacle 30. Ribs 122 may be either attached to, or preferably be formed integrally with, receptacle 30. Each wall 100, 102, 104 and 106 preferably has at least one rib 122, which at least partially traverses an external surface thereof. As shown, for example, in FIGS. 3a and 3b, ribs 122 are generally parallel to one another, and originate adjacent bottom 98, extending from bottom 98 and ending at a rib terminus 124. While rib terminus 124 may be located at or adjacent receptacle edge 118, it is preferably located at some intermediate height between bottom 98 and receptacle edge 118. While any of ¼, ⅓, ½, ⅔, or ¾, or some other suitable proportion may be chosen, in the preferred embodiment, terminus 124 is roughly ½ way between bottom 98 and rim 118. In this intermediate position, rib terminus 124 may also meet interior shoulder 126 which may be used to support partition 46, as described in further detail below.

The interior surface 108 of receptacle 30 has at least one guide 128 for receiving or engaging a portion of partition 46, for example, an edge, such as edge 130 (as shown in FIG. 3e; and described in further detail below). Guide 128 may be added to, or, preferably be made integrally with, receptacle 30. In the preferred embodiment, guide 128 is integrally formed with a wall, such as wall 100 or 102, of receptacle 30, and is oriented so that an edge, for example edge 130, of partition 46 may be placed therein. When partition 46 is held by guide 128, it is preferably oriented to at least partially divide chamber 50. Most preferably, the internally facing surfaces of the integrally molded wall feature of rib 122 also function as guide 128.

Guide 128 may be in the nature of a rebate, groove or fluting, and may be substantially linear to permit partition 46 to be slidingly received therein. Guide 128 may be located to correspond to the location of a rib 122 so that guide 128 is defined within rib 122. Accordingly, guide 128 originates adjacent bottom 98, and extends along interior surface 108, from bottom 98, and ends at a guide terminus 134, which may corresponds to rib terminus 124. Guide terminus 134 may be located at or adjacent receptacle edge 118, but is preferably located at some mid-point between bottom 98 and receptacle edge 118 adjacent interior shoulder 126. A longitudinal axis of guide 128 may be substantially perpendicular to a plane of bottom 98.

Guide 128 need not be the same length as rib 122; it need only be of sufficient length to receive at least part of an edge (such as edge 130) of partition 46 to inhibit movement thereof in a direction transverse to a longitudinal axis of guide 128. Receptacle 30 may alternatively be formed with guide 128 (and, if desired, rib 122) oriented at an angle other than at 90 degrees relative to bottom 98. This would in turn alter the orientation of a received partition 46. If rib 122 and guide 128 are aligned, then rib 122 both strengthens receptacle 30 and defines guide 128. This arrangement may also facilitate the manufacture of receptacle 30 if, for example, it is made by injection moulding. In the preferred embodiment, guide 128 is configured to be substantially straight for receiving a substantially straight edge 130 of partition 46.

Receptacle 30 may be provided with additional guides 128 for receiving edge 130 of partition 46, for example. Two guides 128 may co-operate and each receive an edge of partition 46, such as edges 130 and opposite edge 132, to inhibit movement of partition 46 (as shown in FIG. 3g). The provision of multiple guides 128 within receptacle 30 permits chamber 50 of receptacle 30 to be sub-divided in different ways depending on which guides 128 are used for receiving partition 46 (as further explained below).

Each guide 128 is preferably bounded by generally parallel edges or boundaries, which have a concave rounded or arcuate intermediate portion 136 therebetween. The rounded intermediate portion 136 may facilitate the manufacture, for example by moulding, of receptacle 30, may increase the stiffness of the structure more generally, and may serve to provide a nesting curvature for a round cylindrical container, such as a bottle or can that may be placed in receptacle 30.

Receptacle 30 may also have a shoulder 126 for supporting partition 46, or a portion of partition 46, in a generally horizontal orientation, such as to function as a shelf or partial shelf. Shoulder 126 extends along interior surface 108, and is preferably located between receptacle edge 118 and bottom 98. In the preferred embodiment, shoulder 126 extends along the perimeter of interior surface 108 at a height intermediate to the bottom and the upper rim, preferably generally about halfway between the two. To reduce material in an alternate embodiment, shoulder portions in the nature of inwardly extending flutes of partial height, may instead be implemented to support partition 46. Shoulder 126 projects from interior surface 108, and may present a surface 140, that is generally planar and parallel to bottom 98. Subject to the existence of intermediate arcuate portions 136, surface 140 may have a generally uniform width, and may have gaps 142 therein where guides 128 intersect shoulder 126. Each gap 142 corresponds to a guide terminus 134.

In the preferred embodiment, receptacle 30 has six generally parallel guides 128: three sets of opposed guides located in opposed walls 100 and 102, respectively. In an alternate embodiment it may also have two sets of opposed guides in opposed walls 104 and 106. Each guide 128 may be spaced on generally equal, regular pitches along walls 100, 102, 104 or 106.

As noted above, wall portions between adjacent guides 128 may be configured to accommodate items that may be typically stored within receptacle 30, such as beverage bottles 58. For example, a wall portion 136, located between two guides 128, may be generally arcuate, or some other shape, so that it conforms to a profile of a bottle 58. Similarly, a corner wall portion 144 may conform to a profile of bottle 58 and define a corner of receptacle 30. An axis of the apex of each wall portion is preferably substantially parallel to guides 128, and each guide and its adjacent arcuate portions have substantially linear co-terminating boundaries 146. While in one embodiment the width of shoulder surface 140 may be roughly uniform, it may vary to correspond to the profile of the wall portions, such as corner wall portion 144.

In the alternate, preferred embodiment of FIG. 6b, a receptacle 138 is shown that does not have arcuate wall portions, or arcuate corner molding portions, but rather substantially planar walls, with corner radii, giving a smoother, and simpler, style of construction.

If receptacle 30 is configured to be substantially the same size as compartment 48, (or, that is of a corresponding size that fits well therein) then spaces or gaps 94 between receptacle 30 and one or more of walls 62, 64, 66 and 68, may be reduced. A smaller gap 94 may reduce the likelihood that spilled liquids, food, or such other matter may find its way between the inwardly facing wall surfaces of soft sided wall structure 28 and the outwardly facing surfaces of receptacle 30, which may tend to reduce the frequency with which compartment 48 requires cleaning. Gap 94 may be reduced by configuring receptacle edge 118 to have a reinforcement or stiffener in the nature of a flange or lip 148. Lip 148 may extend peripherally along receptacle edges 110, 112, 114, 116 and is preferably located adjacent one or more of outer casing free edges 72, 74, 76 and 78 when receptacle 30 is positioned within outer casing 26. This proximity of lip 148 to free edges 72, 74, 76 and 78, may tend to reduce the size of a gap 94 that may form between the flexible outer casing 26 and receptacle 30. By reducing the size of gap 94, matter such as a spilled liquid may be encouraged either to be caught within receptacle 30 or repelled by any portion of the exterior surface of outer casing 26. Lip 148 may have a generally L-shaped cross-section forming a step in receptacle edge 110, 112, 114 or 116 as may be, and may project outwardly and away from walls 100, 102, 104, 106, and chamber 50 in a generally horizontal plane. Lip 148 may alternatively or additionally be arcuate, rounded or have some other shape that projects from walls 100, 102, 104, 106 to discourage inc passage or matter between outer casing 26 and receptacle 30. (FIG. 2g).

Partition 46

Figure 8B:
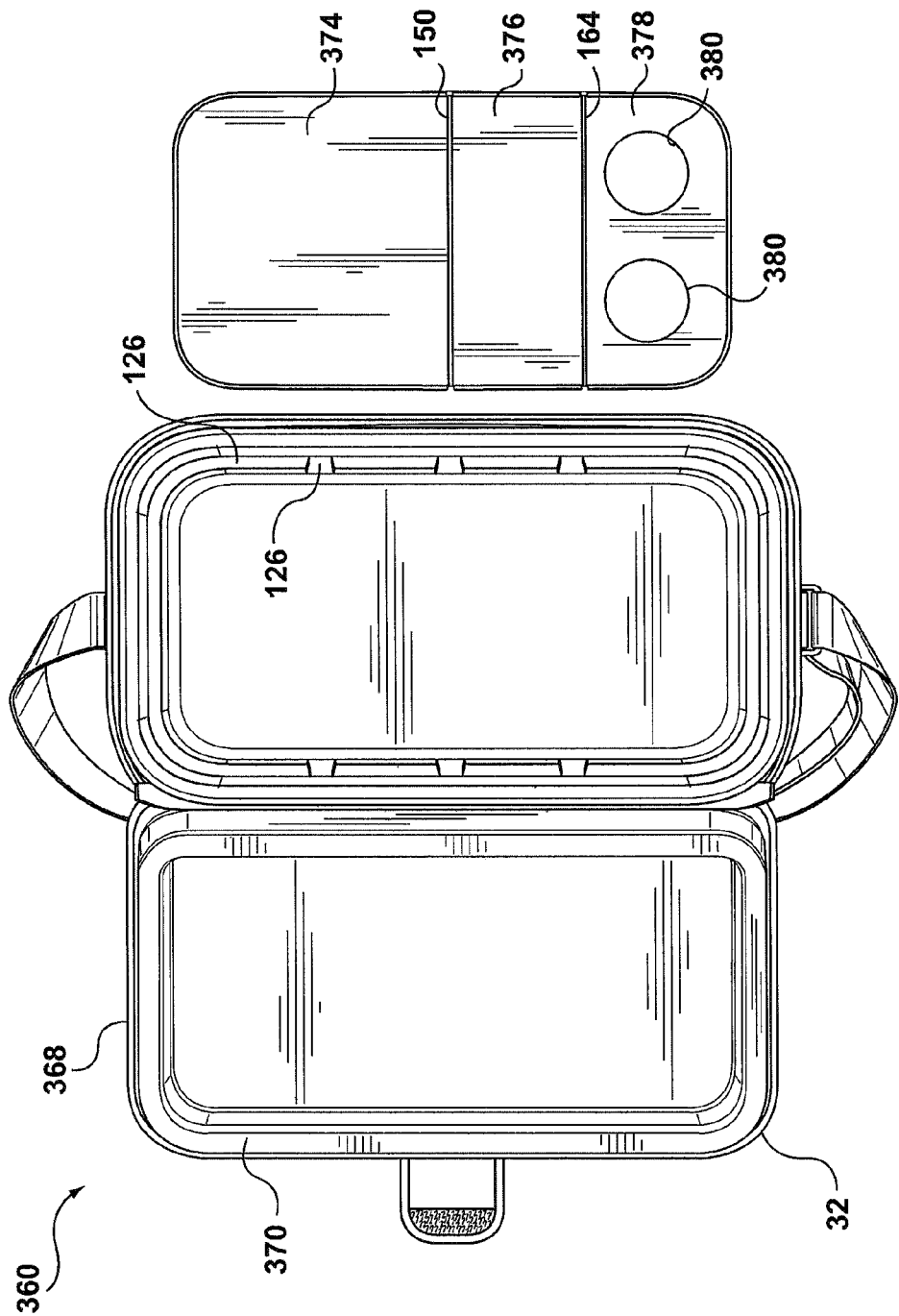
FIG. 8b is similar to FIG. 8a, but with an internal divider member removed.
Figure 8C:
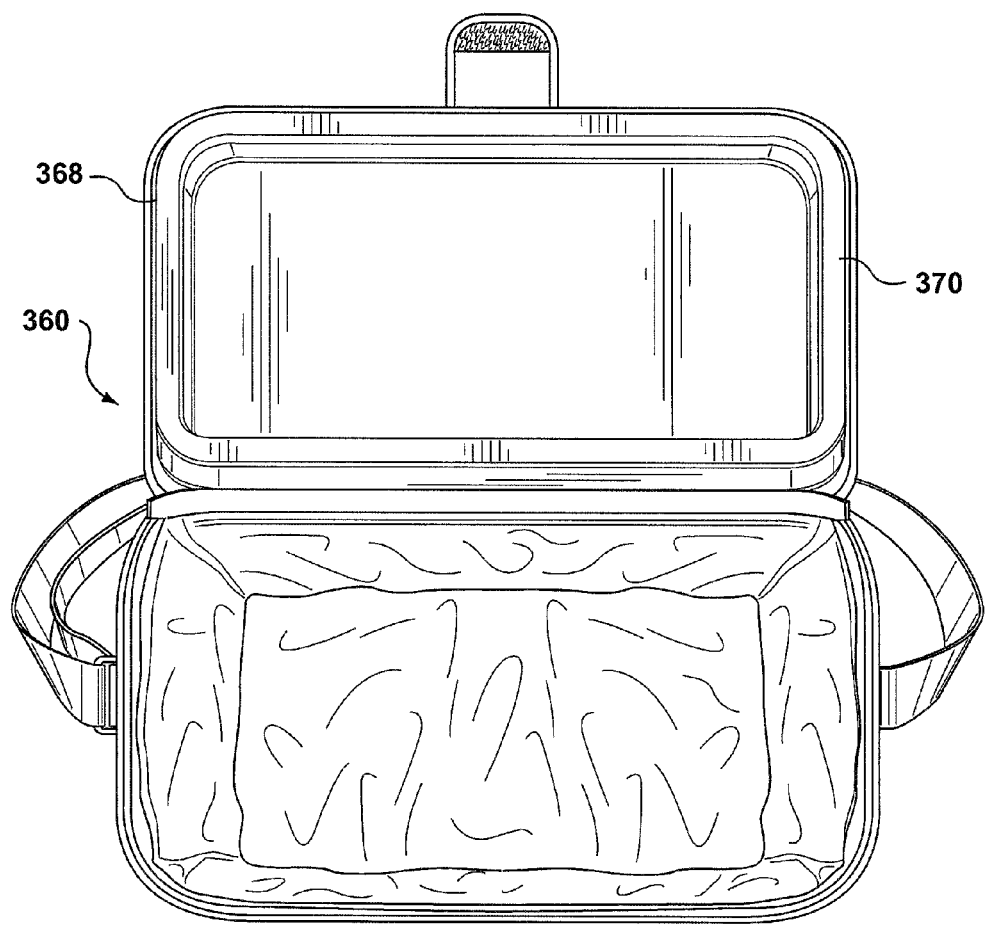
FIG. 8c is similar to FIG. 8a, but with an internal receptacle removed.
Figure 8D:
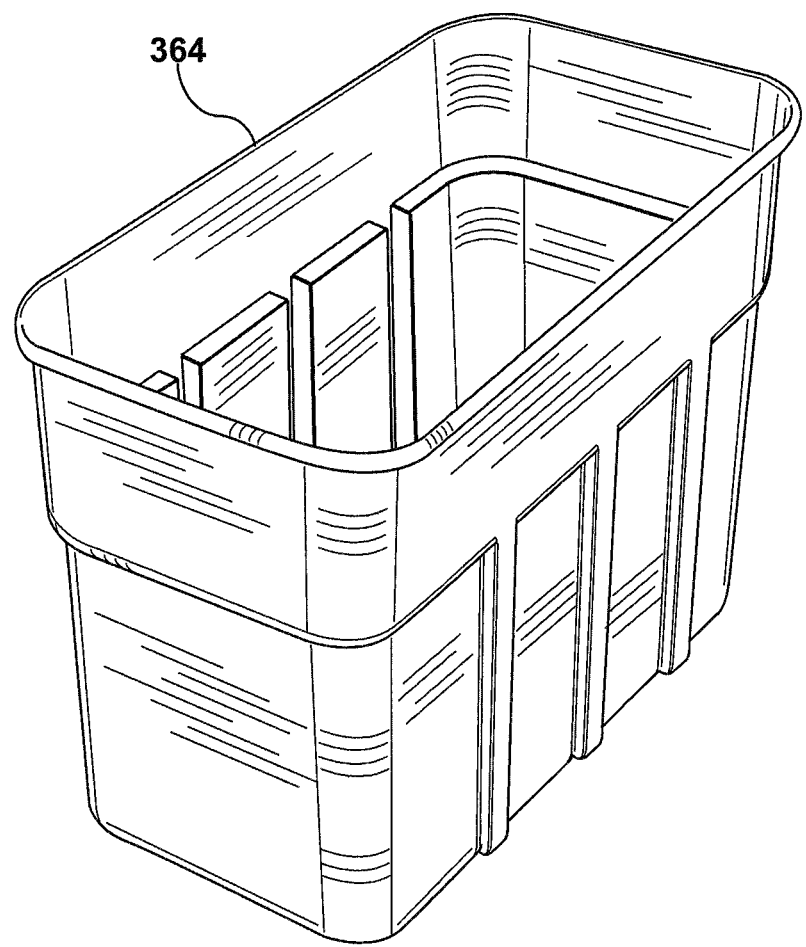
FIG. 8d is a perspective view of the internal receptacle of FIG. 8c.
Figure 8E:
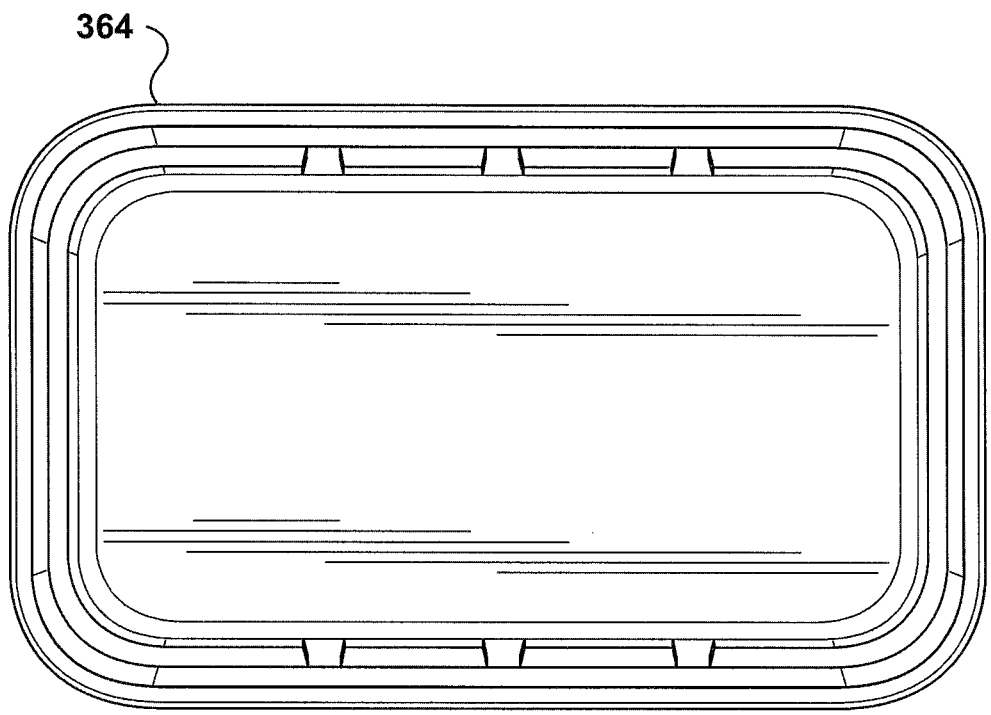
FIG. 8e is a top view of the receptacle of FIG. 8d.
Figure 8H:
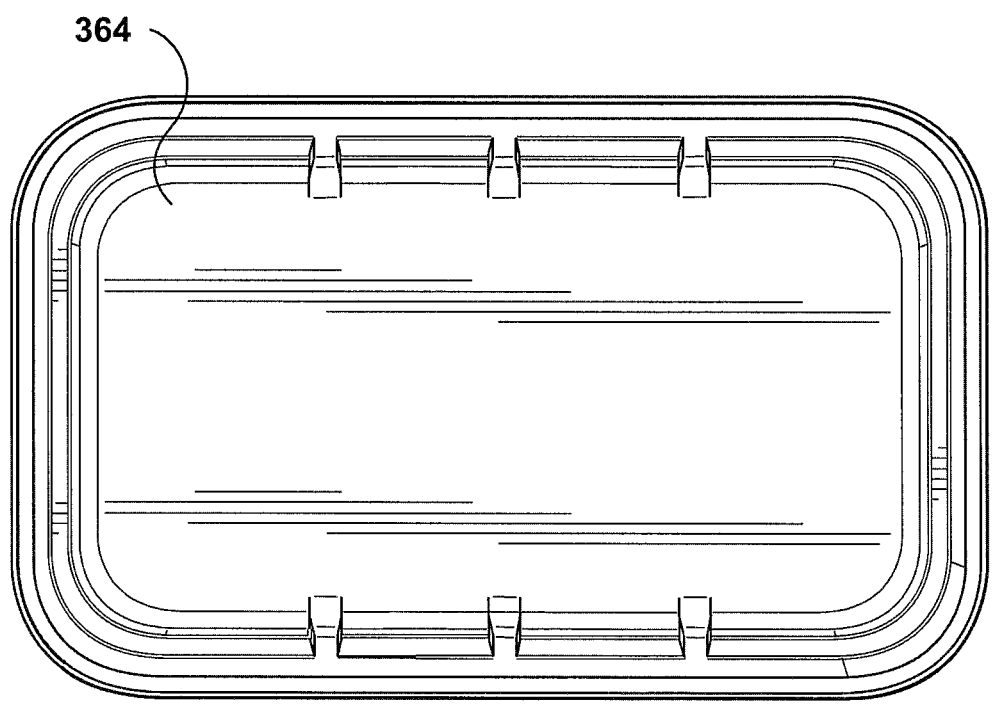
FIG. 8h is a bottom view of the receptacle of FIG. 8d.
Figure 8G:
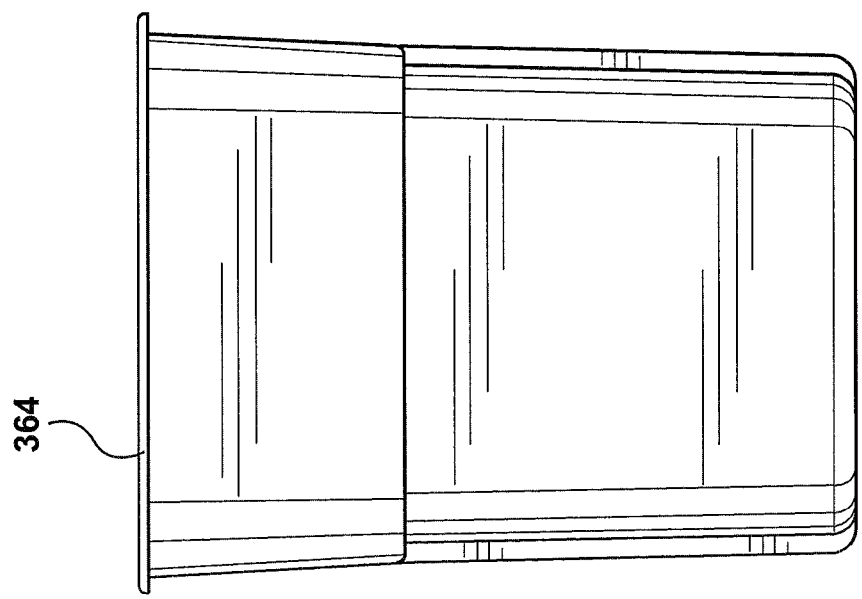
FIG. 8g is an end view of the receptacle of FIG. 8d.
Figure 8F:
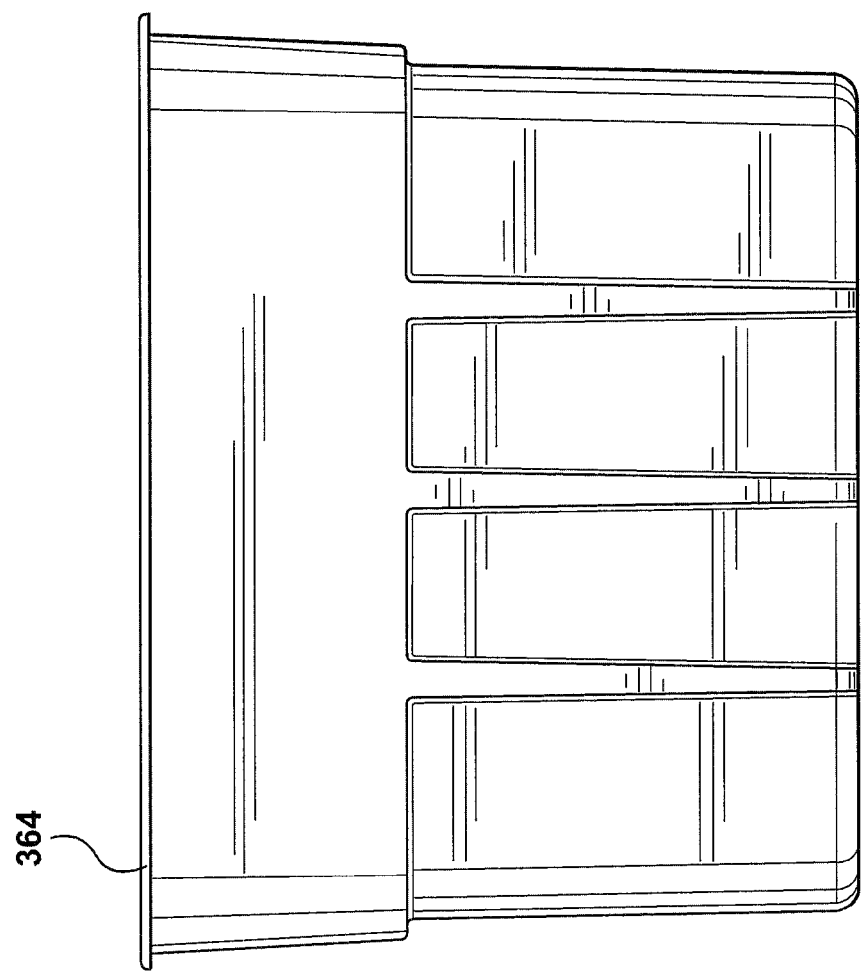
FIG. 8f is a side view of the receptacle of FIG. 8d.

Referring to FIG. 8a, partition 46 may be positioned or located within receptacle 30 to sub-divide chamber 50 in at least two different ways, as shown, for example in FIGS. 3g to 3n. By sub-dividing chamber 50, the movement of items stored within chamber 50 may be inhibited, which may limit the extent to which they come into damaging contact with one another, and with walls 100, 102, 104, 106 and bottom 98, when container assembly 20 is transported or moved. Partition 46 may be made of a substantially rigid material so that it may tend to resist deformation when contacted by items stored in receptacle 30. As discussed in further detail below, one or more guides 128, and shoulder 126, or both, may co-operate with partition 46 to inhibit its movement within receptacle 30 when it is located to sub-divide chamber 50.

Positioning and configuring of partition 46 may be facilitated by providing partition 46 with a first hinged connection 150 therein. Hinged connection 150 separates partition 46 into at least a first partition portion 152 and a second partition portion 154. First and second portions 152 and 154 are joined to one another along hinged connection 150, and are movable relative to one another about hinge 150.

A portion of partition 46, which traverses partition 46 between first and second portions 152 and 154, preferably defines a living plastic hinge 156. Hinge 156 preferably has a thickness which is less than the thickness of the web of at least one of the first and second portions 152 and 154, and the peripheral flange, or edge 158, standing perpendicular to the general plane of the intermediate, transversely extending webs, is relieved, (by being chamfered, or bevelled down) in the region of the hinge. If partition 46 is moulded from a plastic then hinge 156 may be integrally formed therein.

Hinge 156 may alternatively be formed using a flexible joining member such as an adhesive tape attached to both first and second partition portions 152 and 154 (not shown). Alternatively, hinge 156 may be formed by laterally inserting a pivot member such as a pin through one or more projections extending from each of first and second partition portions 152 and 154, respectively. First and second partition portions 152 and 154 may then rotate about the pin connecting them.

In the preferred embodiment, first and second partition portions 152 and 154 may be generally planar, and may be connected or mounted along adjacent edges thereof. In this configuration, the angular displacement of first and second portions 152 and 154 relative to one another about hinge 156 may be varied. For example, partition 46 may be configured to be generally planar when first and second portions 152 and 154 are co-planar (see FIG. 3i), and may be configured to be generally L-shaped when first and second portions 152 and 154 are generally at right angles relative to each other (see FIG. 3n).

In the preferred embodiment, partition 46 has third partition portion 160 attached to second partition portion 154, and fourth partition portion 162 attached to third partition portion 160 as shown in FIG. 3h. Portions 160 and 162 may be attached using second and third hinges 164, 166 which may be configured in a manner similar to hinge 156, as described above. Hinges 156, 164 and 166 are preferably parallel to one another, permitting multi-position partition 46 to be placed in a variety of different configurations: generally planar when portions 152, 154 and 160 and 162 are co-planar (see FIG. 3h); generally L-shaped (FIG. 3g) when one or two of portions 152 or 154, 160 or 162 is (or are) rotated about one of the hinges (156, 164 or 166) to be generally perpendicular to the remaining two portions (see FIGS. 3g, 3i, 3j, 3l, and 3n); and generally U-shaped when portions 152 and 162 are rotated towards each other about hinges 156 and 166, respectively, until they are generally perpendicular to intermediate portion 154 and 160. (See FIGS. 3k and 3m). A great number of permutations are possible, and may be employed according to the needs of the user.

Referring to FIG. 3h, when in a generally horizontal planar orientation, the plan form of partition 46 is preferably congruent to a shape defined by an intersection of support surface 140 and receptacle interior surface 108. That is, the periphery of the divider is generally similar in plan form to the plan form of the shelf defined by the shoulder at the transition of section of the wall structure of receptacle 30. This permits partition 46 to lie within receptacle 30 and to be supported about its margin by shoulder 126. In this configuration, partition 46 divides chamber 50 into a first sub-chamber 168 adjacent bottom 98, and a second sub-chamber 170 adjacent opening 120 (best seen in FIG. 2g). Items stored within each sub-chamber 168 and 170 may be kept separate by first placing one or more items into sub-chamber 168, placing partition 46 onto shoulder 126, and then placing one or more additional items onto partition 46 for storage within sub-chamber 170. Alternatively, or additionally, a thermal storage element, such as a hot pack or an ice pack, or such as discussed more fully below, can also be located upon partition 46 amidst the objects contained in container assembly 20.

Access to items in sub-chamber 168 may be obtained by moving, e.g., pivoting or lifting, one or more of panels 152, 154, 160 and 162 away from sub-chamber 168. To move panels of partition 46, partition 46 may be grasped through one or more holes therein, as described below.

Referring to FIGS. 3g to 3n, partition 46 may also be configured to partially sub-divide chamber 50 when partition 46 has a general L-shape. In this configuration, the peripheral edges of one portion, for example portion 152, may be placed in, or slidingly engaged with, a pair of opposed guides 128. The remaining portions 154, 160 and 162, lying perpendicular to portion 152, may be supported by shoulder 126. Items stored between partition 46 and bottom 98 may be separated from items placed onto portions 154, 160 and 162. Items may additionally be placed on a portion of bottom 98 that is exposed even when partition 46 is in place. If the distance between partition portions 154, 160 and 162 and bottom 98 is substantially the same as the width of portion 152, then items placed on bottom portion 162 may be separated by portion 152 from items placed on the portion of bottom 98 that is enclosed by partition 46. In the preferred embodiment, portions 152, 154, 160 and 162 all have substantially the same width, and shoulder 126 is displaced from bottom 98 by a distance that may be roughly equal to two times the width of one of these portions. Although it is preferred that they be roughly equal quarters, it should be noted that portions 152, 154, 160 and 162 may have substantially different widths. The distance between bottom 98 and shoulder 126 may vary between embodiments. For example, a greater distance may be used when constructing a receptacle 30 for containing wine bottles than when constructing a receptacle 30 for containing beer bottles.

Edges of portion 160, 162 and portion 154, may be inserted into respective opposed guides. Once so inserted, portion 152 may be pivoted about hinge 156 to be supported by shoulder 126, and to provide an alternate division of chamber 50. In this configuration, the distal end 168 of portion 162 is located adjacent bottom 98. Many alternate positions are possible as illustrated in the Figures. These different configurations of partition 46 may permit items of various dimensions to be stored within receptacle 30. If a different configuration of partition 46 is required, partition 46 may be manually removed, reconfigured and repositioned, as needed.

As noted above, partition 46 may preferably have a stiffener in the nature of a rim or flange 158. Flange 158 preferably extends about at least a portion of the periphery of partition 46. Flange 158 may project generally perpendicularly to the transverse web 172 of partition 46, to form either an L-section (an angle) or as a T-section. A T-section is preferred as shown in FIG. 21. Flange 158 is preferably relieved adjacent all hinges.

Partition 46 may additionally have a bore, formed opening, or aperture, or apertures, such as may be in the nature of a circular holes 176, passing through at least one of portions 152, 154, 160, and 162. Holes 176 may permit partition 46 to be grasped for removal or relocation.

Referring to FIG. 2g, hole 176 may additionally be sized to receive an item such as a vessel, for example the neck of bottle 58, that is placed within chamber 50. Hole 176 is preferably of the order of 1½ to 2 inches in diameter, preferably about 1 {fraction (¾)} inches to accommodate the neck of a wine bottle, or pop-bottle or beer bottle, and so on, while being smaller than a cross-sectional dimension of the body of the bottle. Because hole 176 is preferably at least the same size as the bottle neck cross-sectional dimension, lateral movement of the bottle neck within hole may be inhibited, for example, when container assembly 20 is carried, jostled or bumped. By inhibiting movement of the bottle neck, bottle 58 may be discouraged from toppling and spilling its contents, or coming into undesired contact with other items stored within receptacle 30. An array of holes 176 may be located in a partition portion, such as portion 152 or 162, to position a bottle body adjacent one of the wall portions, when bottle 58 is supported by bottom 98, portion 152 is supported by support surface 140, and the bottle neck extends through hole 176.

Figure 2I:
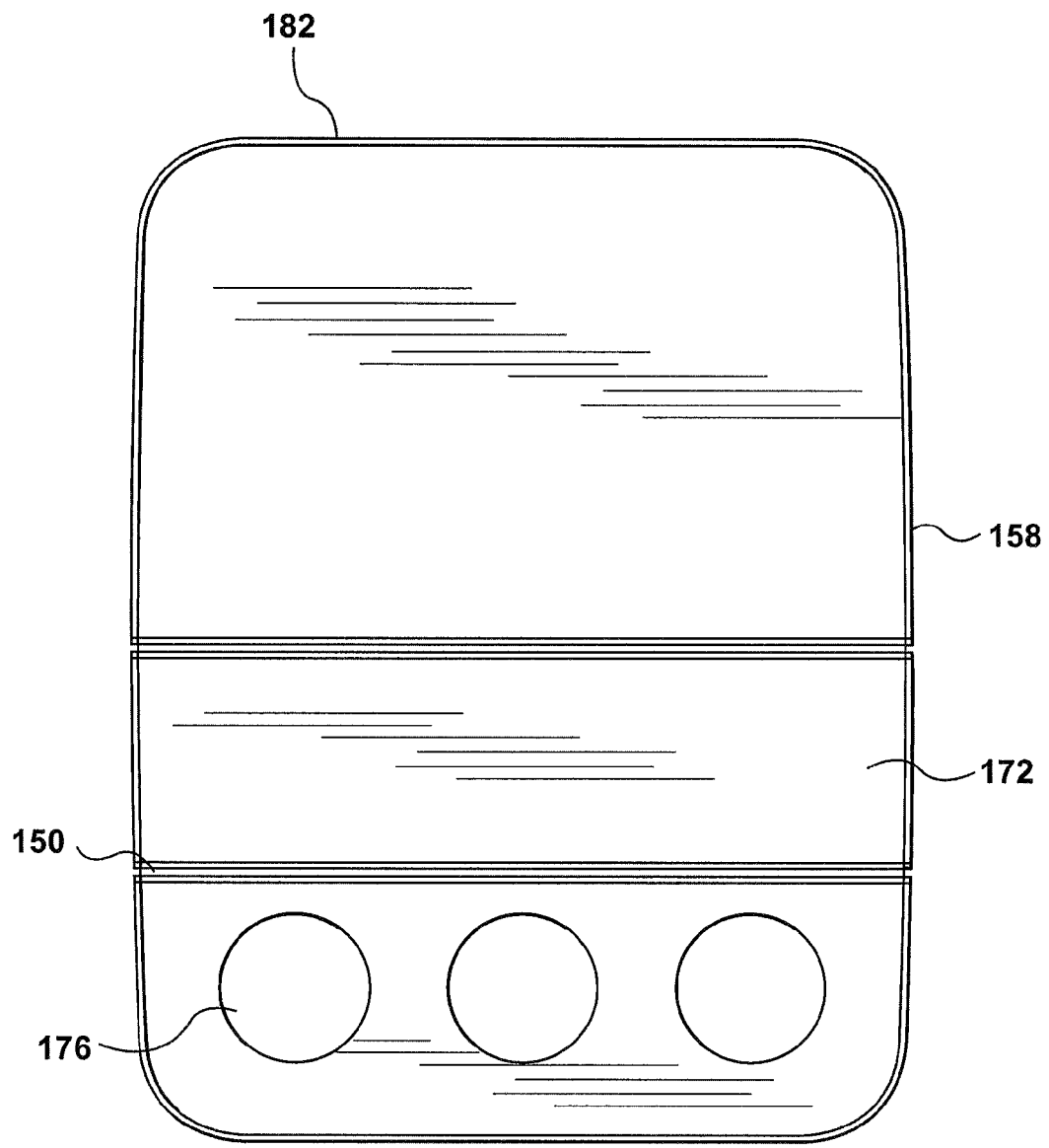

While the preferred embodiment of the invention has three holes 176 located in each of the end quarter panel portions of partition portion 152, 162, one, two, or more holes may be placed in any portion, as in the alternative configurations of partitions 180 and 182 in FIGS. 2h and 2i. Partition 180 is a double fold, three portion partition (the portions being roughly equal in longitudinal extent) with two holes 176 in one of the end portions (see FIG. 2h). Partition 182 is a double fold, three portion partition, in which one portion is substantially larger and three holes 176 is in one of the end portions (see FIG. 2i).

Internal Structural Member 34

Figure 4A:
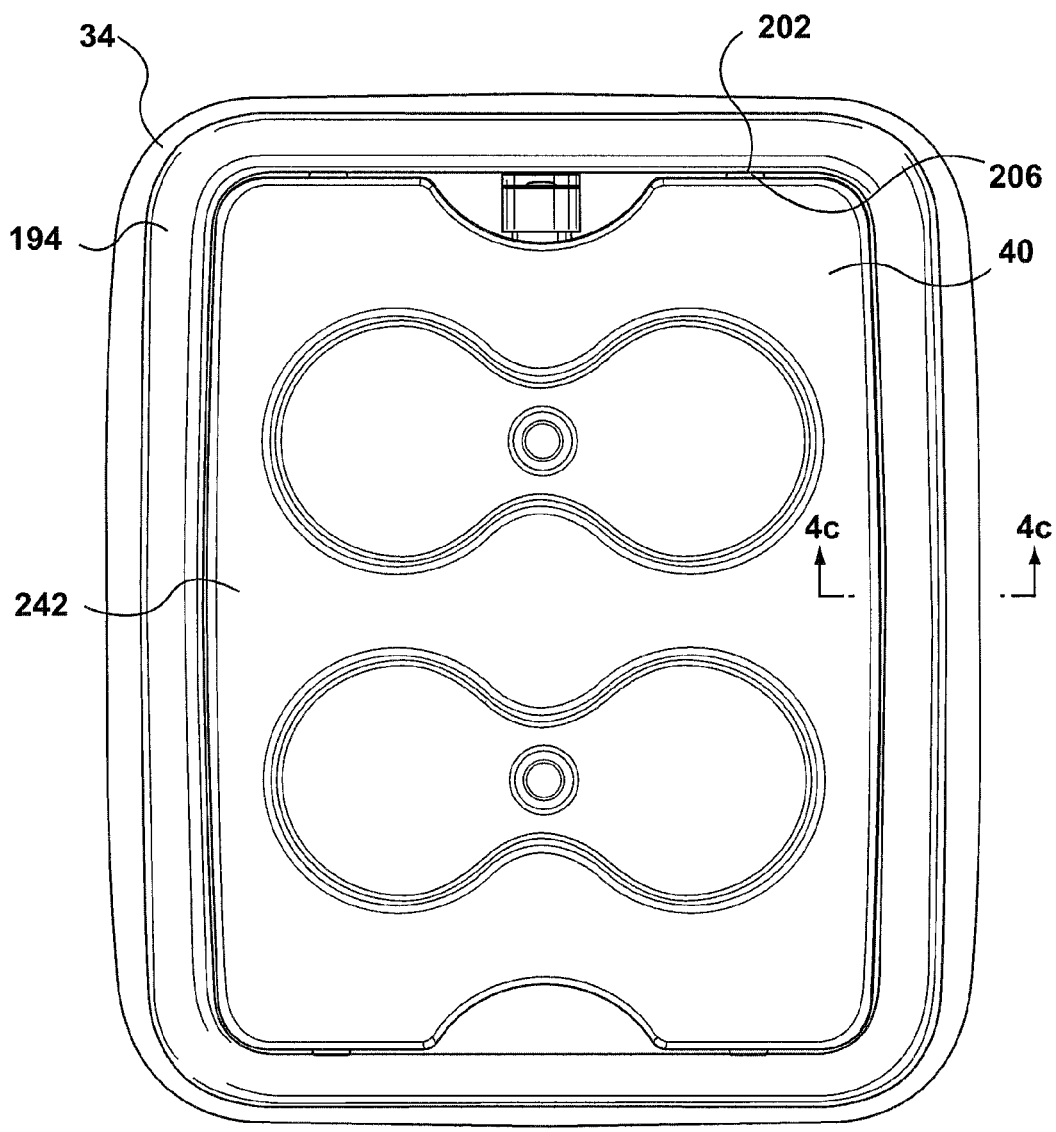
Figure 4B:
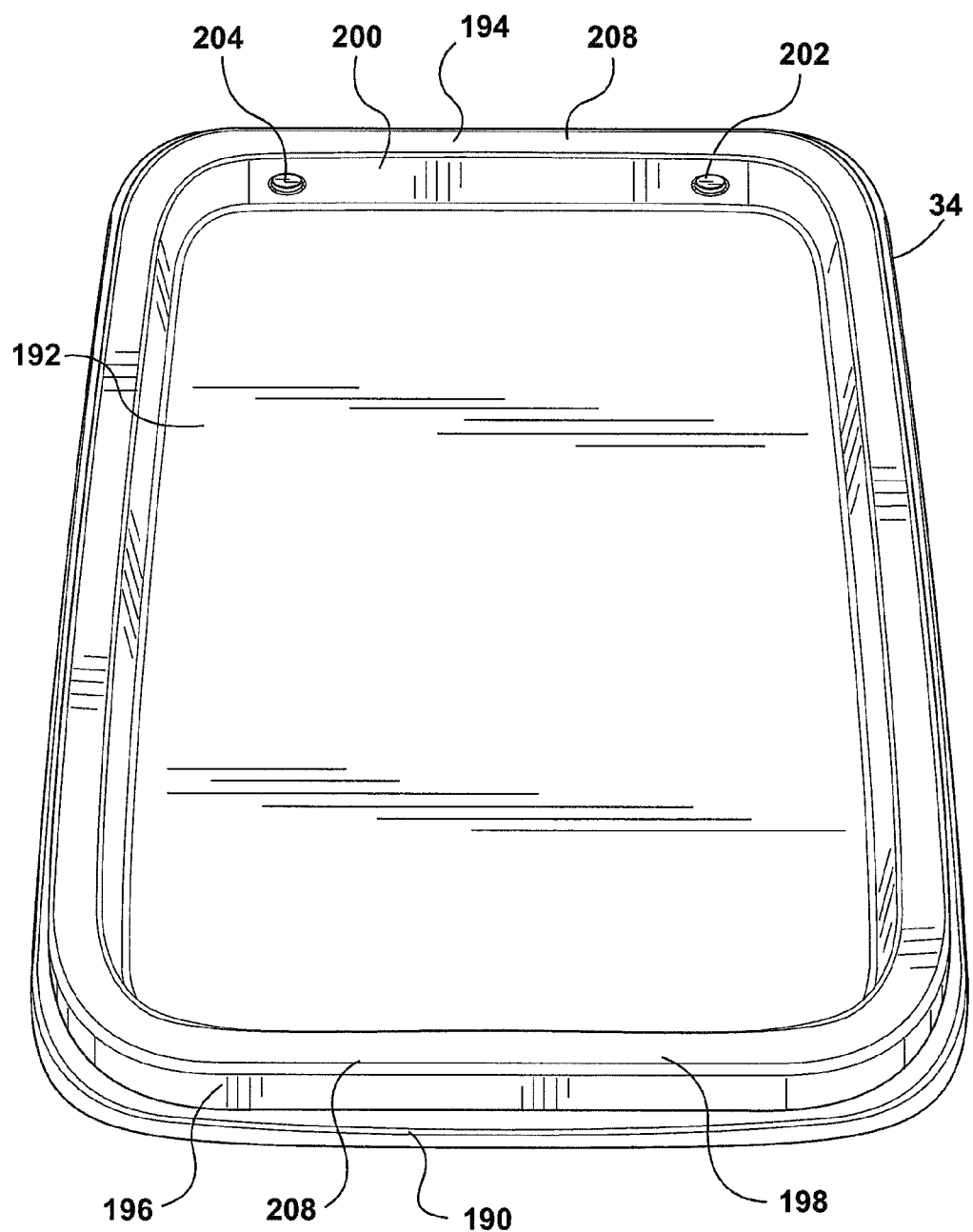
Figure 4C:
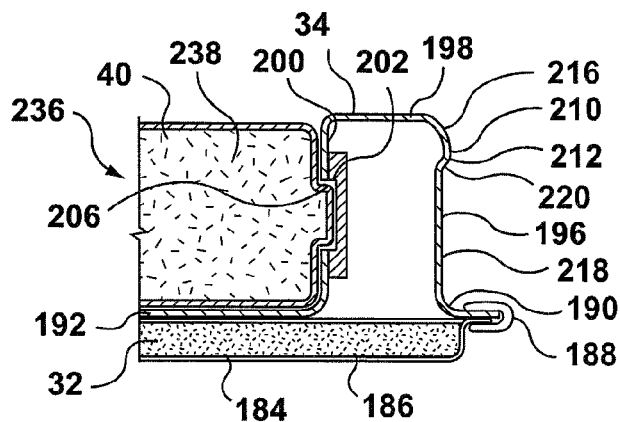
FIG. 4c shows a scab cross-section of FIG. 4a on section '4c-4c'.

Lid 32 preferably includes internal structural member 34. The general cross-sectional structure of lid 32 may be generally as shown in FIG. 4c, in which lid 32 has an outer skin 184, an intermediate layer of thermal insulating material 186, such as may preferably be a layer of closed cell foam, and an inner wall, or skin, provided by internal structural member 34. A heavy fabric strip 188 is folded over the combined edges of the fabric outer skin 184 and the external lip 190 of structure member 34 and the laminate so formed is then sewn together, the stitches passing through lip 190. In this way a thermally insulative sandwich structure is formed.

In the preferred embodiment, internal structural member 34 includes a substantially planar medial web portion, 192, that is generally rectangular in plan view (reflecting the generally rectangular plan form of container 20, more generally). An integrally formed bezel, or surround member 194 extends peripherally, and continuously, about web portion 192, much in the manner of a picture frame, or peripheral flange. Surround member 194 is generally rectangular in plan view, and interacts with the similarly rectangular plan view outline of the mouth of receptacle 30. If receptacle 30 were circular, or elliptical, or oblong, surround member 194 would also tend to be correspondingly circular, or elliptical, or oblong to permit satisfactory mating engagement, as described below. The peripherally outermost portion, or extremity, of surround member 194, is peripheral lip 190. Lip 190 lies in the plane of web portion 192 (although it need not do). Inwardly of lip 190 is an upstanding (in the view of FIG. 4c), outwardly facing wall member 196. Wall member 196 terminates at an end wall portion 198 that extends in a plane generally parallel to the plane of web portion 192 (although end wall portion 198 could be a continuously radiused portion, or could be bevelled, as may be).

Lying peripherally inwardly spaced from outwardly facing wall member 196, is a generally inwardly facing wall member 200, that extends between the peripheral margin of web portion 192 and the inward margin of end wall portion 198. Inwardly facing wall member 200 has a number of sockets, or female engagement fittings 202 in the nature of round holes 204 formed therein for receiving protruding male engagement fittings 206 of thermal storage member 40. Two such female engagement fittings 202 are located in each of the side portions 208 of inwardly facing wall portion 200 to provide generally opposed engagement points for releasable retention of thermal storage member 40 in a nested position snug against lid 32 as indicated in FIG. 4c. It is preferred that holes 204 be blind, or capped to form sealed sockets.

Outwardly facing wall member 196 includes a seal member, or sealing fitting, 210, in the nature of an externally oriented bead 212 of marginally greater peripheral dimension then the land region 214 of an opposing wall of receptacle 30 at the mouth thereof with which bead 212 engages in an interference fit when lid 32 is moved to a closed position relative to chamber 50. As such, bead 212 provides a sealing means for discouraging leakage from receptacle 30 in the event of mishandling. That is, bead 212 engages the distal portion, or bead engaging land region 214 of a peripheral wall of receptacle 30 in an interference fit. The general structure of surround member 194 is somewhat resilient, and, by being formed in the bent shape illustrated, is somewhat like a spring when deflected, thus providing biasing against the tendency of bead 212 to be deflected by the rim, or flange, 118, of receptacle 30 when engaged in an interference fit. This may tend to provide a reasonable tendency to maintain a seal, without being unduly resistive to the opening of lid 32.

As noted above, lid 32 has a handle, or draw, or release member, namely handle 82, that is attached externally to lid 32, and that has a hook and eye fastening member (e.g., Velcro™) mounted on the inside of the tip thereof for engaging a mating hook-and-eye securement fitting 84 mounted to the forward facing region of front panel 62 below the upper margin thereof. When secured, the release member 82 may tend to secure, or lock lid 32 in place. When lifted, the release member 82 may tend to aid in disengaging lid 32 from receptacle 30.

It may be noted that bead 212 is formed by having a cross section or a continuously radiused outer quarter round 216, that terminates at the straight portion 218 of outwardly facing wall portion 196 at a jog, or dog-leg 220. An alternative style of seal member is shown in FIG. 4e, where the straight portion 222 of an outwardly facing peripheral wall member 224 has an outwardly protruding, half round bead 226 of smaller radius than quarter round 216, inset a distance .delta. from end wall 228. Once again, introduction or the surround member into the mourn of receptacle 30 will tend to cause bead 226 to be squeezed, thus tending to make a seal.

Figure 4D:
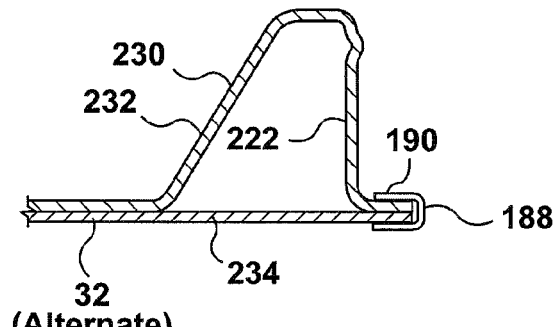
FIG. 4d shows an alternate cross-section to that of FIG. 4c.
Figure 4E:
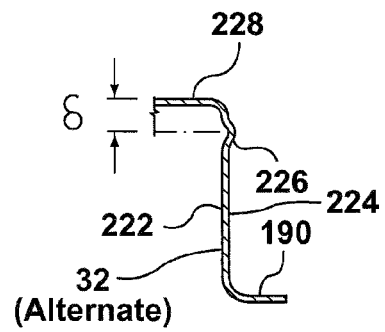
FIG. 4e shows an alternate cross-section of a sealing portion for the cross section of FIG. 4c or FIG. 4d.
Figure 5E:
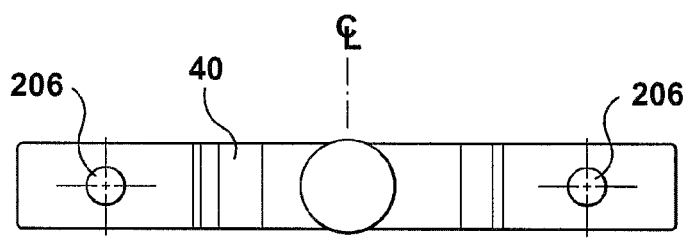
Figure 5F:
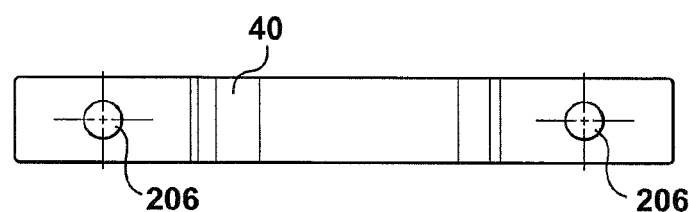
FIG. 5f is an opposite end view to that of FIG. 5e.
Figure 4F:
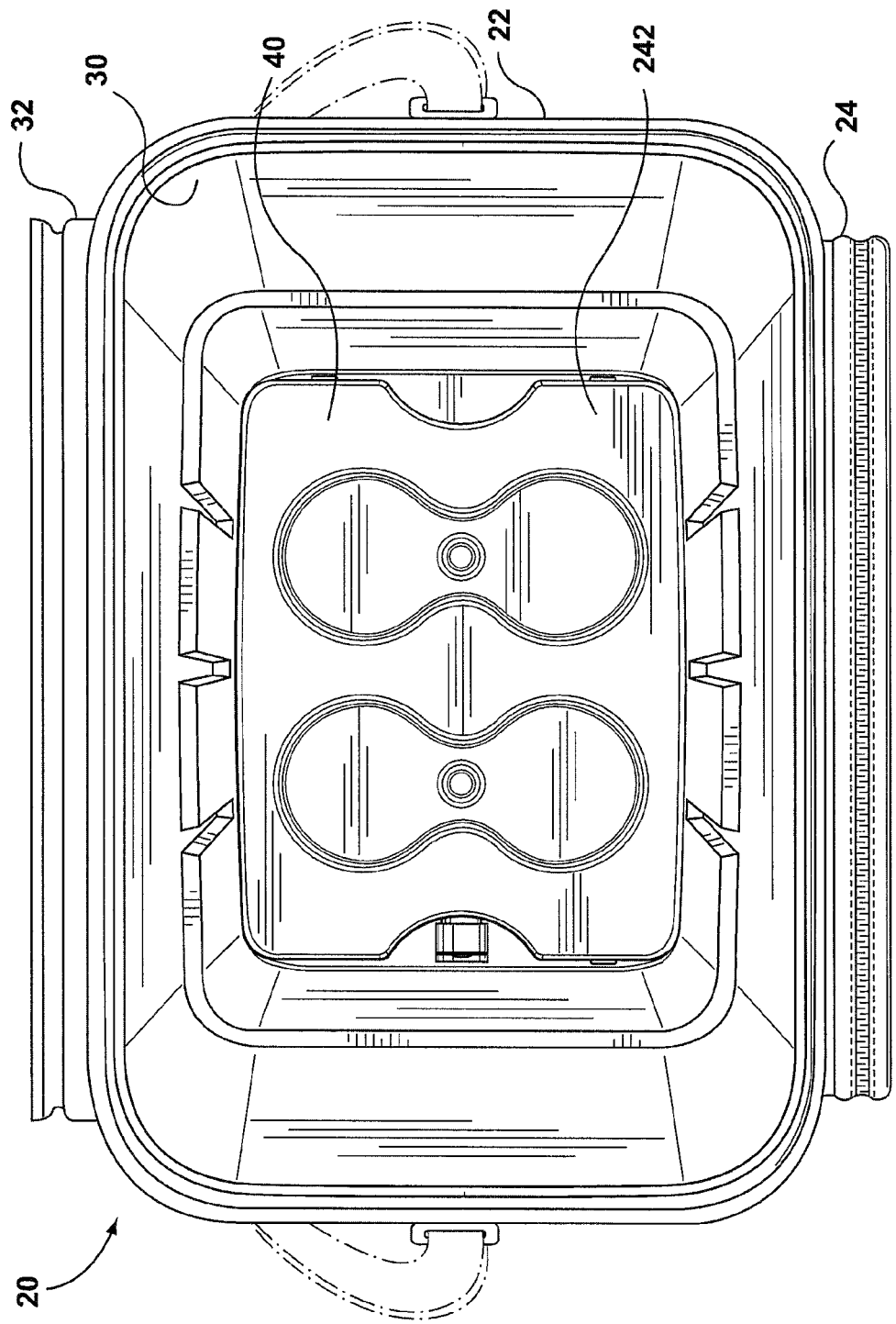

Further, where no internal thermal storage medium space is provided in lid 32, a different surround member 230 may be used as shown in FIG. 4d. In this instance, surround member 230 has an inclined inwardly facing wall member 232, in place of the straight wall, 200. In this example, as well, lid 32 is not provided with a thermally insulative layer such as insulating material 186, but rather, merely has an external fabric layer 234. That is, lid 32 may be insulated as in FIG. 4c, or uninsulated as in FIG. 4d. Lid 32 may have a surround member as in FIG. 4c, and no insulation, or, alternatively, lid 32 may have a surround member as in FIG. 4d with insulation.

In use, advancement of internal structural member 34 toward receptacle 30, as by pivoting motion about the fabric hinge joining lid 32 to rear panel 64, may tend to cause the progressive introduction of internal structural member 34, and most particularly, of peripherally extending seal fitting 210, into an interference fit engagement with the land region, 214, of the mouth of receptacle 30, just inside lip 118. As lid 32 is pushed further, more of seal fitting 210 engages land region 214, until there is, ideally, contact about the entire periphery of land region 214 and the entire periphery of internal structural member 34 at the contact interface of seal fitting 210 with land region 214.

When this occurs, bead 212 may tend to want to compress, and in so doing, a hoop stress may be generated in each of land region 214 and the outer wall 196 of internal structural member. This hoop stress, or peripheral, or circumferential stress, may tend to be a tensile stress in land region 214, and a compressive stress in outer wall 196, running in the peripheral direction. In an alternate embodiment, receptacle 30 may have a lip that engages a structural member of an alternate lid, otherwise generally similar to lid 32, on an inside, or inwardly facing peripherally extending wall, such that the land region of the receptacle would be in peripheral compression, and the engaging region of the lid would be in peripheral tension. It may also be noted that the surround portion of internal structural member 34 is, in effect, a short cantilevered beam extending perpendicularly to the plane of web 192 of lid 32 generally. Lateral external compression of bead 212 may tend to generate a resistive restoring moment couple in outer wall 196 (in tension in a direction perpendicular to web 192), and in corresponding compression in inner wall 200.

As may be noted, the interlace of seal fitting 210 with land region 214 is intended to be sufficiently tight that it may tend to resist re-opening. To that extent, the interface between lid 32 and the lower portion 22 of container assembly 20 may tend not to require a zipper, and may be zipperless, that is, free of any peripheral tracked fastener.

Thermal Storage Element 40

Thermal storage element 40 is shown in FIGS. 5a to 5f. Thermal storage element has a first, generally planar main side 240, and an opposed, spaced apart, generally parallel opposite main side 242. The margins of sides 240 and 242 are peripherally joined by side edge walls 244, 246, and end walls 248 and 250, these elements co-operating to form a hollow container having a space 236 therein for containing a thermal storage medium 238. In the preferred embodiment, this thermal storage medium 238 is water, whether hot, cooled, or frozen.

End wall 248 is a "filler end" wall, having a rebate, or relief in the nature of a cusp 252 of constant circular arcuate shape formed inwardly therein, and a threaded spout 254 moulded centrally in cusp 252, with a removable matingly engageable threaded cap 256 mounted on the spout. A user is thus able to fill thermal storage element 40 with water (or, indeed, with any other suitable thermal storage medium), to put thermal storage element in the freezer to freeze (or, alternatively, to put hot water, or other suitable heated thermal storage medium therein), and then, with cap 256 securely in place, to put thermal storage element in container assembly 20. A similar cusp 258 is formed in end wall 250 directly opposite cusp 252, and provides a ready hand engagement point, or hand hold, or grip, for disengaging thermal storage element 40 from internal structural member 34. As noted above, end walls 248 and 250 also have externally protruding nubbinses, or blisters, detects or stubs in the nature of male retention fittings 206 for engaging the corresponding female retention, or engagement fitting 202 of surround member 194. It will be understood that the male fittings could be formed on the surround, and the female fittings could be formed on the thermal storage element. As the fit between the male and female engagement fittings is an interference fit, the adjacent portion of the inwardly facing surround wall must be deflected (and against its biasing force), such that the fittings 206 and 202 may tend to snap in place when matingly seated. Removal is by reaching into cusp 258, and disengaging thermal storage element 40.

The obverse face (that is of opposite main side 240) of thermal storage member has a pair of recesses, or depressions 260 and 262 formed therein, the depression nave a waist 264 and arcuate end portions 266. Arcuate portions 266 are generally circular arcs, and have a diameter suited to accommodating the bottom of a beverage container, such as a bottle or a drink can. Thermal storage member 40 can act as a seat for drinks either when lid 32 is open, and supported in a generally flat position, or when thermal storage member is supported in some other relatively flat orientation, such as when mounted on the bottom of receptacle 30 or when seated on partition 46 in a generally horizontal shelf configuration. Alternatively, and quite conveniently, thermal storage member 40 can be removed from container assembly 20, and set on a flat surface, such as a table, and drinks placed on it, or, if laid on the other side (with recesses 260 and 262 facing downward) with appetizers or other foods kept warm or cool on top of member 40 as may be suitable.

It is not necessary that container assembly 20 employ thermal storage element 40 in the lid only. On the contrary, thermal storage element 40 may be placed upon partition 46, or upon the bottom of receptacle 30, as may suit the user. Furthermore, container assembly 20 may have two, or three or several, whether supplied with container assembly 20 as part of the kit, or as an additional accessory made separately available at the point of sale.

Figure 4G:
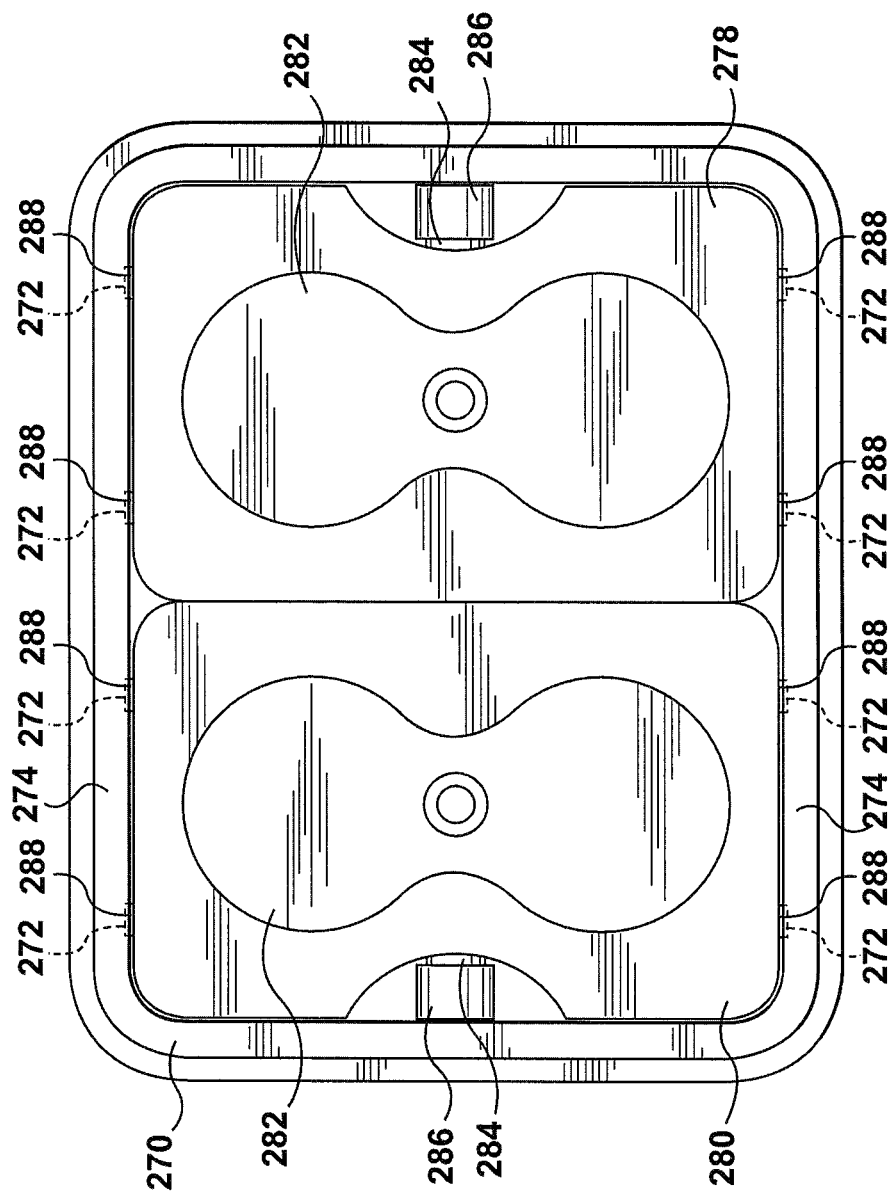
Figure 5A:
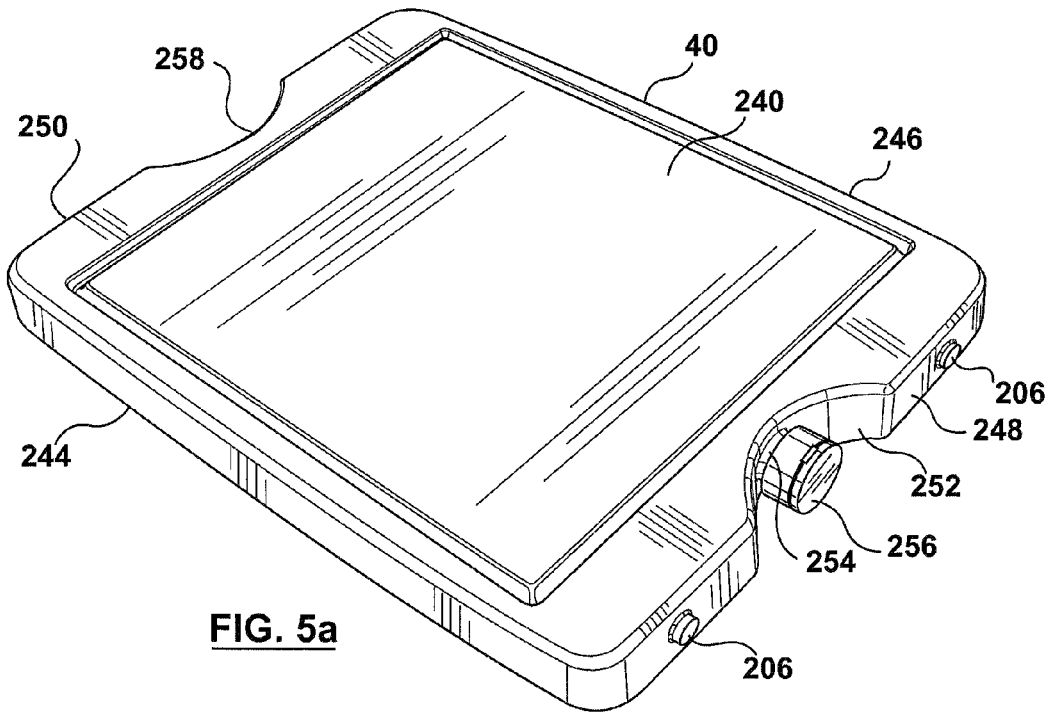
Figure 5B:
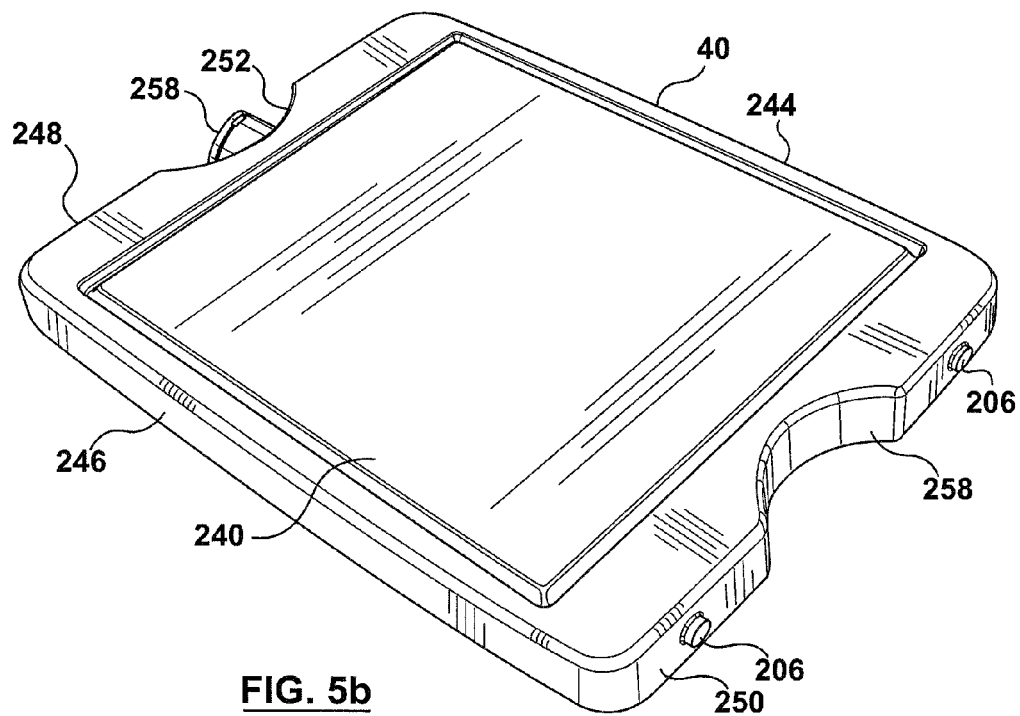
Figure 5C:
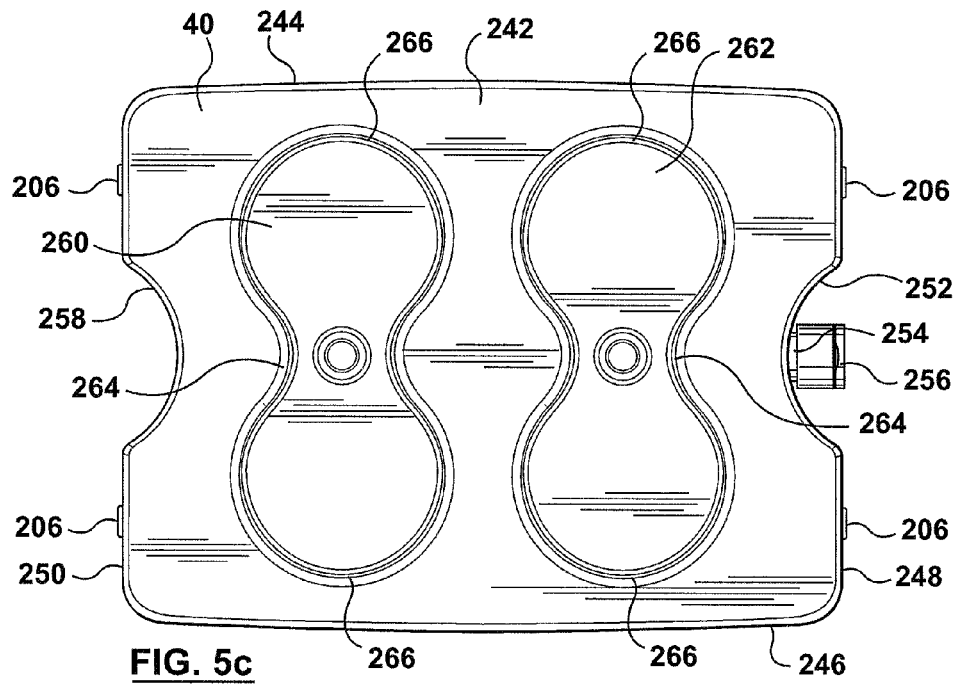
Figure 5D:
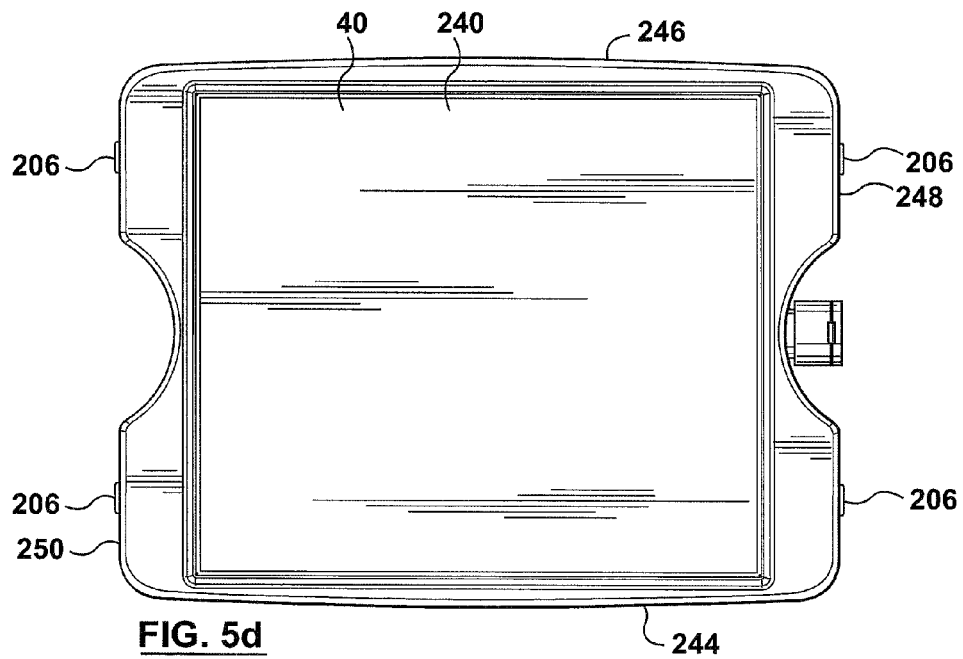

An alternate thermal storage member arrangement is shown in FIG. 4g, in which an internal structural member 270 for placement in a lid structure, such as lid 32, and otherwise similar to member 34, has female engagement fittings 272 along the long edges 274 of its rectangular, inwardly facing wall portion 276. In this instance two thermal storage members 278, 280 are provided in a snap fit, side-by-side configuration. Thermal storage members 278, 280 are substantially the same as thermal storage member 40 in terms of construction, and the shape and size of recesses 282, threaded filler spouts 284 and caps 286, however with male engagement fittings 288 being mounted transversely as compared to thermal storage element 40. The principle difference is that members 278, 280 are "half size" versions of storage member 40. The use of two thermal storage members permits one, or both, to be used in the lid; one in the lid and one in the bottom of receptacle 30, both in the bottom of receptacle 30, or one or another on a shelf formed by partition member 46. It may thus tend to offer greater flexibility of variable configurations. As with thermal storage element 40, more than two thermal storage elements could be provided.

Auxiliary Wall Structure 24

Auxiliary wall structure 24 includes an outwardly and upwardly extending flap 294, a side wall 296, and a tracked closure member in the nature of a zipper 298 operable to control access to the interior of the space 300 defined between flap 294 and side panel wall 296. Flap 294 has an arcuate, padded lower portion 302 having a first margin attached to front panel 62, near the juncture of front panel 62 with bottom panel 60. Padded lower portion 302 extends upwardly and outwardly from that edge to an arcuate lateral seam 304. A padded, generally planar (when not pulled open) upper portion 306 extends upward from the upper margin of lower portion 302. Upper portion 306 has an external mesh pocket mounted thereto. Side wall 296 is formed in a U-shape, having depending lower portions 308 that are mated to lower portion 302, upwardly extending side portions 310, 312, and a curved central portion 314 extending therebetween, the inner margins of items 310, 312 and 314 being sewn to the front face of front panel 62 of first insulated container portion 22, and the outer margins having one half of a tracked closure member, in the nature of zipper 298 mounted thereto, for co-operation with the other half of zipper 298 that is mounted to the upper margin of flap 294, to whose shape the outer margins of items 310, 312, 314 conform. Upper curved central portion 314 has an eyelet 318, of two overlapping flaps to admit an electronic jack, or plug 320, of a head set such as may be plugged into an entertainment unit, which may be a music playing device, such as device 322, which may be a CD player, a cassette player, a portable radio, or, as in the preferred embodiment, an entertainment unit combining all three capabilities. An internal pouch 324 having an elasticised upper lip 326 is provided for receiving the entertainment unit, and such cassettes or compact discs as may be desired by the user. Alternatively, item 324 may have an internal space 330 suitable for accommodating knives, forks, spoons, napkins, and other items such as may be desired for a picnic. Internal gussets 332 extend between the lateral margins of pouch 324 and the opposed margins of front flap 294 acting to limit the extent to which flap 294 can be opened, and thereby discouraging it from opening to such an extent that objects contained therein may too easily fall out. The termination points of zipper 298 extend to a lower height than the upper margins of gussets 332. A generally triangular lifting lug is mounted to front panel 62 adjacent to eyelet 318. While item 324 is not thermally insulated, flap 294 is fabricated with an internal layer of rubberized padding that is intended to provide a measure of protection against rough handling to such electronic equipment or other objects as may be carried therein.

Alternate Lid Surface

Figure 6A:
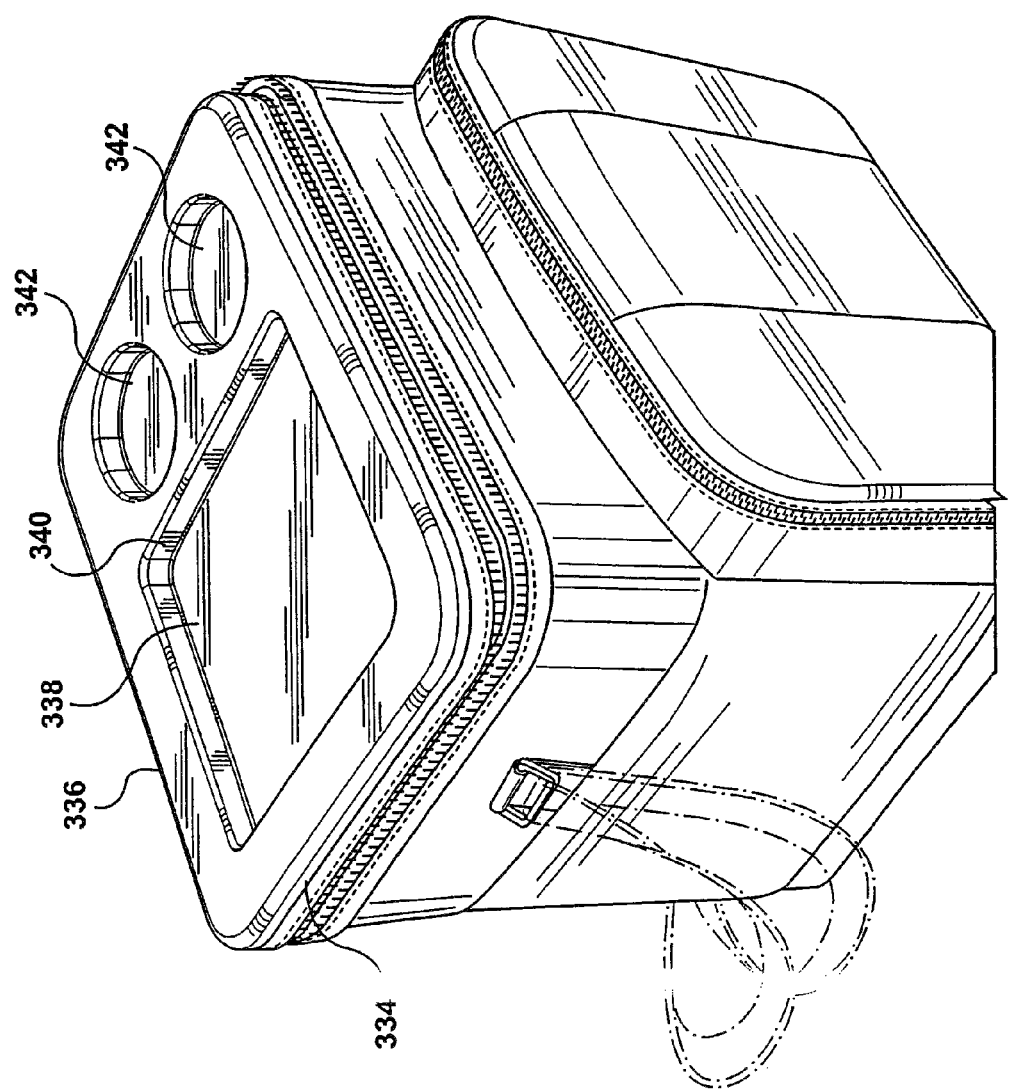
Figure 6B:
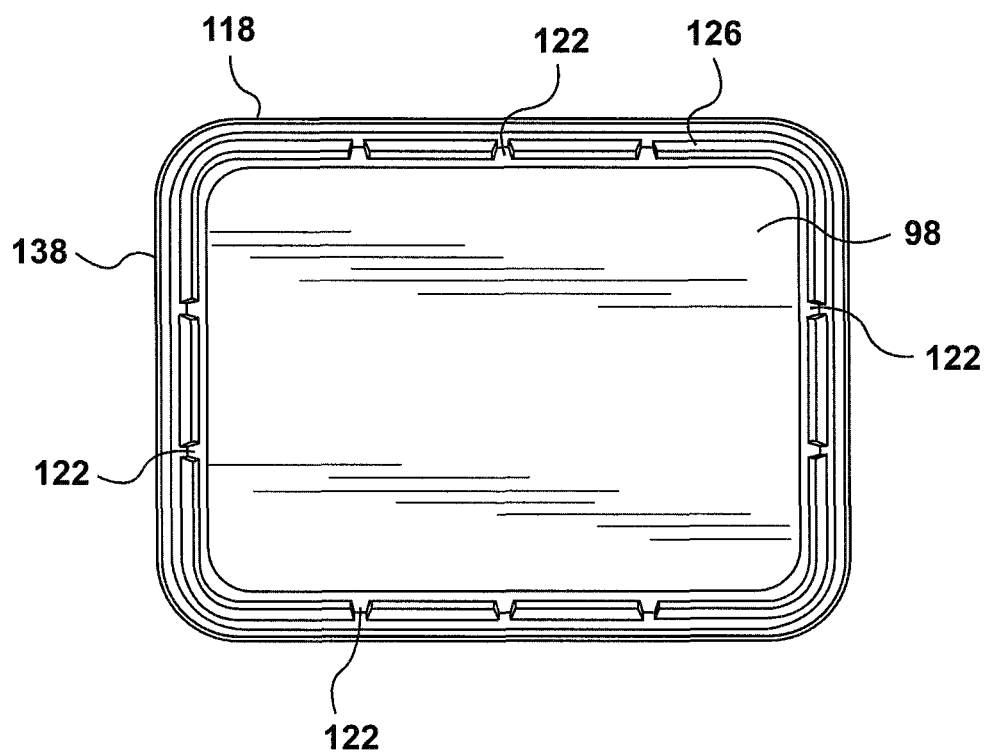
Figure 7A:
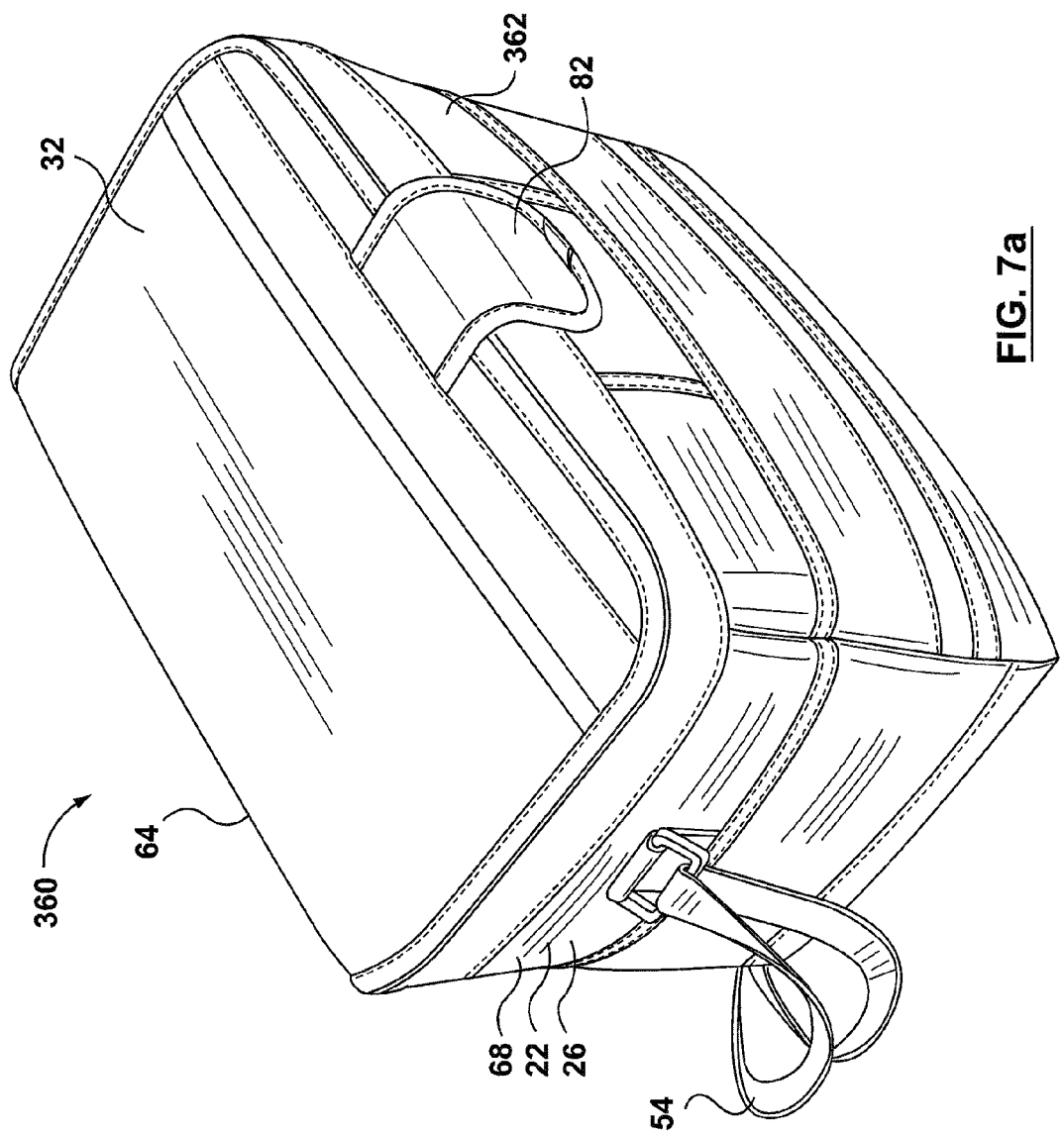
Figure 7B:
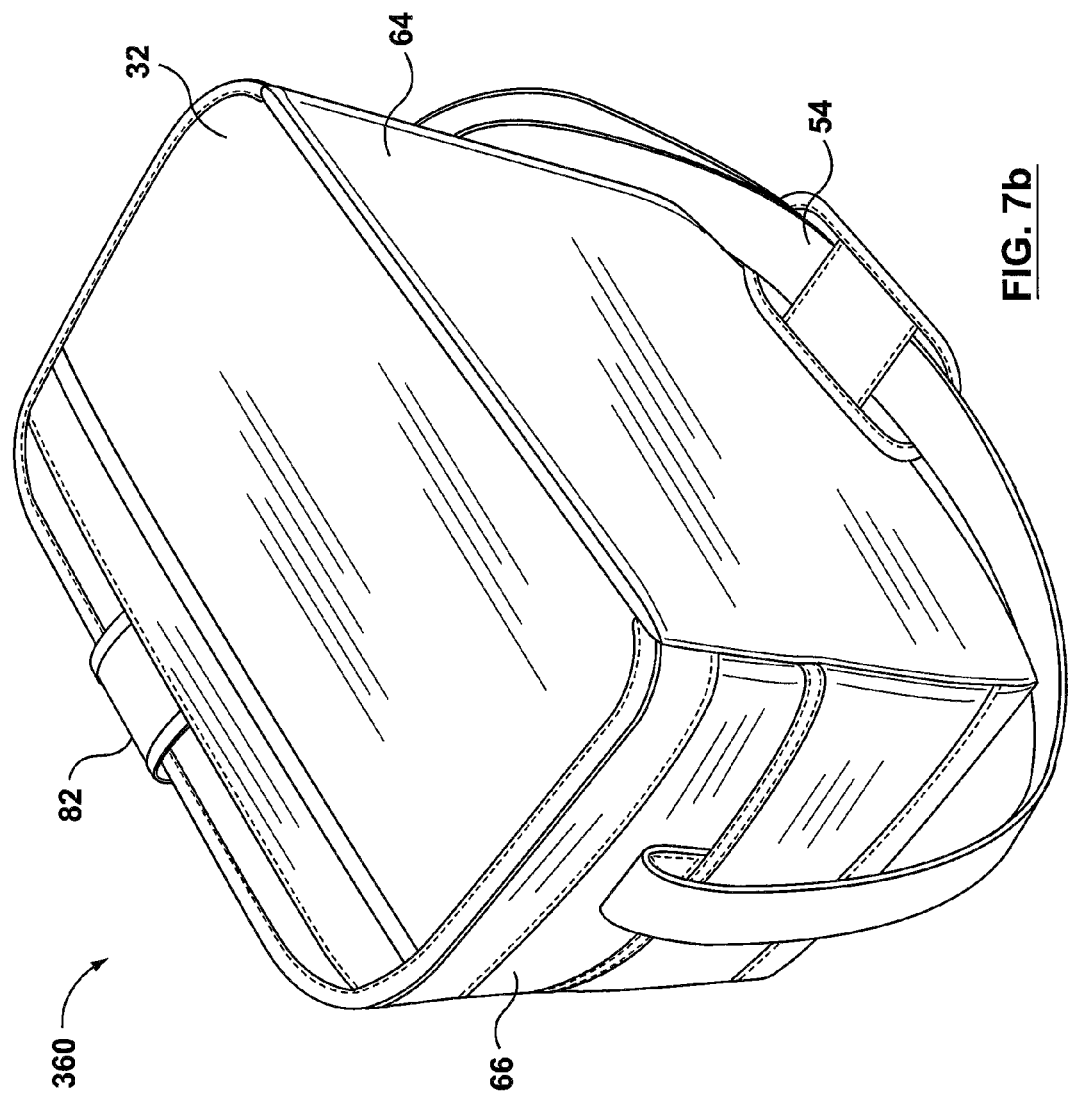
FIG. 7b shows a perspective view of the container assembly of FIG. 7a taken from the opposite upper diagonal prospect.
Figure 7C:
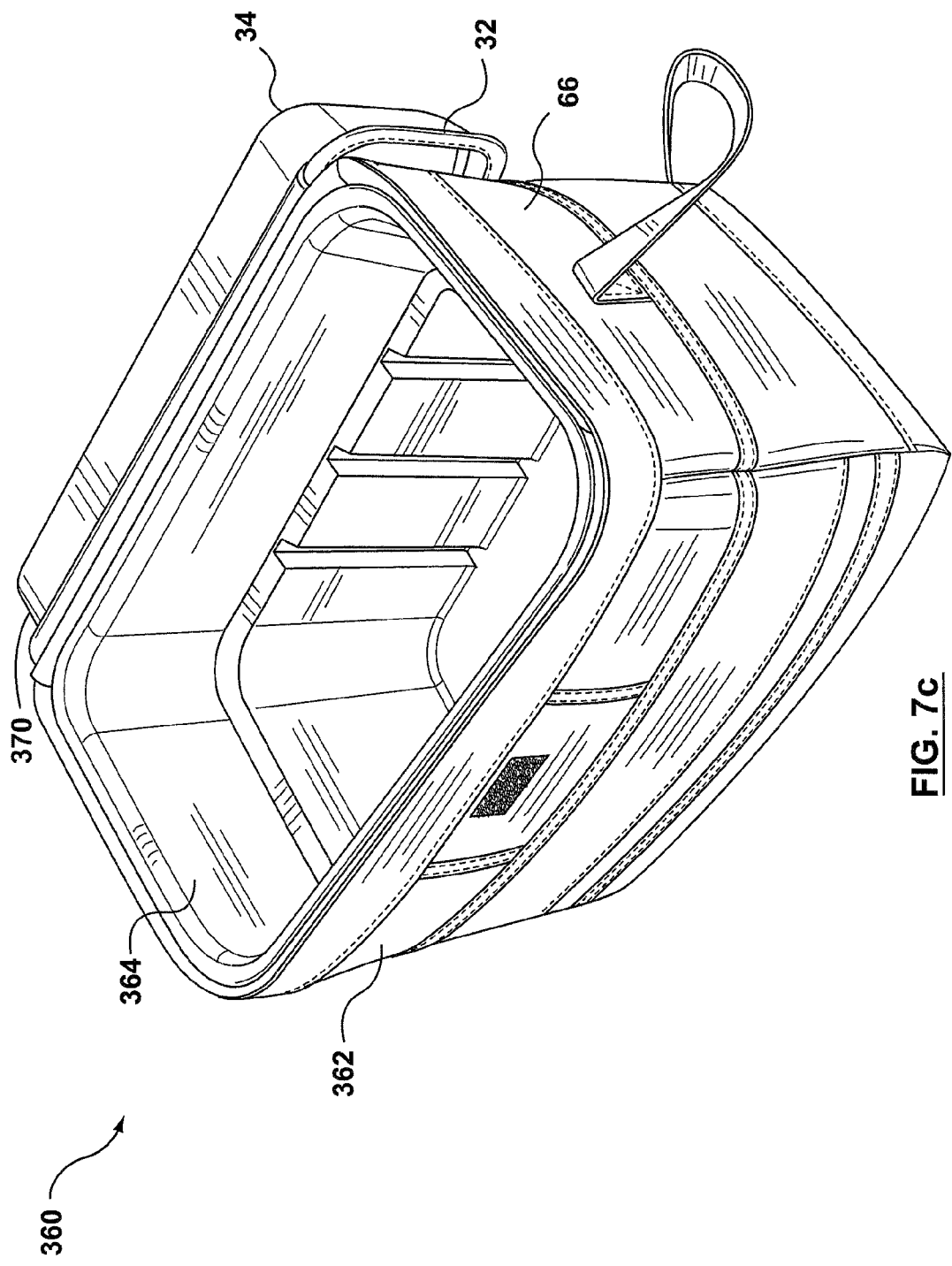
FIG. 7c shows a perspective view from the front right corner, and above, of the container assembly of FIG. 7a in an open condition.
Figure 7D:
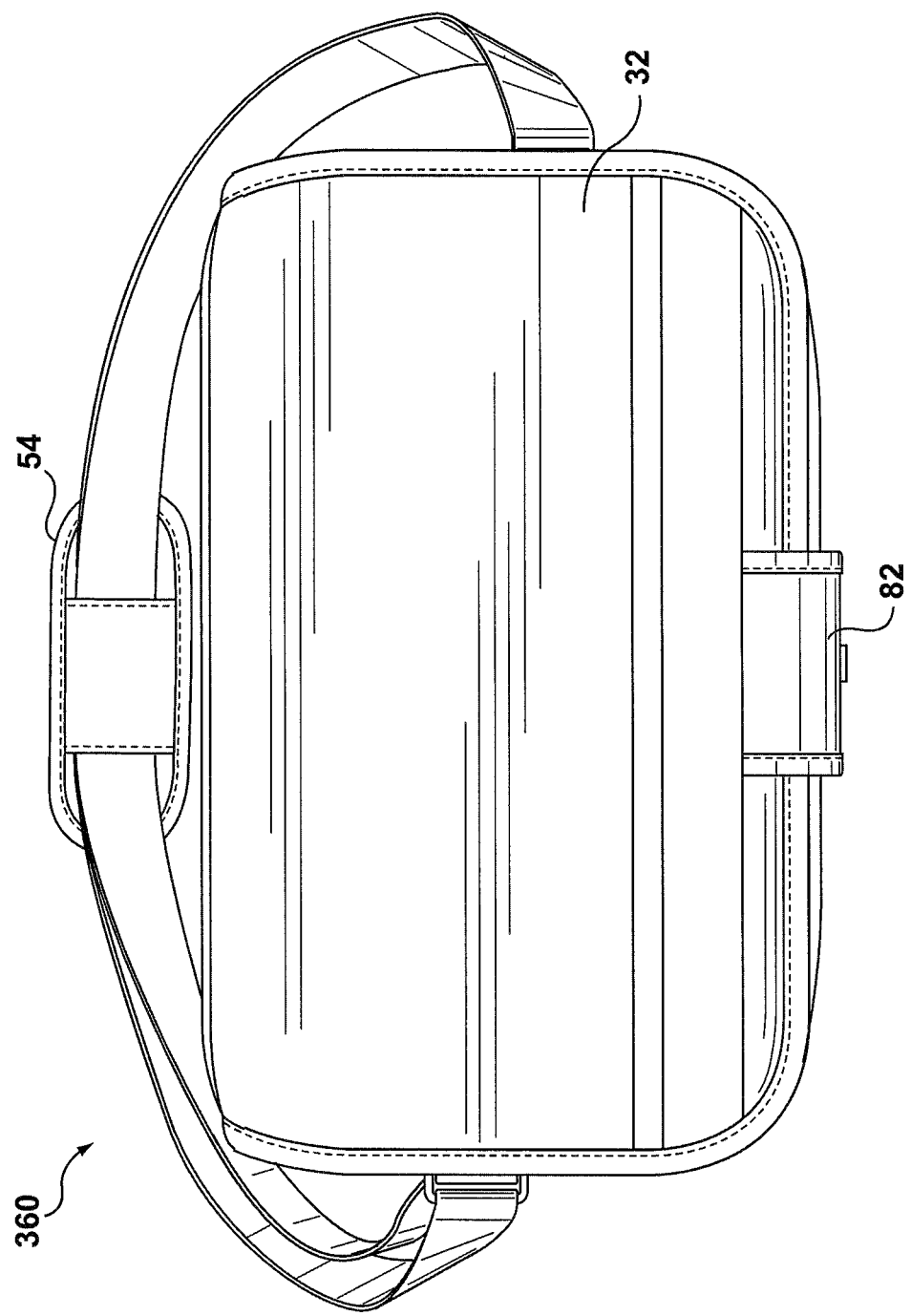
Figure 7E:
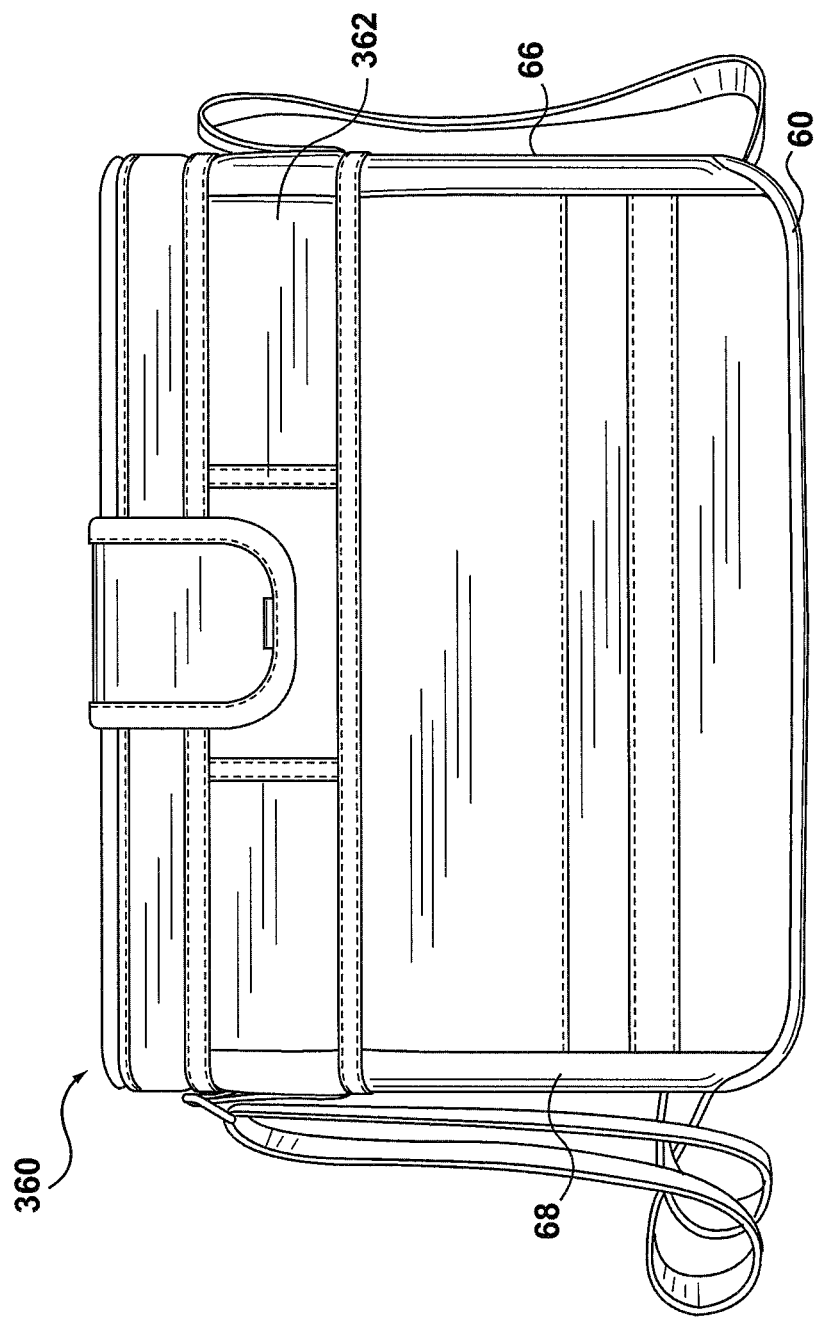
Figure 7F:
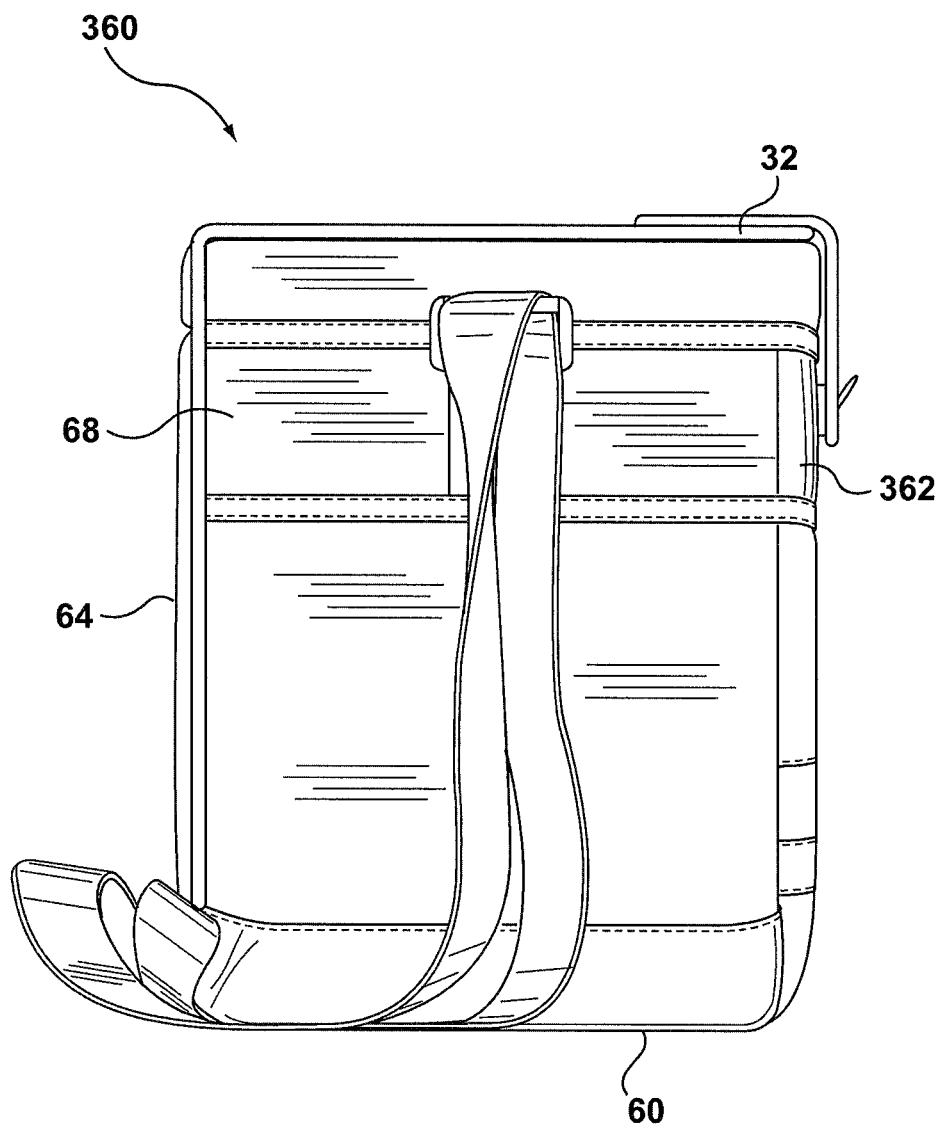
Figure 7G:
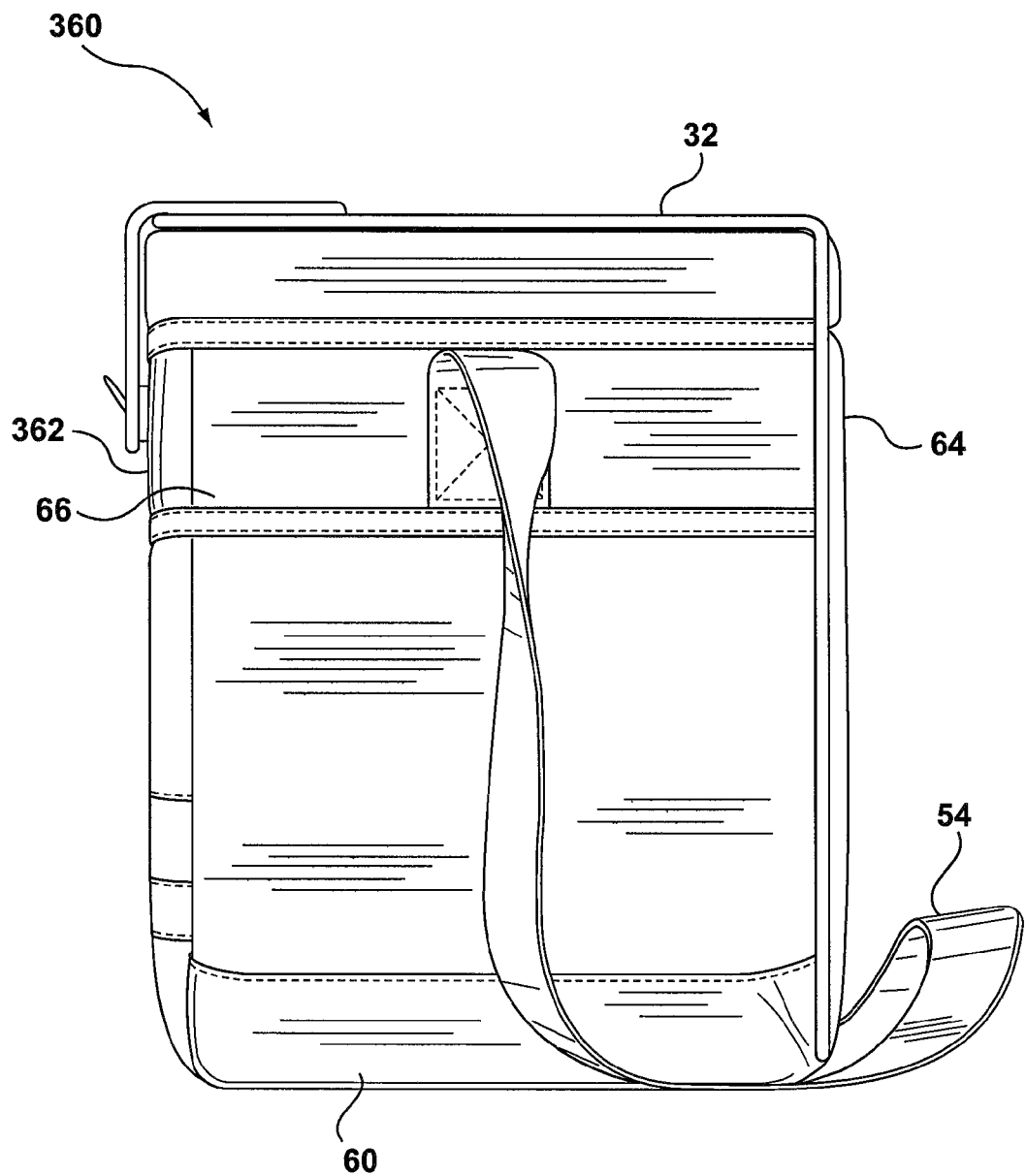
Figure 7H:
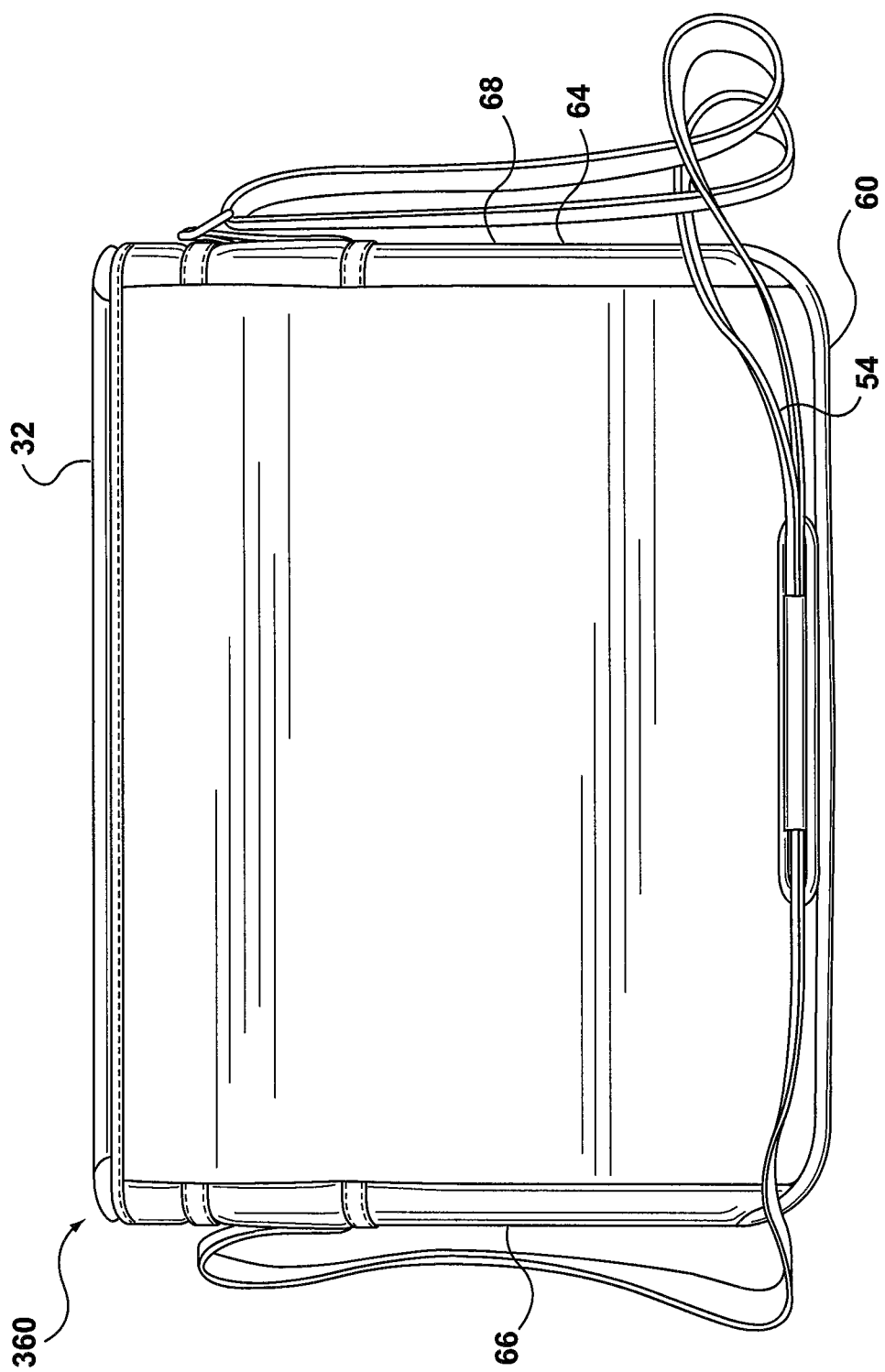
Figure 7I:
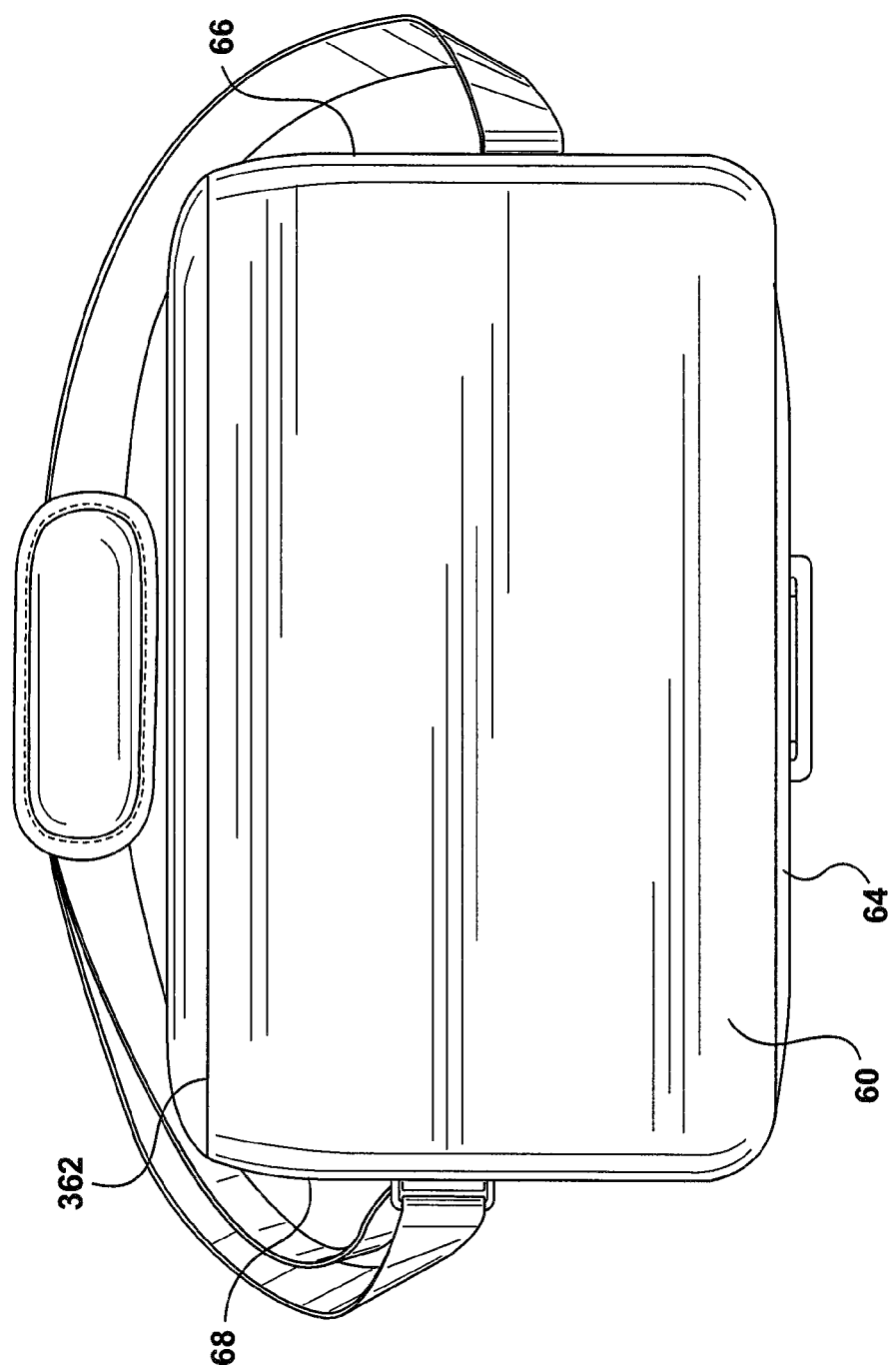

Lid 32 may have the structure shown in FIG. 4c or 4d, or some combination thereof, or, alternatively, may have the structure of alternate lid 334 shown in FIG. 6a. In this instance, rather than using a relatively low density closed cell foam, as in FIG. 4c, a relatively high density, relatively stiff molded foam is used to yield a generally rectangular table top portion 336 in the nature of a recess 338, having a quadrilateral four sided (preferably square or rectangular) peripheral containment wall 340 such as may tend to discourage objects from sliding away, even if lid 334 is not precisely level, or if container assembly 20 is bumped or jostled, or carried in an automobile. Lid 334 also has a pair of circular recesses, or depressions 342, having annular sidewalls that may, again, tend to serve to steady a beverage placed thereon. Such a lid as 334 may provide a convenient containment surface for foods and beverages at a lunch stop or picnic. In a preferred embodiment, recess 338 may be roughly 6" (+/−) long-.times.6" (+/−) wide by about ½" (+/−) deep, and depressions 342 may be about ⅜" (+/−) deep, and may be sized comfortably to receive a 12 oz (385 mL) drink can.

FIGS. 7a to 8h

FIGS. 7a to 8h show views of an alternate embodiment of a container assembly to that of FIG. 1a. Container assembly 360 is substantially similar to container assembly 20, and to the extent that they share common features, those features are given common items numbers, although they may differ in size, shape, or aspect ratio. Soft-sided insulated container assembly 360 may differ from container assembly 20 in that container assembly 360 may have a clear front wall panel 362 that does not have an auxiliary wall structure, such as auxiliary pouch 24 mounted thereto. Further, while container assembly 360 may have a receptacle 364, and a multi-position removable pliable divider, identified as partition 366, and a mating lid 368 having a seal member 370 engageable with the land region 372 adjacent to the lip edge of the mouth of receptacle 364, container assembly 360 may not include a removable thermal storage element similar to removable thermal storage element 40 described above.

It may also be noted that container assembly 360 has a different aspect ratio from container assembly 20, being roughly twice as wide along the long face as along the short face when viewed from above. Partition 366 is an asymmetric divider having a first panel portion 374 of roughly half size, a second panel portion 376 hingedly adjacently connected thereto of roughly one quarter size, and a further end portion 378 hingedly connected to portion 376 and having two apertures 380 similar to those described above.

In an alternate embodiment, a thermal storage element of corresponding aspect ratio, otherwise like thermal storage elements 278 or 280, may be installed in removable engagement in lid 368, in a manner analogous to that described above. Whether or not such provision is made, thermal storage elements akin to thermal storage element 40 may be place within container assembly 360, either at the bottom of the receptacle, or mounted on partition 366.

FIGS. 9a to 9l

A further alternate embodiment of container assembly is shown in FIGS. 9a to 9j. In this embodiment, a soft sided, insulated container assembly is indicated generally as 400. Container assembly 400 has a base, identified as bottom panel 402, an upstanding sidewall 404 having a front panel 406, a rear panel 408, a right hand side panel 410, a left hand side panel 412, and a top panel functioning as a hingedly attached lid 414. A secondary, or auxiliary wall structure 416 is mounted to front panel 406 in the same general manner as auxiliary wall structure 24. The wall structure of panels 402, 406, 408, 410, and 412 is generally as described above in the context of container assembly 20.

Figure 9A:
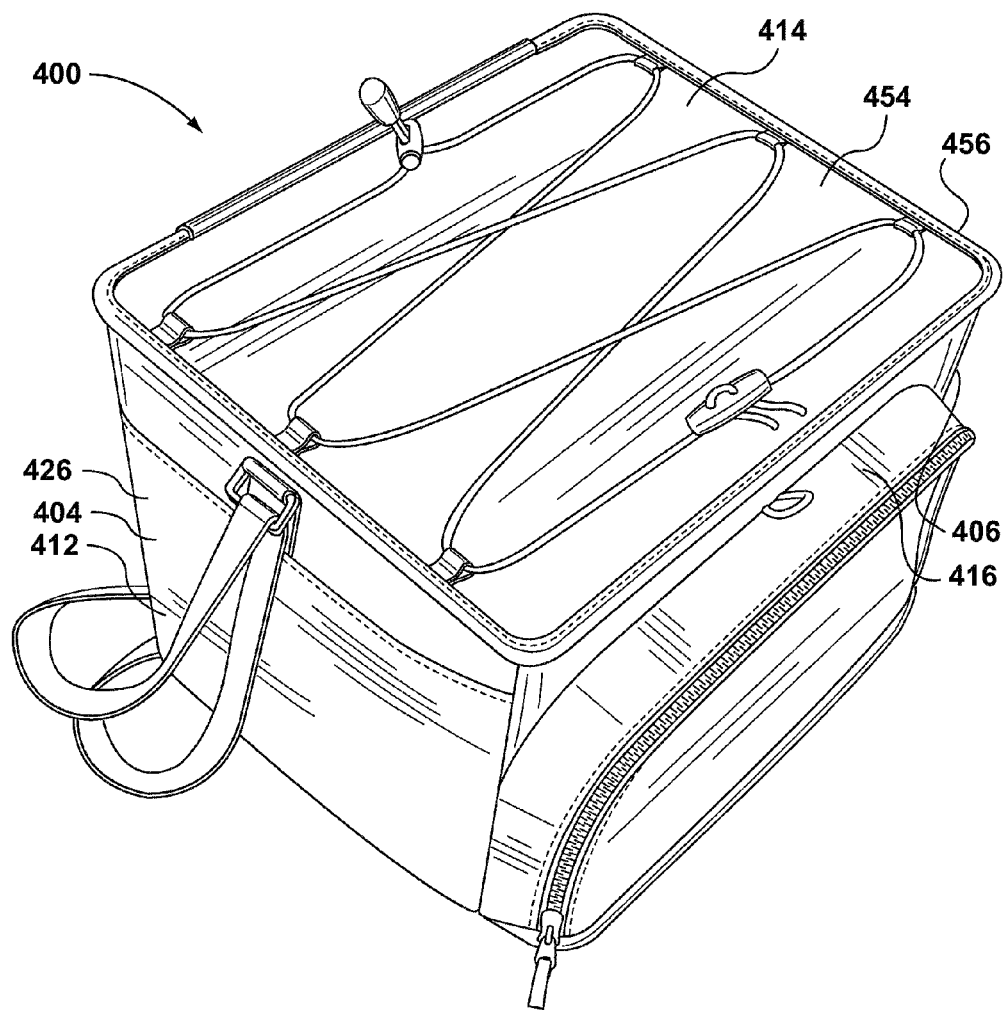
Figure 9B:
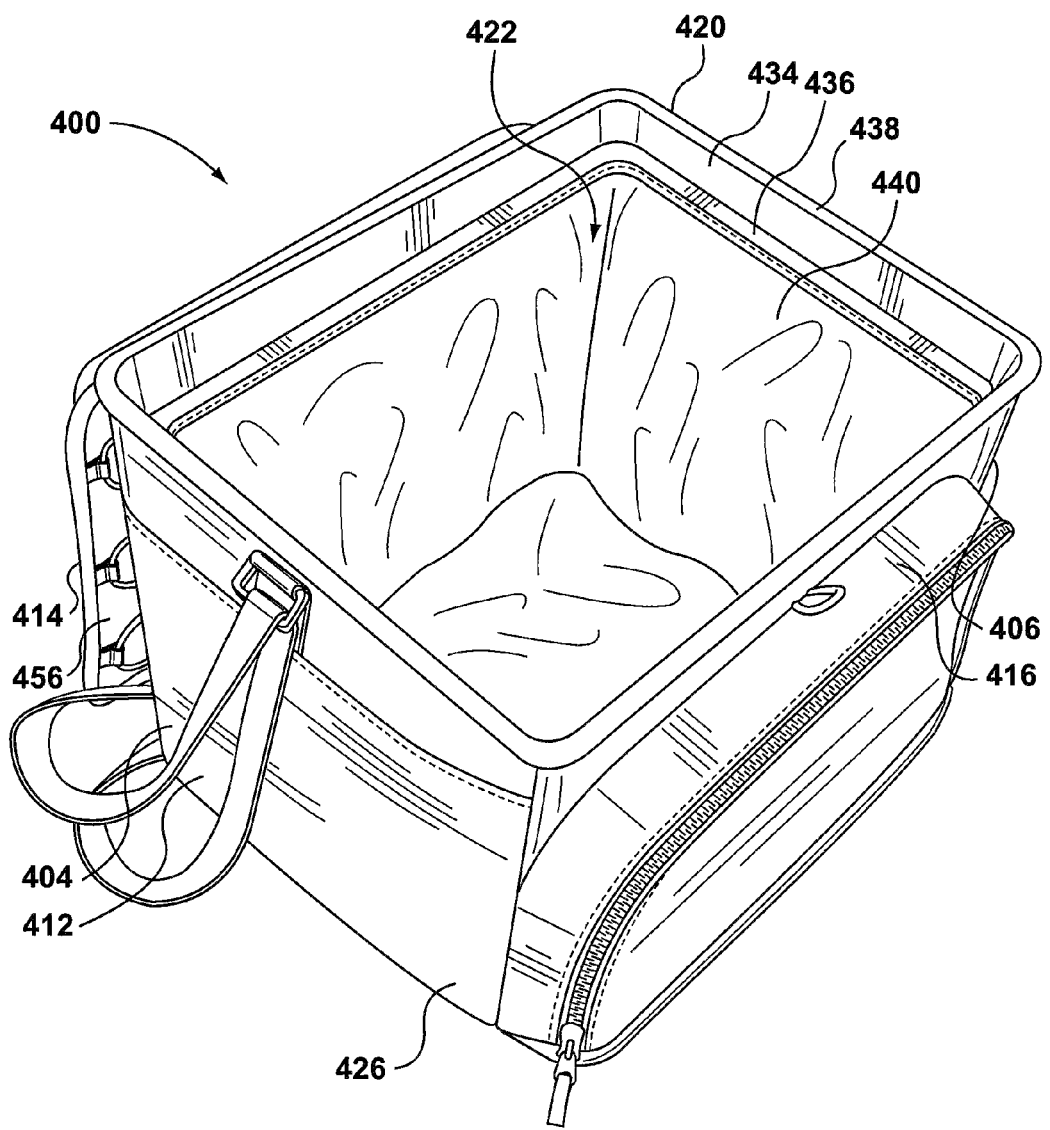
FIG. 9b is a perspective view from above, in front, and to one corner of the container assembly of FIG. 9a in an open position.
Figure 9C:
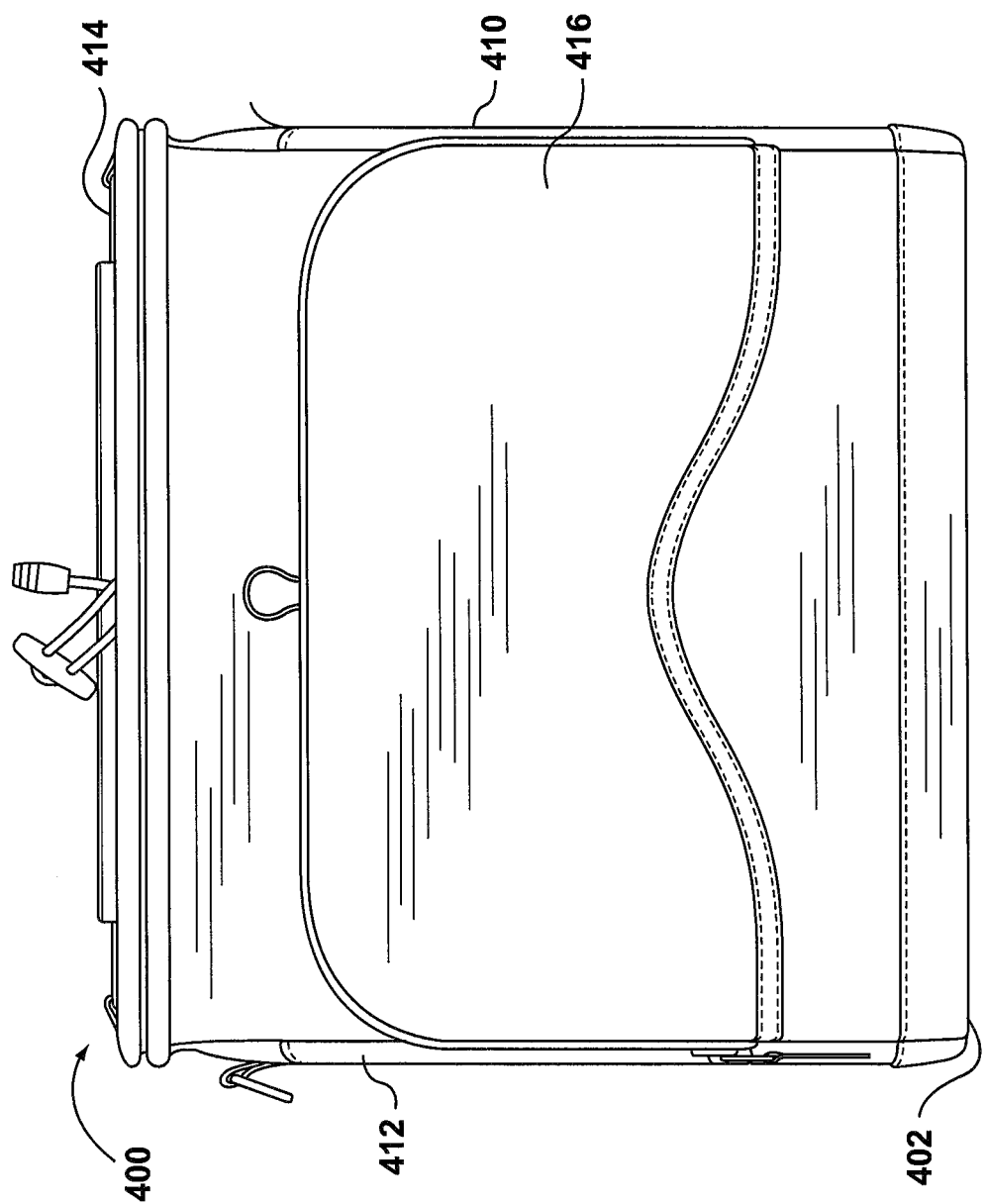
Figure 9D:
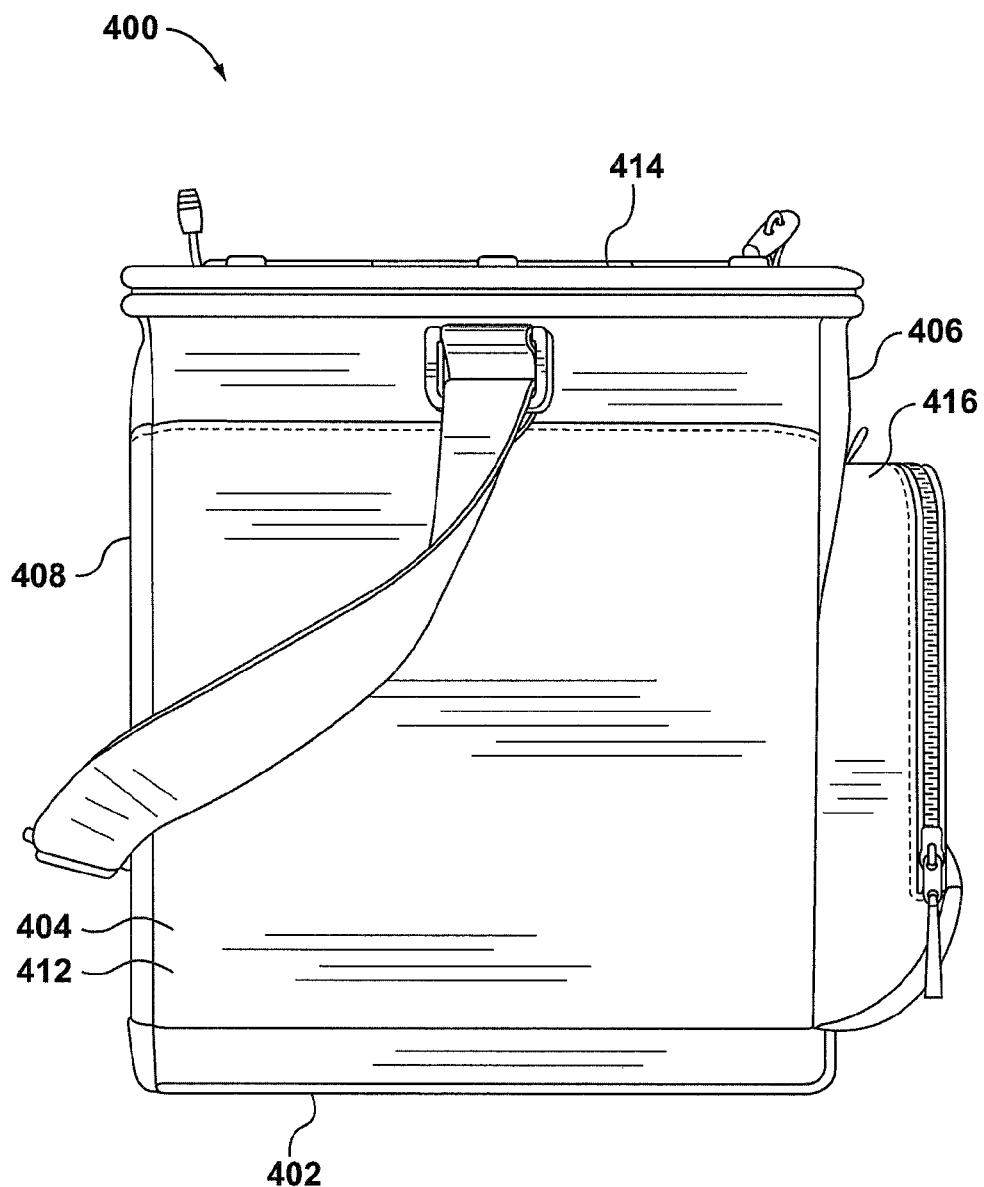
Figure 9E:
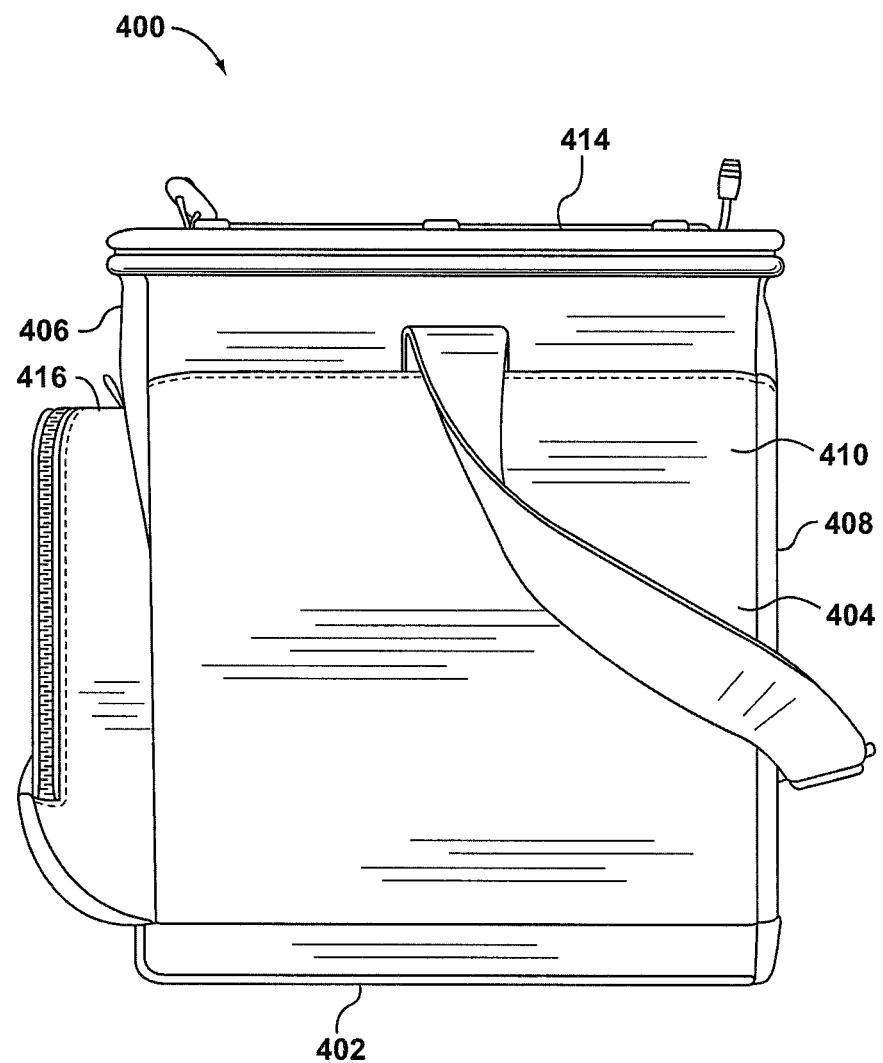
Figure 9F:
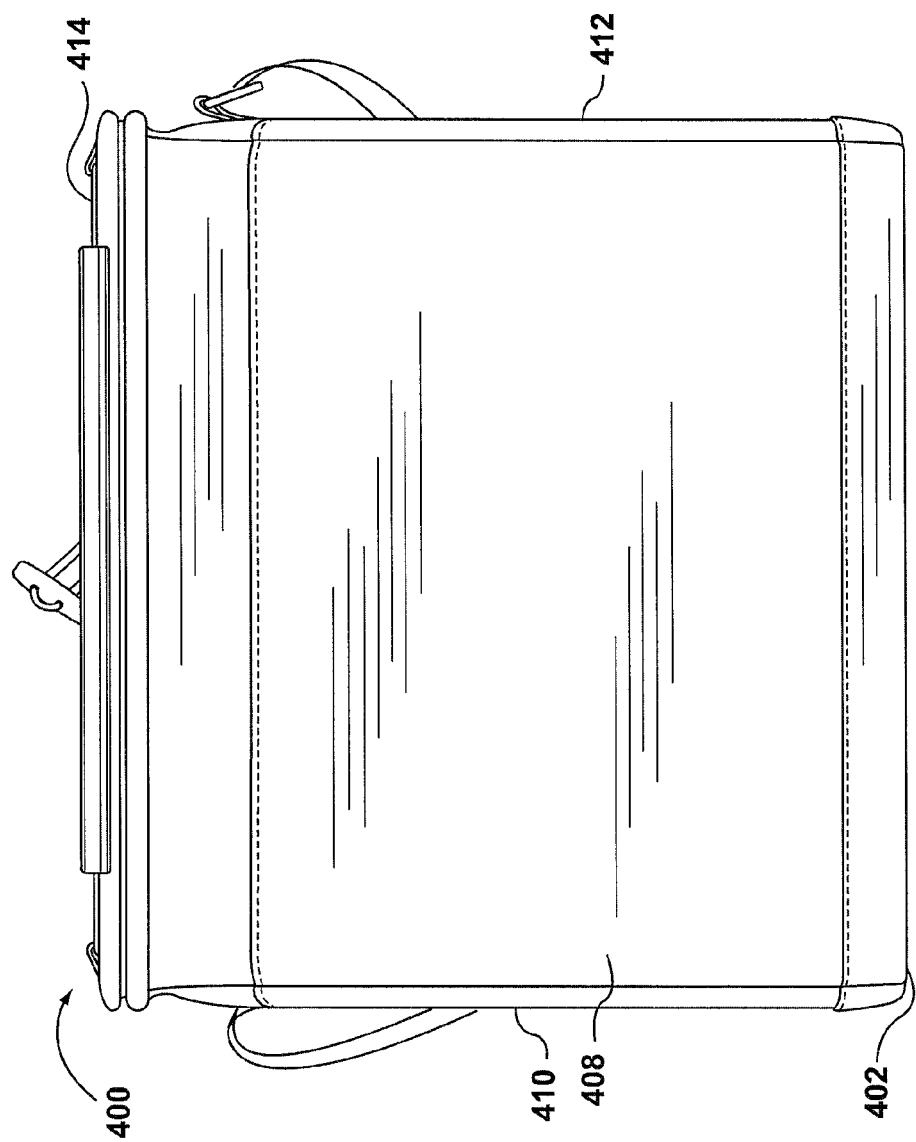
Figure 9G:
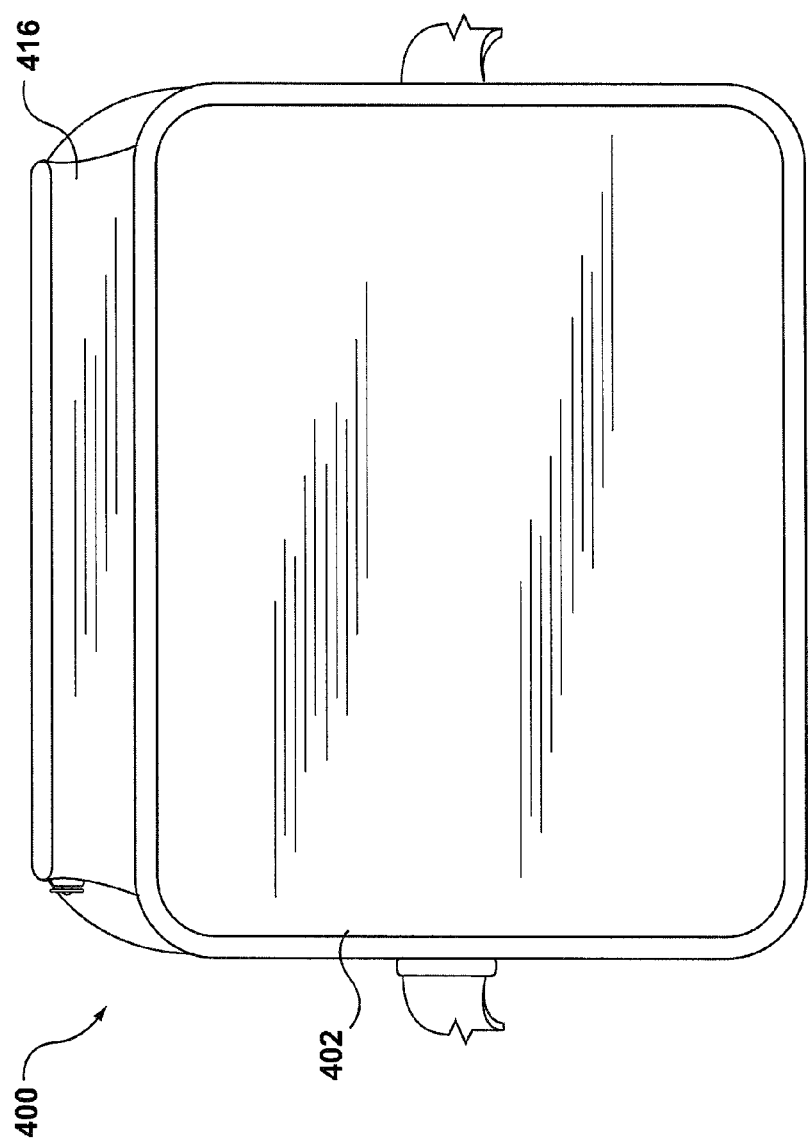
Figure 9H:
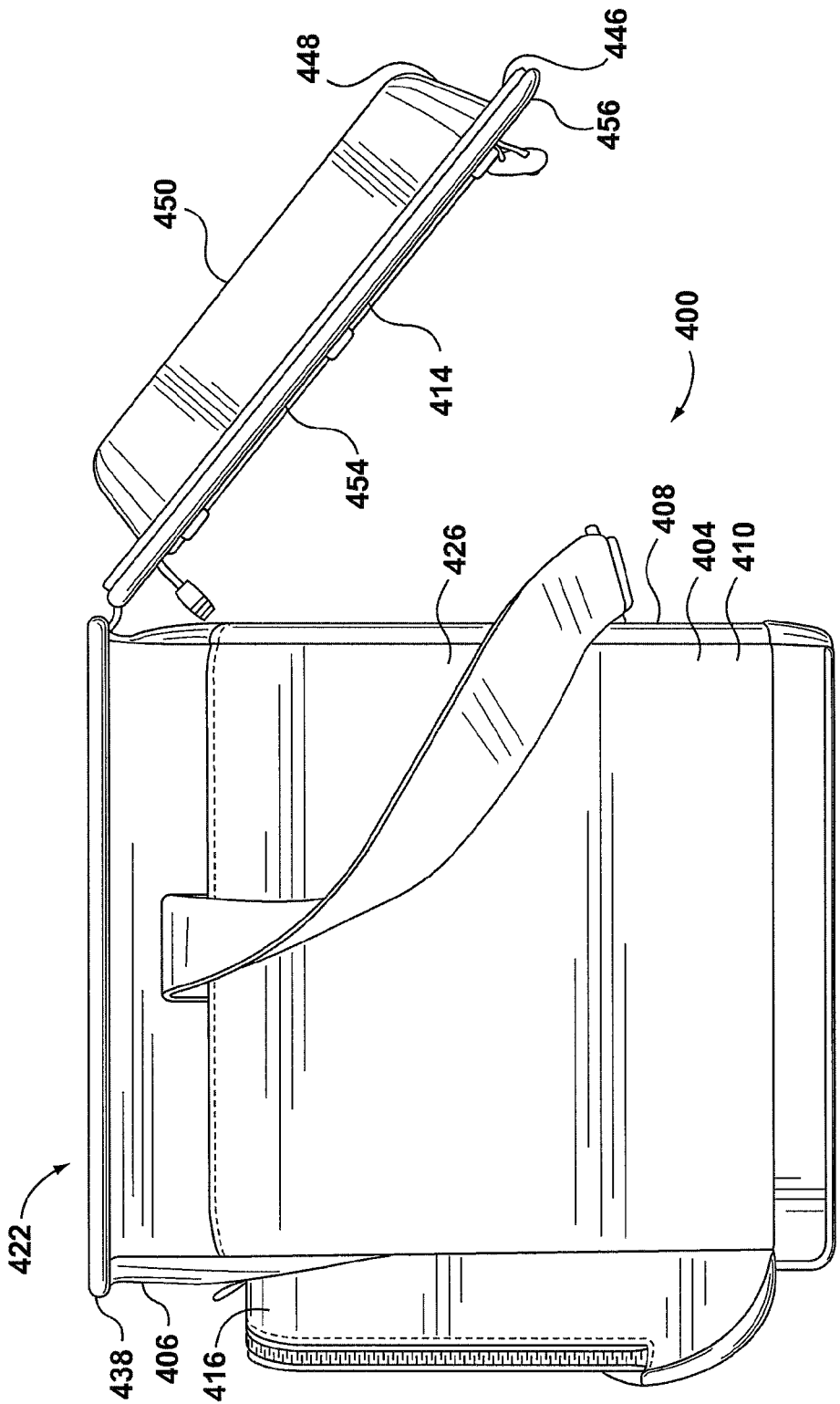
FIG. 9h is a side view of the container assembly of FIG. 9a in an open position.
Figure 9I:
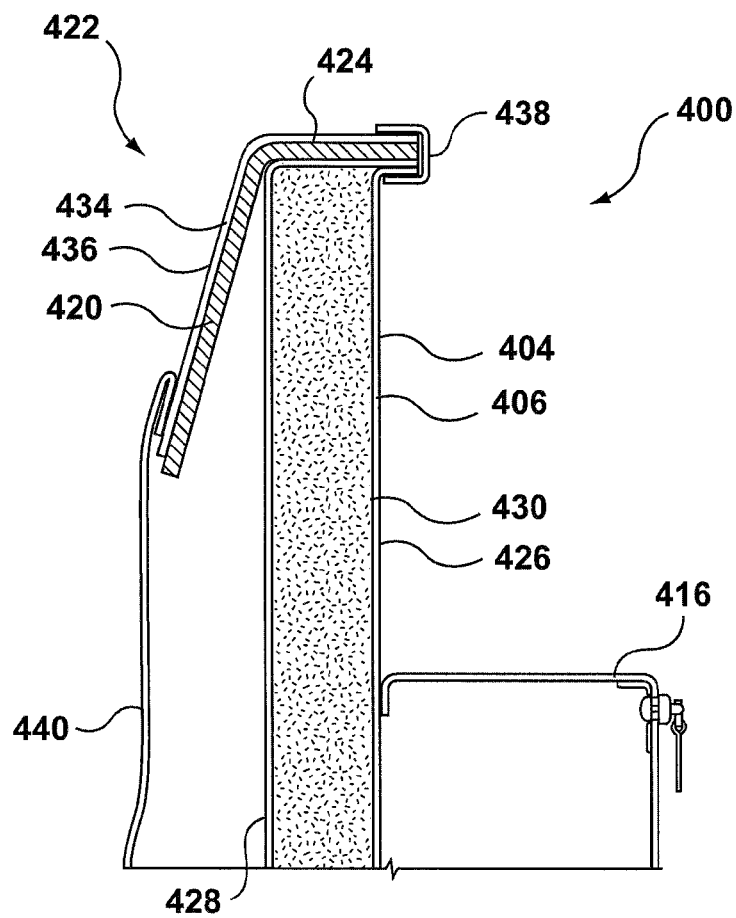
Figure 9J:
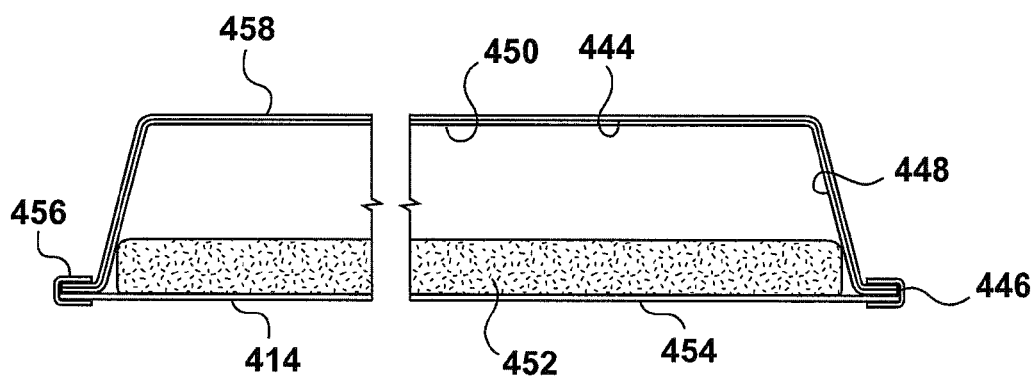

However, rather than having a rigid, molded, water holding internal receptacle, such as might be generally similar to receptacle 30, container assembly 400 has a peripherally running, inwardly extending reinforced cuff 420, that is generally rectangular in plan view to conform to the generally rectangular opening 422 defined by the upper edges of wall panels 406, 408, 410, 412. In cross-section as seen in FIG. 9i, cuff 420 has a first, generally horizontal, relatively short leg 424 that surmounts the underlying wall structure, that wall structure having an outer layer, or covering 426, typically of a relatively durable wear resistant woven nylon, an internal layer or covering of vinyl, 428, and a closed cell thermal insulation layer 430 sandwiched between the inner and outer layers. It should be noted that the thicknesses of the various layers are exaggerated in FIG. 9i for the purpose of illustration. Cuff 420 also has an inwardly and downwardly extending skirt, or inner leg 432. Leg 432 is relatively long as compared to leg 424. Leg 432 may have a slope of the order of between 4:1 and 10:1 in terms of rise over run, such that a tapered, or convergent opening is formed, defining a peripherally extending land, or land region, 434. Cuff 420 may typically be made of a substantially rigid material, such as molded plastic. A coarsely woven covering 436 is stretched to overlie cuff 420, and is secured about its outer peripheral edge at a seam driven through an external edge trim bead 438, covering 436, the distal margin of leg 424, and the edges of inner and outer layers 426, 428.

A flexible, waterproof liner 440 is seamed to covering 436 at a mid-level position, and hangs downwardly over the lower margin of cuff 420, the lower region of liner 440 conforming to the generally rectangular box defined between the sidewall panels, and resting upon base panel 402. Liner 440 may typically be made of relatively thick waterproof vinyl, and covering 436 may tend to be made from a relatively coarse, relatively high friction woven material which may be cotton, or a cotton blend.

Lid 414 includes a molded structural reinforcement member 444 having a generally rectangular form in plan view with a generally planar peripheral edge portion 446, a tapered transition wall portion 448, and a generally planar rectangular central portion 450 that may lie in a plane parallel to the plane of edge portion 446. The resultant shape may tend to resemble a rectangular pan with turned up edges and a peripheral lip. An optional layer of closed cell thermal insulation 452 may be placed inside the pan, and an external covering layer 454, which may typically be of woven nylon, to which the insulation may be mounted, may be stretched over the pan, and secured to edge portion 446 by a seam driven through the edges of peripheral bead 456, layer 454, and edge portion 446. Also secured by bead 456 is a relatively rough, coarsely woven inner lid covering 458, such as may be made of a rough fabric material such as coarse cotton, or a blend thereof.

In use, the corresponding mating tapered faces of transition wall portion and leg 434 may tend to engage in an interference jamming fit, like a wedge, or cork, or stopper, in the mount of a bottle. This tendency is enhanced by the use of the roughened surface coverings, that are intended to provide a relatively high level of friction between the surfaces and therefore a tendency to resist, somewhat, the tendency to open unduly easily. In this case the land is, as indicated, merely a cuff of suitable size and location to engage the interfering, protruding bull nose of the lid.

In an optional, alternate embodiment, lid 414 may be provided with a formed plastic peripheral bezel member suitable for receiving a removably engageable thermal storage 30 element, such as removable thermal storage member 40, described above.

FIGS. 10a-10h

In FIGS. 10a to 10h, a container assembly is identified as 460. Container assembly 460 is similar to assembly 20, to the extent of having a soft-sided shell of insulated construction, having a front wall 462, that may also be a top wall when container assembly 460 is lying on its back to be opened, a rear wall 464 that may also be a bottom wall when container assembly 460 is lying on its back, and a generally rectangular sidewall 466 that has left hand and right hand short sidewall portions 468, 470 and top (when carried) and bottom (when carried), first and second long sidewall portions 472, 474 that co-operate to form the four-sided shape, with generous corner radii. A handle 476 is mounted to the top sidewall portion, i.e., first long sidewall portion 472, to permit container assembly 460 to be hand carried. Handle 476 may have a detachable ad re-attachable release member, such as quick release 478, shown in separated condition in FIG. 10a, and connected in FIG. 10b. An hinge, 480, such as may be a fabric or web hinge, runs along the frontward vertex of long sidewall portion 474 and is connected to margin 482 of front wall 462, such that front wall 462 may be disengaged about three of four sides, and swung open subject to the operation of hinge 480. An opener, grip, or pull, which may be in the nature of a tongue, or pull tab 484 may assist in opening the lid, namely front wall 462 away from the remainder of the insulated sidewall portions, thereby yielding access to the interior chamber 486. The inside, or underside, however it may be called, of the distal portion of tab 484 may include a releasable fastener, which may be a hook and eye fastener, such as one of a mating pair of VELCRO strips, the mating strip, or patch 490 being mounted to first long sidewall portion 472 in the region lying within the span of the bail of handle 476. The mating hook and eye portions may function as a releasable attachment or securement, or latch member, such as may, when mated together, further discourage disengagement of the friction fit interface.

Container assembly 460 includes a pair of matingly engaging peripheral wall portions. Those portions may include a female land 492, which may be in the form of a debouchment, or mouth, or rim 494 of a substantially rigid (as compared to the insulated soft sided wall portions) structural member such as a liner in the nature of a receptacle or bin, or tub, however it may be called, such as may be identified as item 496. Rim 494 may be opposed by a male closure of securement member 498 in the nature of a front panel reinforcing peripheral member 500. Member 500 may include a bezel-like upstanding (which is to say, standing out of the plane of front wall 462 generally) peripheral interference fit engagement member 502, which may have a peripherally outwardly facing fitting, such as an interference bulge or detent 504, such as may tend to encourage a positive interference between the two mating members, and which may co-operate with an opposed, corresponding detent feature, such as a relief or cusp 506 in the surrounding land 508 (see detail of FIG. 10j, when parts are forced together in the direction of phantom arrow 'A'. FIG. 10j also shows an embodiment of wall structure. As may be noted, the wall structure includes the substantially rigid liner member 510, and the external soft-sided insulated wall having an inner skin 512, an insulated layer, 514, and an outer skin 516. This wall structure may also include a further outer protective layer of heavier, scuff resistant material 518, or the scuff resistant material may be used in place of outer skin 516.

The internal liner member may be a removable tub, or vessel, or may be secured to the soft-sided outer wall assembly. In either case, the liner may fit quite closely, or snuggly, inside the soft-sided insulating walls, and may occupy substantially all of the internal volume within the soft-sided walls. In the embodiment of FIG. 10k, the outer, or female interference fit engagement assembly includes a molded re-entrant lip that may include cusp 106, an end wall 518, and an outer, return leg 520, such that the land region, end wall 518 and return leg 520 may tend to co-operate to function as a channel section tending to stiffen the peripheral lip more generally. At the inward end of outward return leg 520 there may be a laterally extending leg, such as may be identified as flange 522, to which the soft sided wall structure may be secured by an attachment. The attachment may be a bonding agent, or, the distal portion 524 of flange 522 may be thinned to provide a land through which stitching 526 may be passed to secure the liner to the wall structure, or stitching and bonding may both be employed to discourage removal of the substantially rigid liner from the soft-sided wall structure.

The wall structure of the lid portion (when the unit is lying on its back) or front panel 462, may also include a soft insulated panel such as panel 528, which may be of substantially the same construction as described above, and as shown in FIG. 10j. Alternatively, front panel 462 may omit the relatively thick insulated layer, and may employ a more skin-like covering, such as may by a grade of NYLON, whether sheet or woven, and indicated as 464 in FIG. 10k. The embodiment of FIG. 10j may employ a formed externally facing interference fit reinforcement, in the nature of a lip member 530 that may extend peripherally about a main planar lid panel portion 532. Lip member 530 may have an out-of-plane inner leg 534, distal end portion 536, return leg 538, and outer peripheral flange 540, and thinned outer finger 542 through which a stitched connection to the front panel covering assembly, be it a cellular foam insulated panel (FIG. 10j), or a thinner covering (FIG. 10k), can be made. In FIG. 10j, leg 534, end portion 536 and leg 538 co-operate with the adjacent planar portions 532 and 540 to function as a reinforcing channel for the adjacent planar regions, thus tending to yield a stiffened member for engagement with the surrounding land of the liner. In the alternate embodiment of FIG. 10k, lip member 530 may be replaced by a cast panel having a peripheral lip having a solid, as opposed to hollow or channel like, leg 544, having a bulbous, or fattened distal end portion 546 such as may deflect in the direction of Arrow 'B' when the male and female parts are forced together by motion in the direction of arrow 'A', in the manner of a cantilevered spring flexing to give an interference fit. In these embodiments there is, commonly, an engagement interface that is free from tracked fasteners, or, as it might be alternatively termed, the friction interface is 'zipperless'.

In the embodiment of FIG. 10a, it may be noted that, when being carried in the usual manner by the handle, or when being carried by a strap attached at the lifting attachment fittings, namely ring fittings 477, 479 on the opposite, short side portions of the surrounding peripheral sidewall, whether full or empty, the center of gravity of container assembly 460 will lie below the handle 476, such that the mating peripheral seal, or peripheral friction fit interface between the mating male and female parts may tend not to be carried in a generally, or predominantly horizontal fashion, as in the customary mode of the embodiment of FIG. 1a, for example, but rather in a generally, or predominantly vertical, or up and down, orientation, in which the hinge is along the bottom, or downwardmost portion of the surrounding peripheral sidewall. In this orientation, both the downwardmost and upwardmost portions of the peripheral interference contact may tend to be generally linear, and predominantly horizontal, whereas the short side portions of the peripheral interface may tend to run in an up-and-down ascending or descending orientation, which may be substantially vertical, between the two long side portions.

Liner 496 may have a base, or bottom, wall 550 and upstanding peripheral wall 552 having short and long sidewall portions 553, 554, 555, 556 corresponding to the surrounding short and long sidewall portions of the soft-sided wall. The distal termination (i.e., the rim or lip) of wall 552 has been described above. Liner 496 may include indexing features 558, such as may be in the nature of wall mounted grooves or slots 560, which may be molded in liner 496. Slots 560 may be placed intermittently along liner 596 to permit a partition 562 to be installed, thereby dividing internal space 564 into halves, or a 2:1 or 3:1 split, as may be.

Figure 10B:
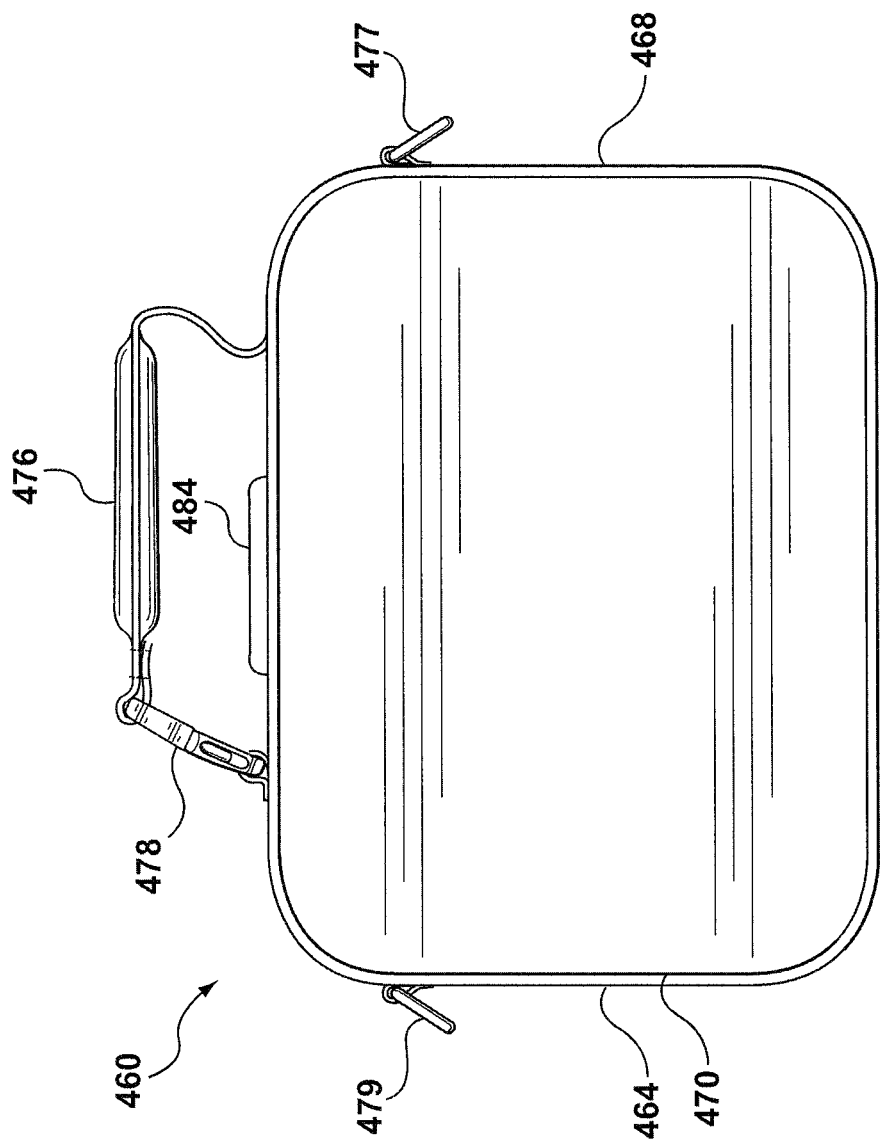
Figure 10C:
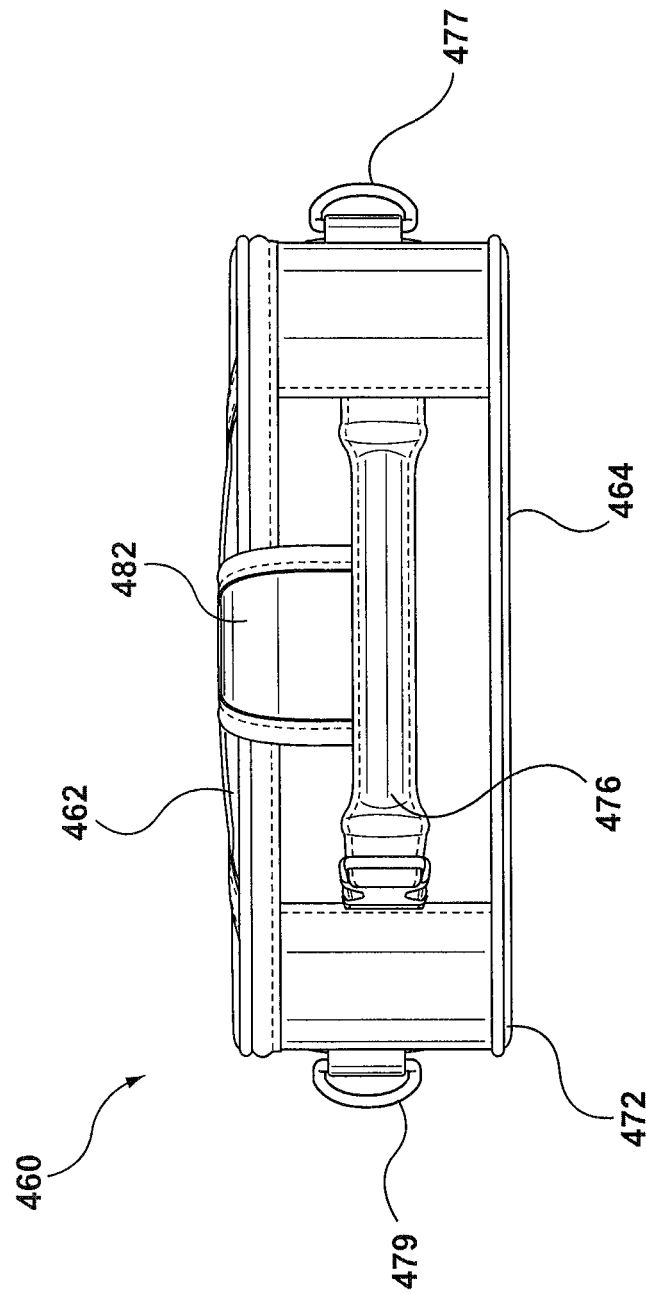
Figure 10D:
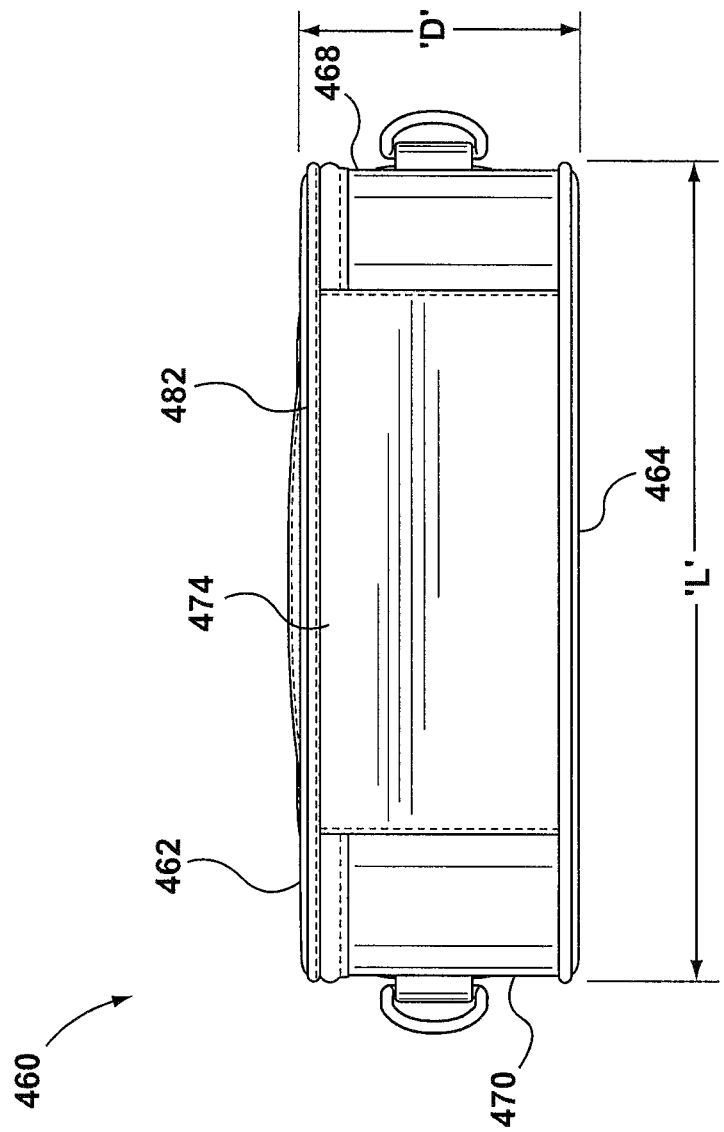
Figure 10E:
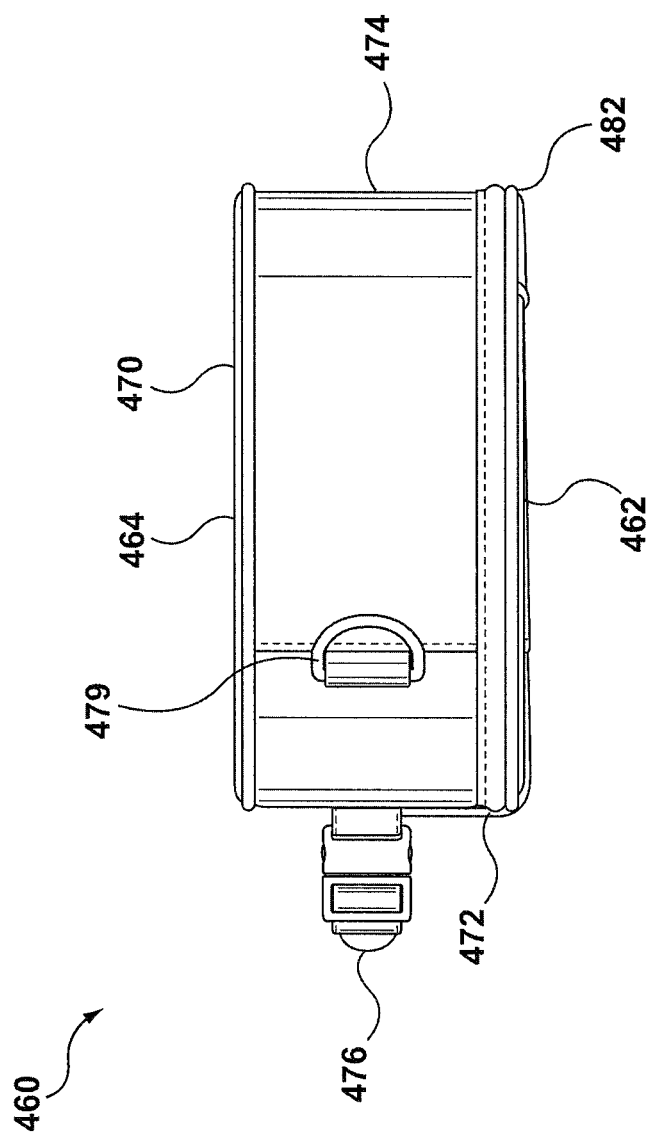
Figure 10F:
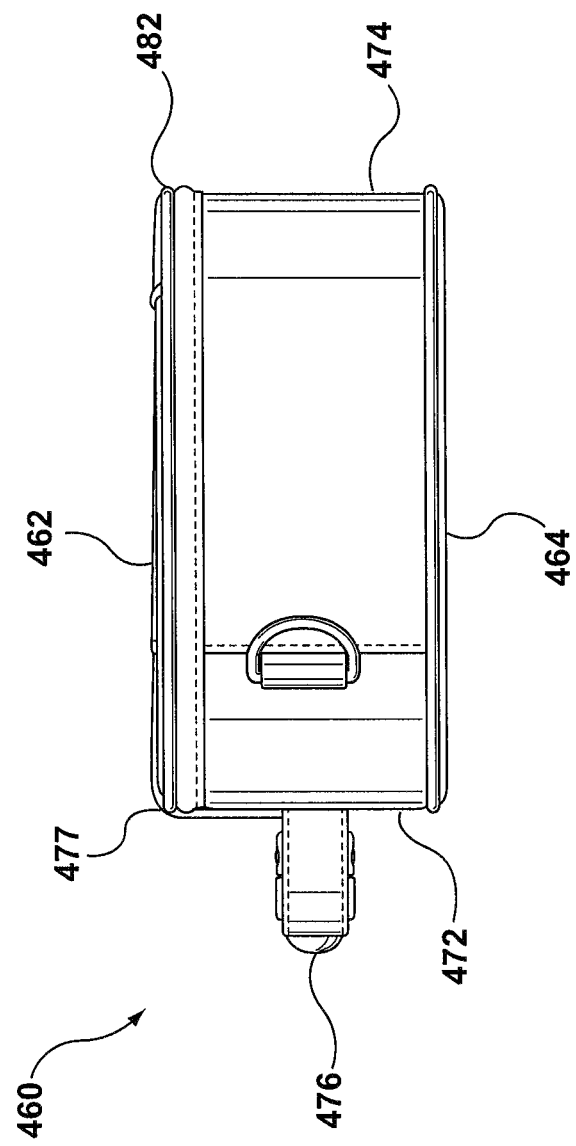
Figure 10G:
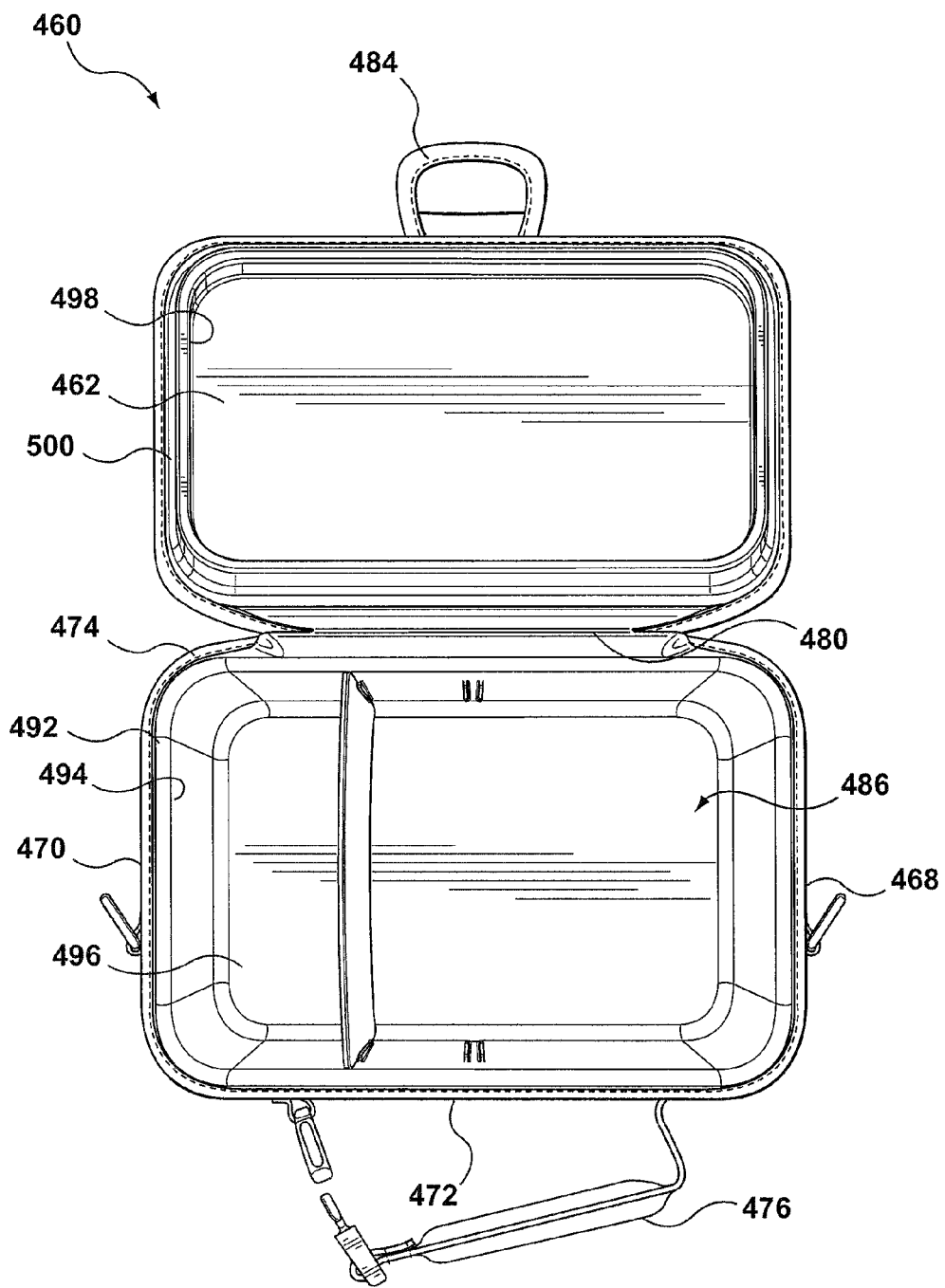
FIG. 10g is a view of the container assembly of FIG. 10a in an open position.
Figure 10H:
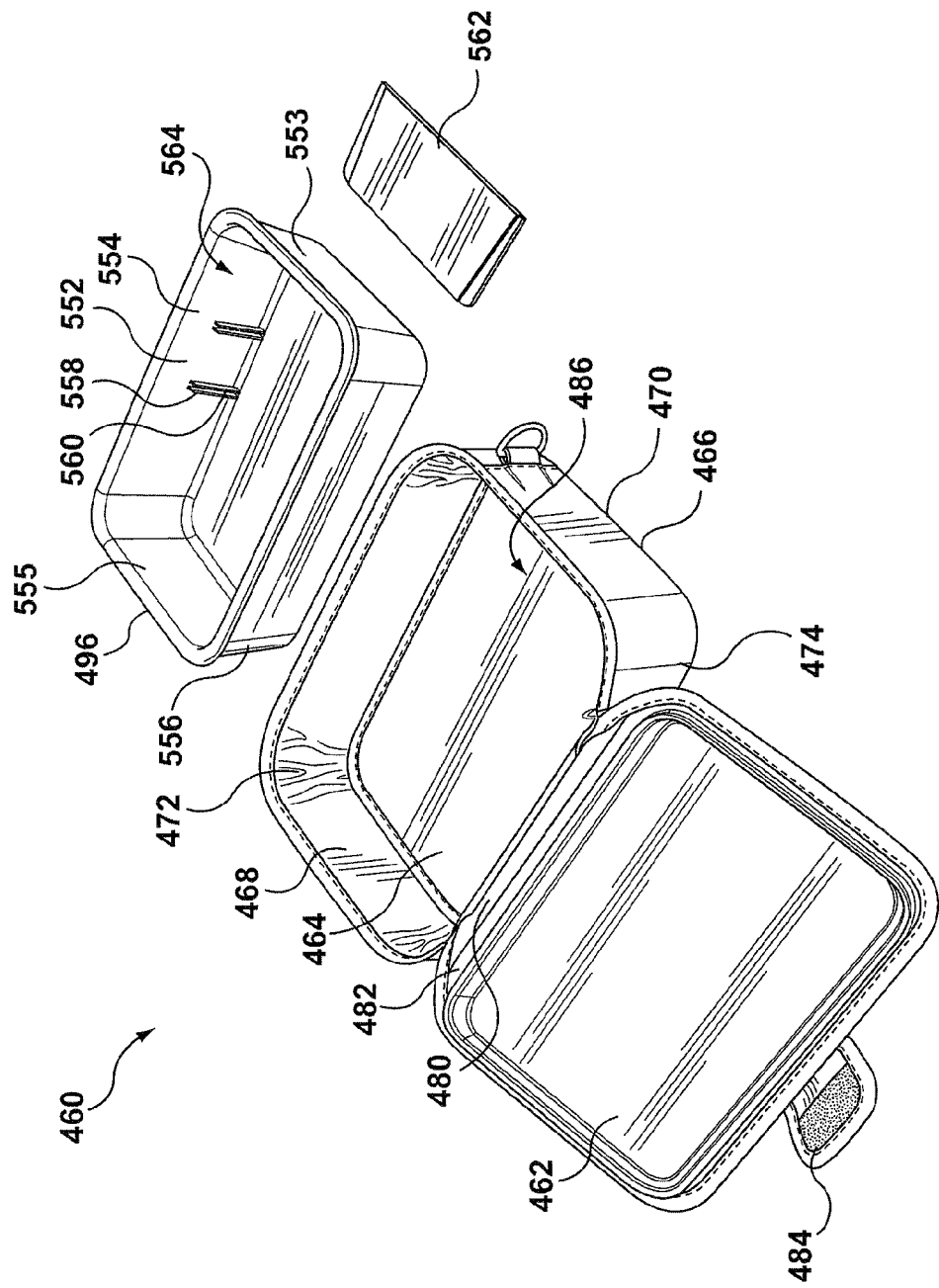
FIG. 10h is a perspective view of the assembly of FIG. 10a with the internal liner removed.

Container assembly 460 may have a length 'L', a width 'W' (as seen in FIG. 10*a*) and a depth 'D' (as seen in FIG. 10*d*). Length 'L' may be taken as exceeding width 'W', and both may be greater then depth 'D'. In some embodiments these dimensions may lie in the range of L:W of 3:2 (+/−25%), and L:D of 3:1 (+/−25%), and in one embodiment L:W:D of about 3:2:1 (all +/−25%), such that the inner liner may be a relatively shallow tray. In another embodiment, this ratio of L:W:D may be roughly 5:3:2 (all +/−25%), for the region enclosing the liner.

FIG. 10*i*

Figure 10I:
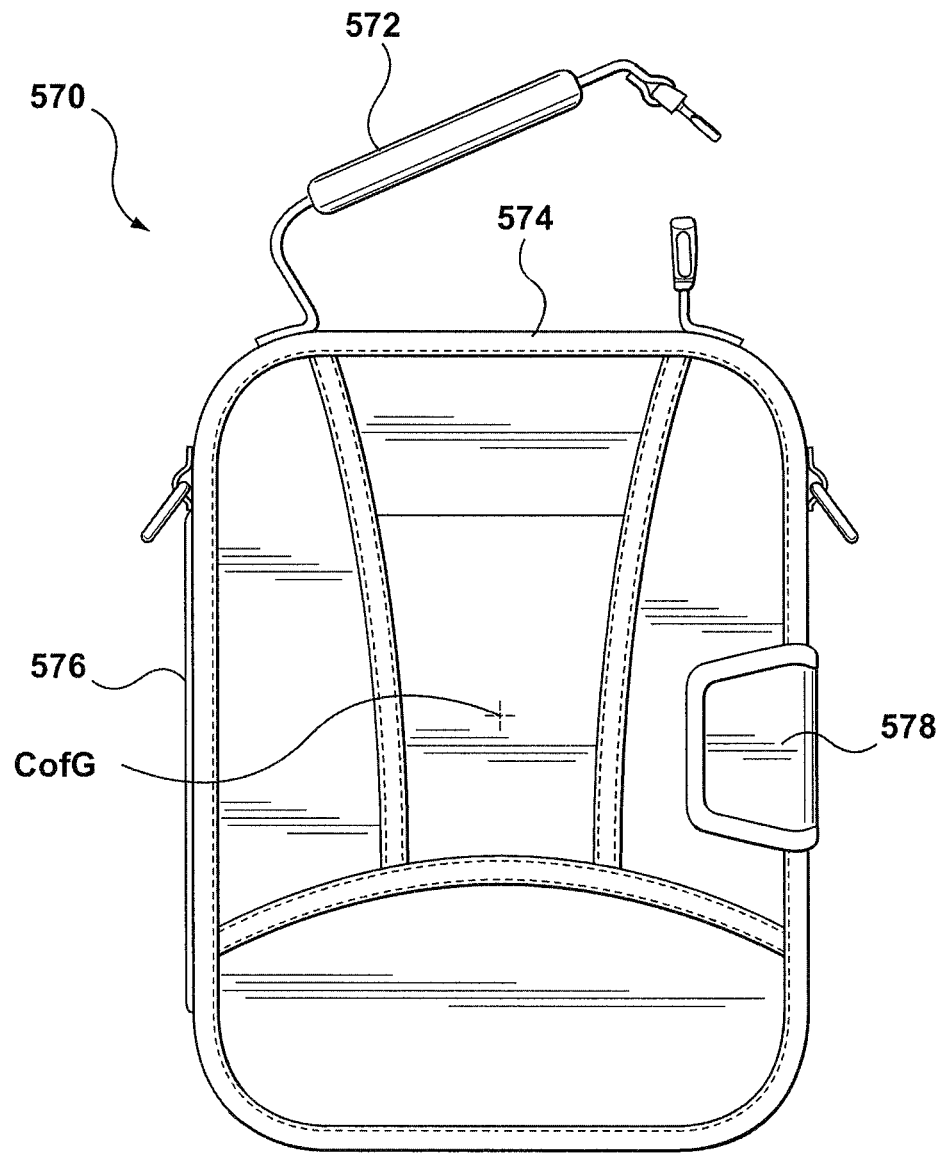

In the embodiment of FIG. 10*i*, there is a container assembly 570 that is of substantially the same construction as that of FIG. 10*a*, and may include the alternate features and proportionate ratios described above. In this case however, handle 572 is not mounted to one of the long side portions, as is handle 476, but rather placed along one of the short side portions 574, such that, in the customary orientation for carrying, hinge 576 may lie along one of the ascending (or descending), predominantly vertical sides of the friction fit interface, as may the pull tab member 578, and the portions of the friction fit interface lying along the short side portions may tend to be predominantly horizontal.

FIGS. 11*a*-11*k* and 12*a*-12*h*

Figure 11A:
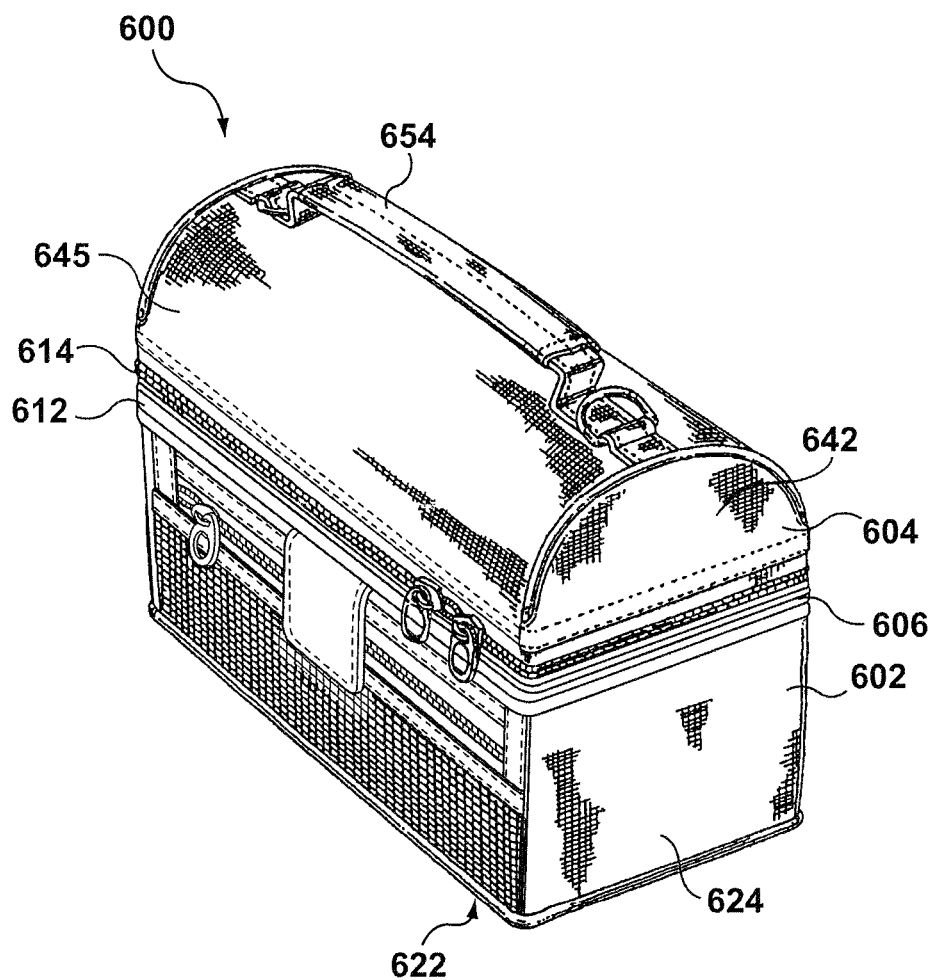
Figure 11B:
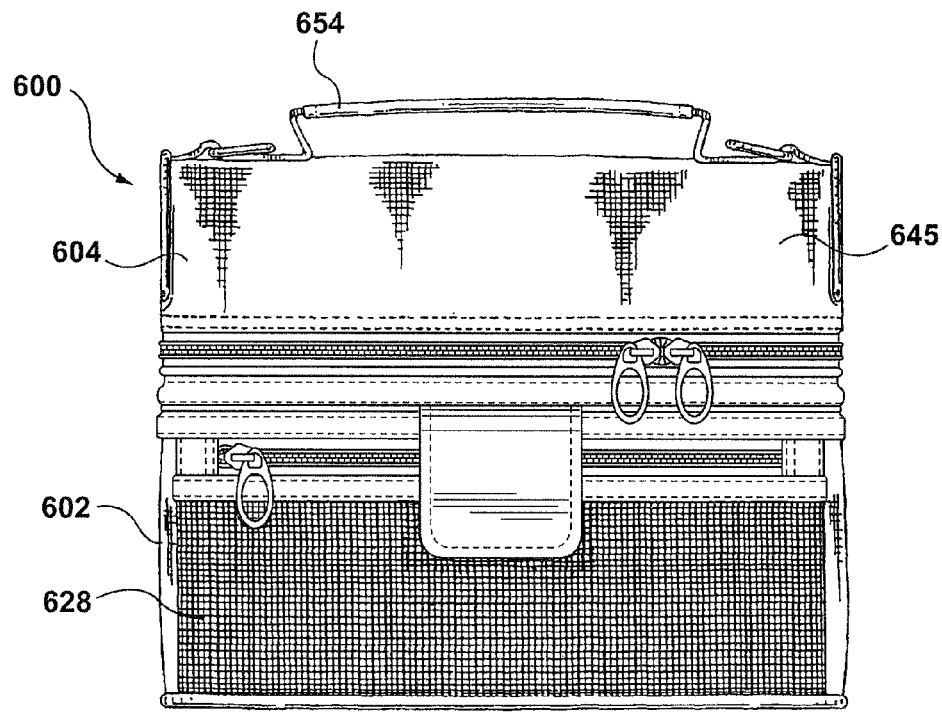
Figure 11C:
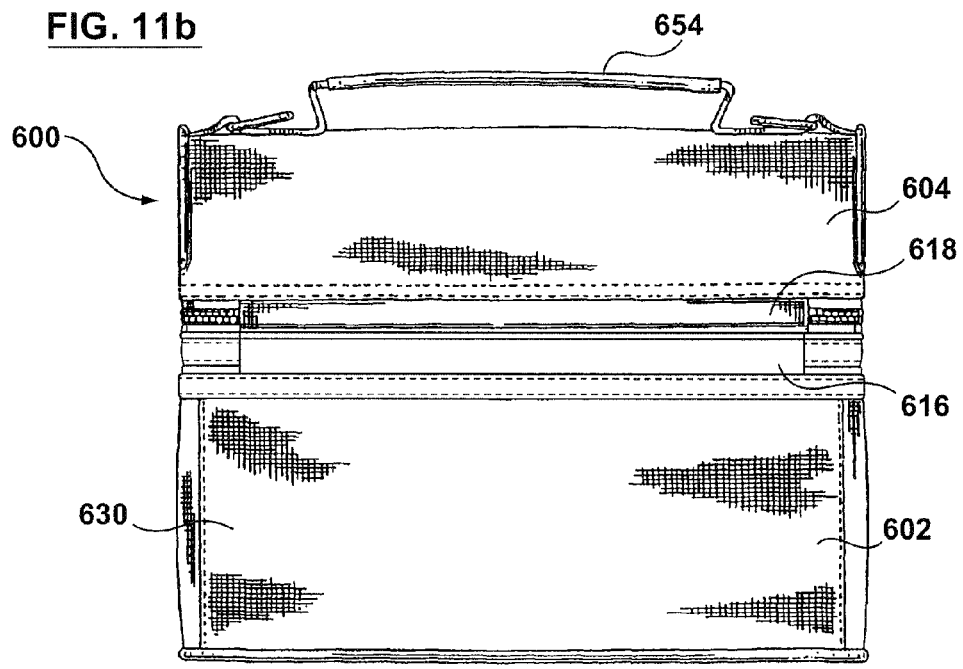
Figure 11E:
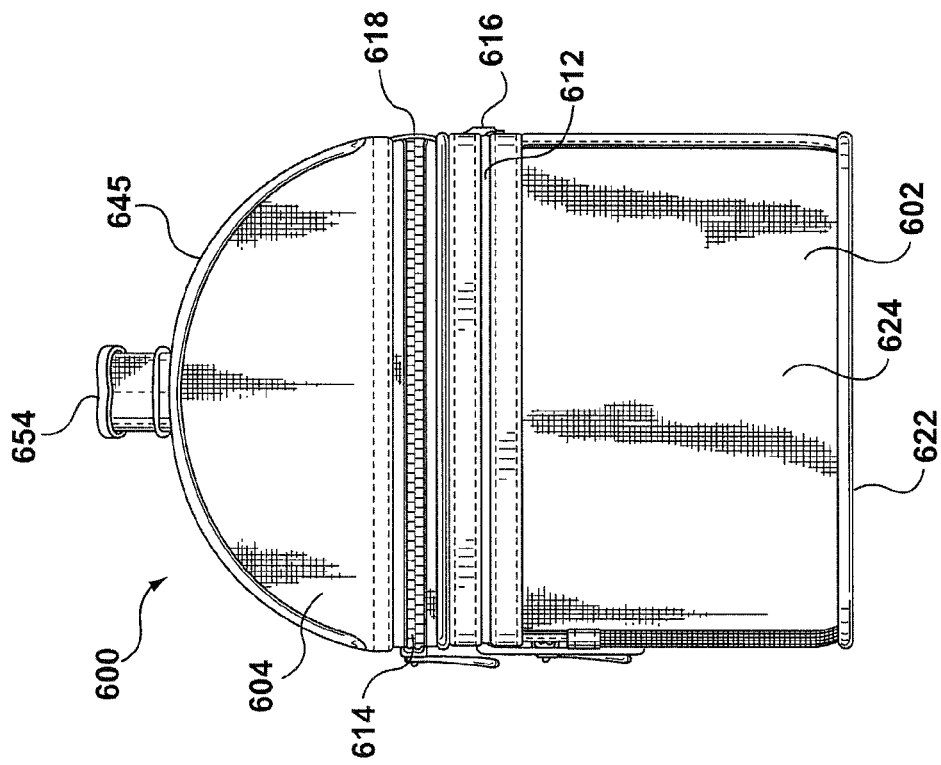
Figure 11D:
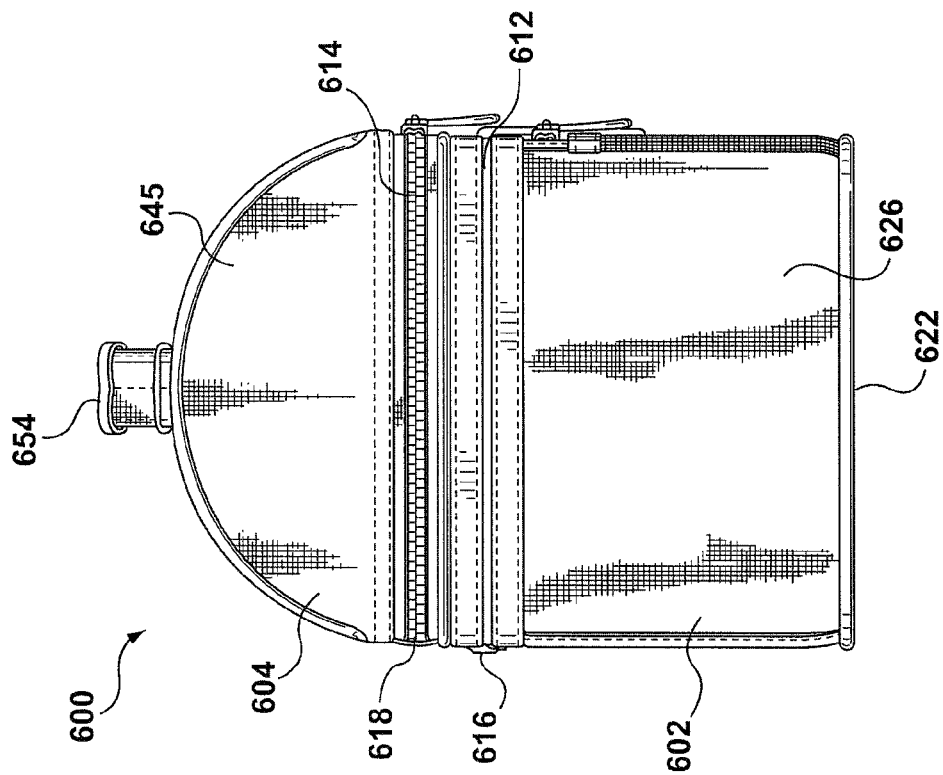
Figure 11F:
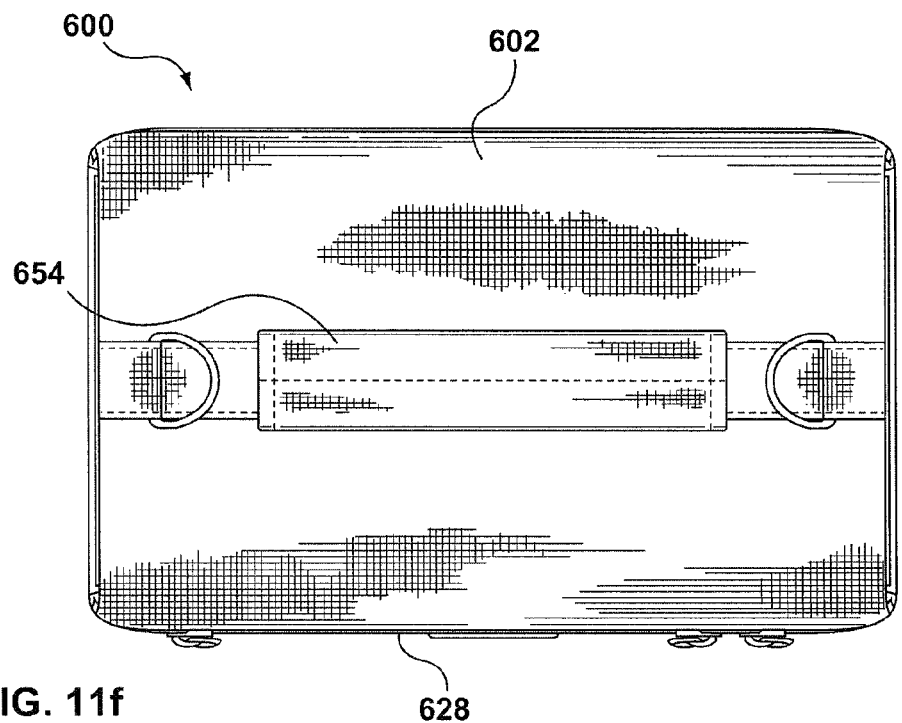
Figure 11G:
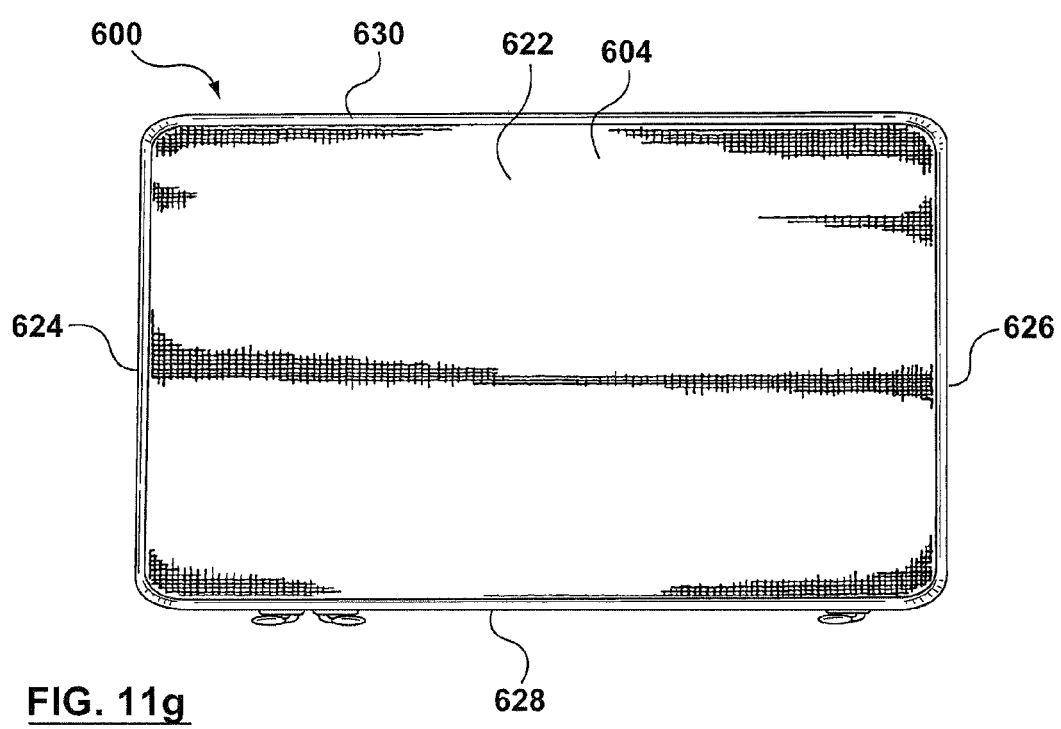
Figure 12A:
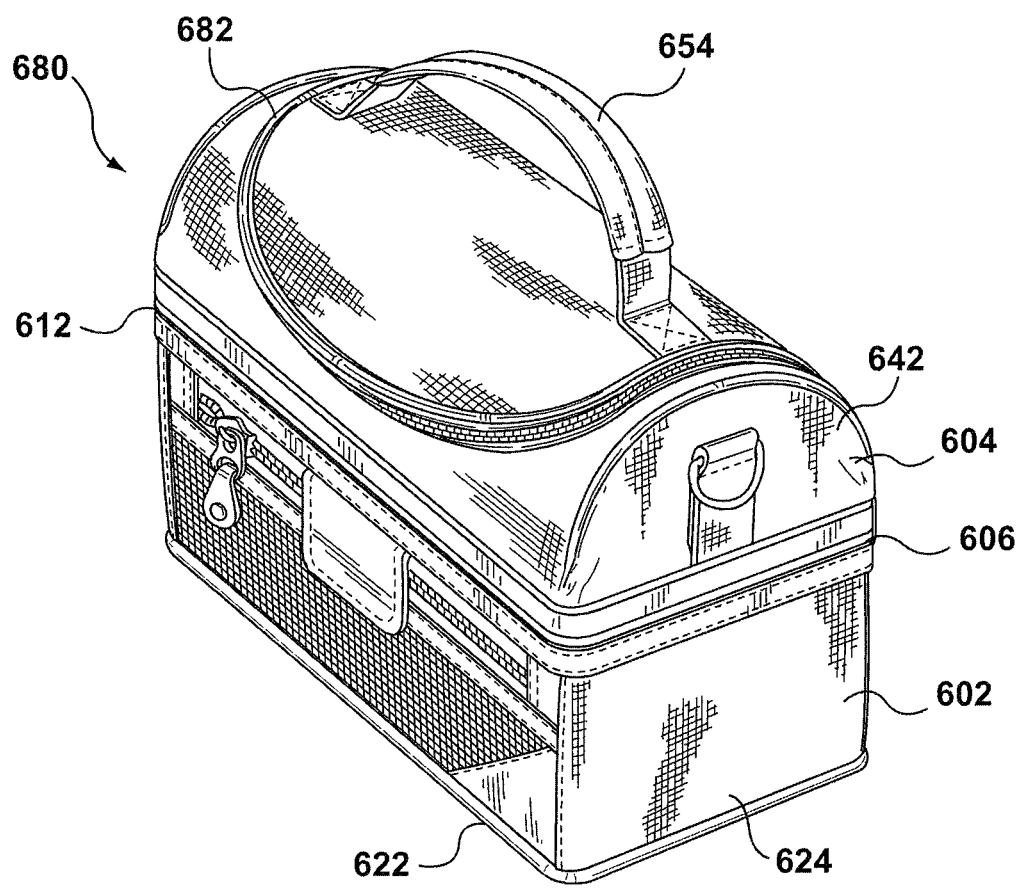
Figure 12B:
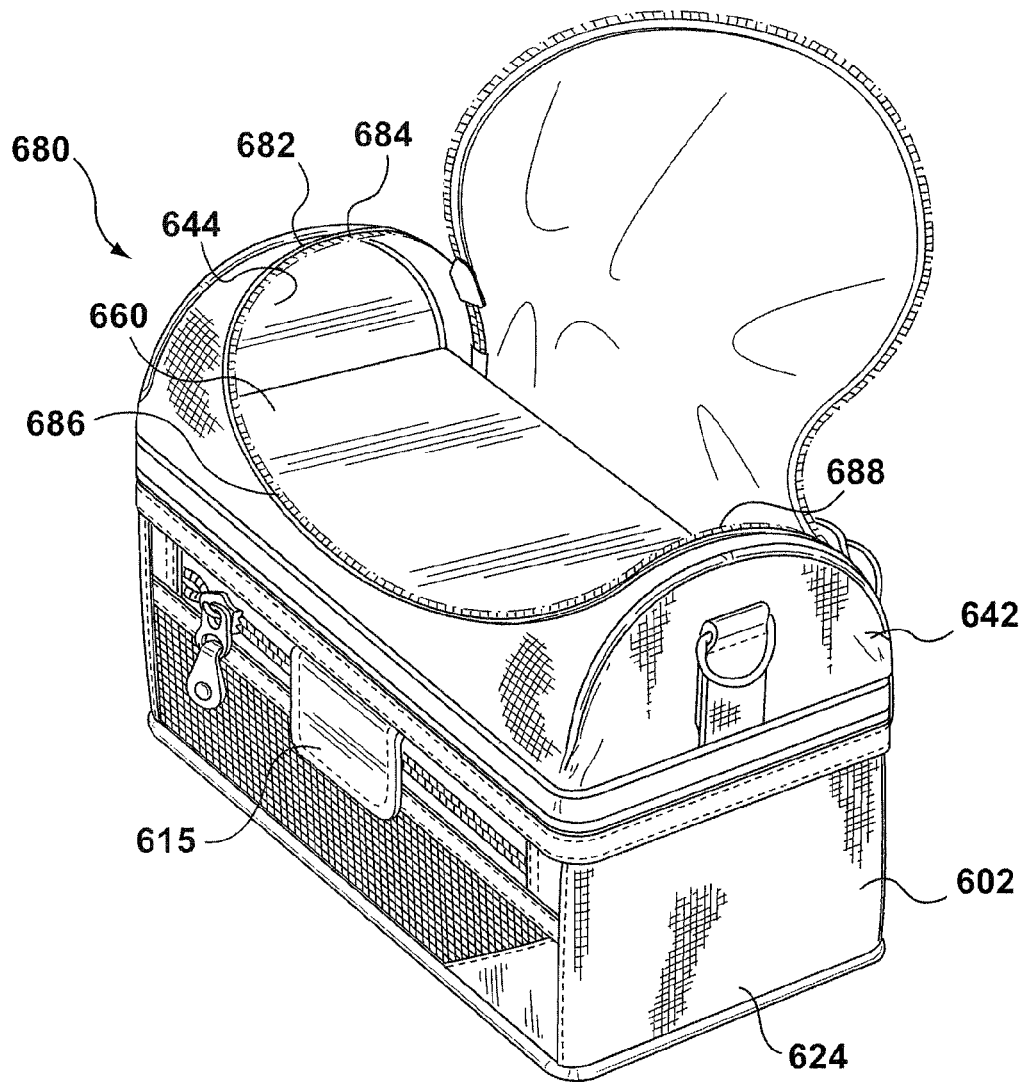
FIG. 12b shows the container assembly of FIG. 12a in a partially open position analogous to that of FIG. 11i.
Figure 12C:
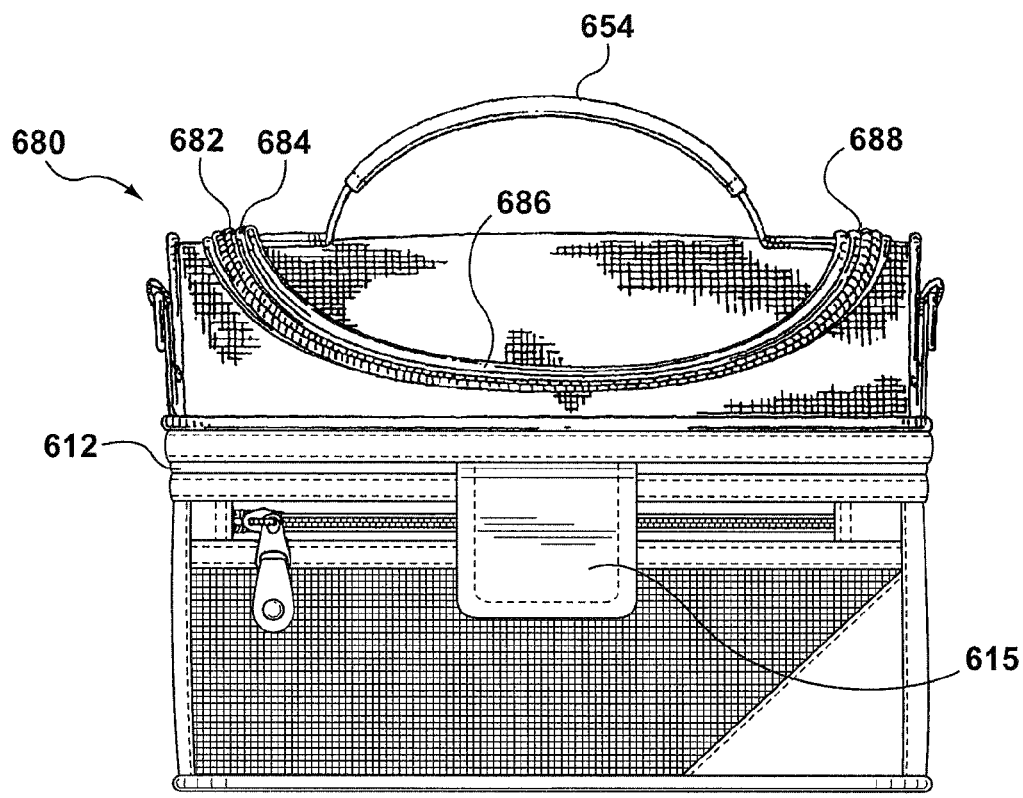
Figure 12D:
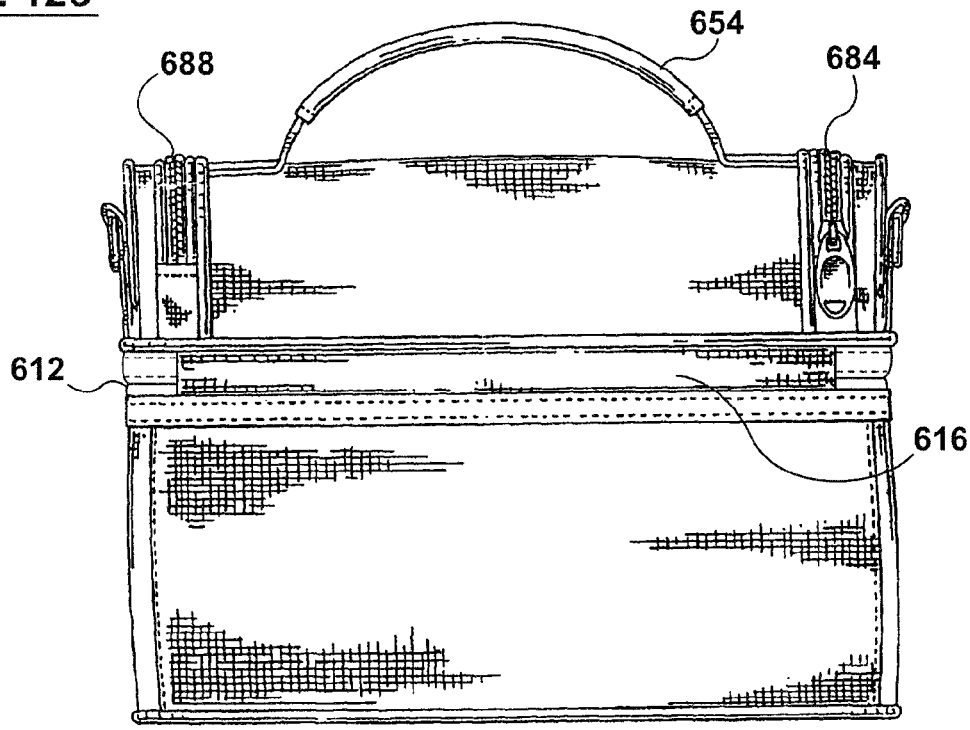
Figure 12E:
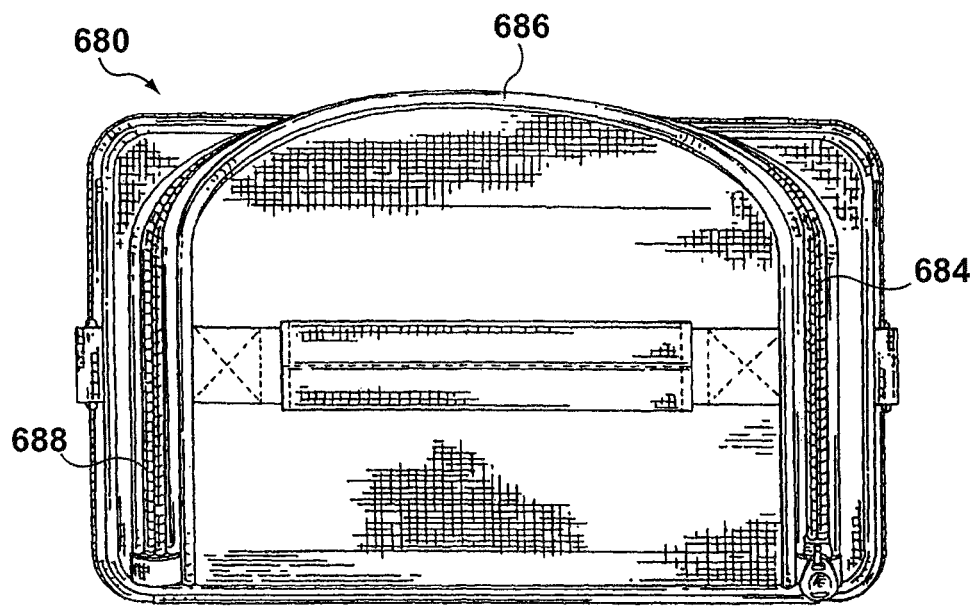
Figure 12F:
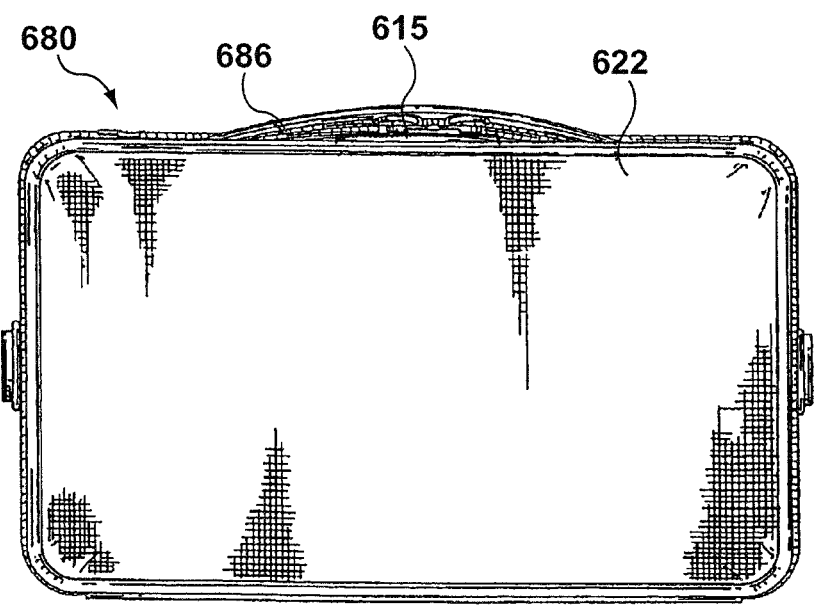
Figure 12G:
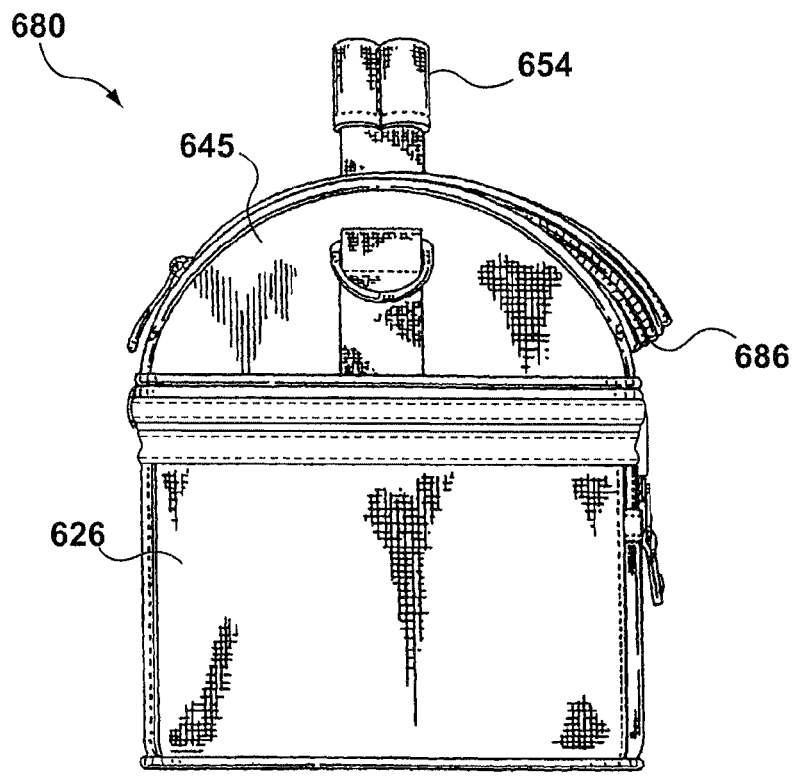
Figure 12H:
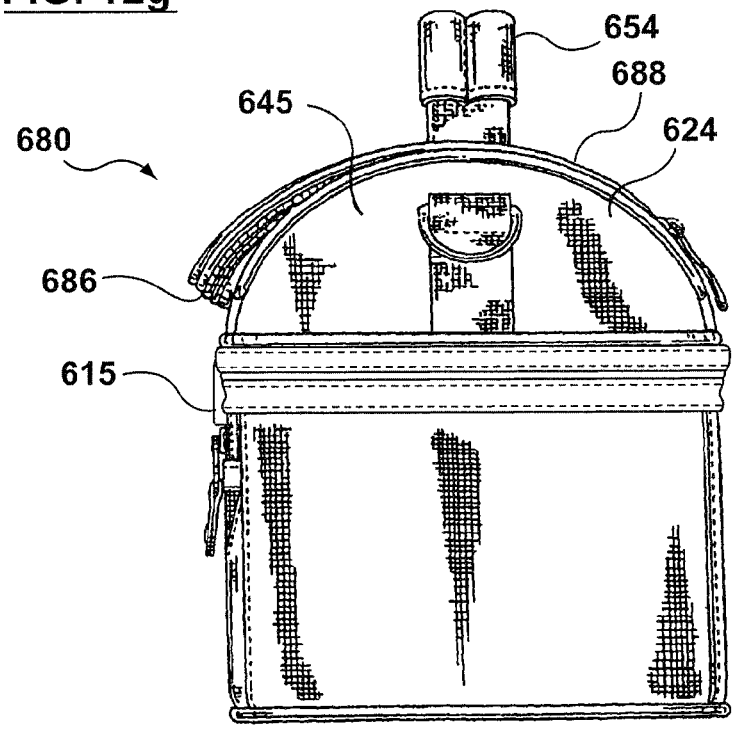
FIG. 12h is a bottom view of the assembly of FIG. 12.

The embodiments of FIGS. 11*a* and 12*a* show soft-sided insulated containers having a lower region, an upper region, and a dividing partition or wall. The lower region may contain a substantially rigid liner, or rim reinforcing member, such as may provide an interference, or friction, fit land, analogous to those described above. The underside of the dividing partition or wall may include the mating reinforced fitting, again, analogous to those described above. The embodiments of FIGS. 11*a* and 12*a* differ from those described in that they may have an additional enclosed space, in the upper region, that may have a soft-sided enclosing wall structure, that may be separately accessible from the region of the reinforced wall structure, and that may be non-reinforced, for containing objects that may not benefit from, or required a protective reinforced wall. An example of such an object might be a can of juice or a canned soft-drink, which may benefit from a thermally insulated enclosure, but which may not necessarily required a reinforced wall.

FIGS. 11*a* to 11*i* show a soft-sided insulated container assembly, indicated generally as 600. It has a first, or lower portion, indicated generally as 602, a second, or upper portion, indicated generally as 604, and an insulated partition 606 segregating the interior of lower portion 602 from the interior of upper portion 604. Container assembly 600 has two separate enclosures, or chambers, 608 and 610, defined within respective portions 602 and 604, each of which can be used to encourage the contents thereof to be maintained at a different temperature. For example, one chamber, be it 608 or 610, may be used to keep one type of food or other object warm, while the other is used to keep another food or object cool. Container assembly 600 may place chambers 608 and 610 one above the other, as in the manner of a lunch bucket. Lower portion 602 and upper portion 604 each have an independent closure member, the lower being in the nature of an interference friction fit between mating male and female engagement members, analogous to those described above, at peripheral interface indicated generally as 612, and an upper closure member which may be in the form of a tracked fastener, or zipper 614. In the case of container assembly 600, portions 602 and 604 share a common wall, or enclosing member, namely partition 606. When interface 612 is moved to a disengaged condition, (or zipper 614, as may be, is moved to an open position), the remainder of container assembly 600 is displaceable relative to lower portion 602. That is, the remainder of container assembly 600 is able to move pivotally about a flexible fabric hinge 616 away from lower portion 602 (or, in the case of upper portion 604, the remainder pivots away from portion 604 about a flexible fabric hinge 618), generally in the manner of a pivotable lunch bucket lid. In the case of use of container assembly 600 as a lunch container, such as a student may take to school, or such as may be used for a similar purpose, food may be placed in lower chamber, 608, in the same orientation as it will be carried when container assembly 600 is lifted either by its handle or by its carrying strap.

Describing this structure in detail, lower portion 602 is a soft-sided insulated wall structure that has a rectangular bottom wall, 622, a left hand side wall 624, a right hand side wall 626, a front wall 628 and a rear wall 630. Walls 624, 626, 628 and 630 are joined in a rectilinear shape about bottom wall 622. The lower margins of walls 624, 626, 628 and 630 mate with the margins of bottom wall 622 to form an upwardly opening, open top box, those walls defining therewithin lower chamber 608. Bottom wall 622 has a reinforced wear resistant outer surface, and rounded corners so that container assembly 600 has corners that are not sharp, but slightly rounded. This may facilitate packing of assembly 600 into larger containers, such as a knapsack.

Figure 11H:
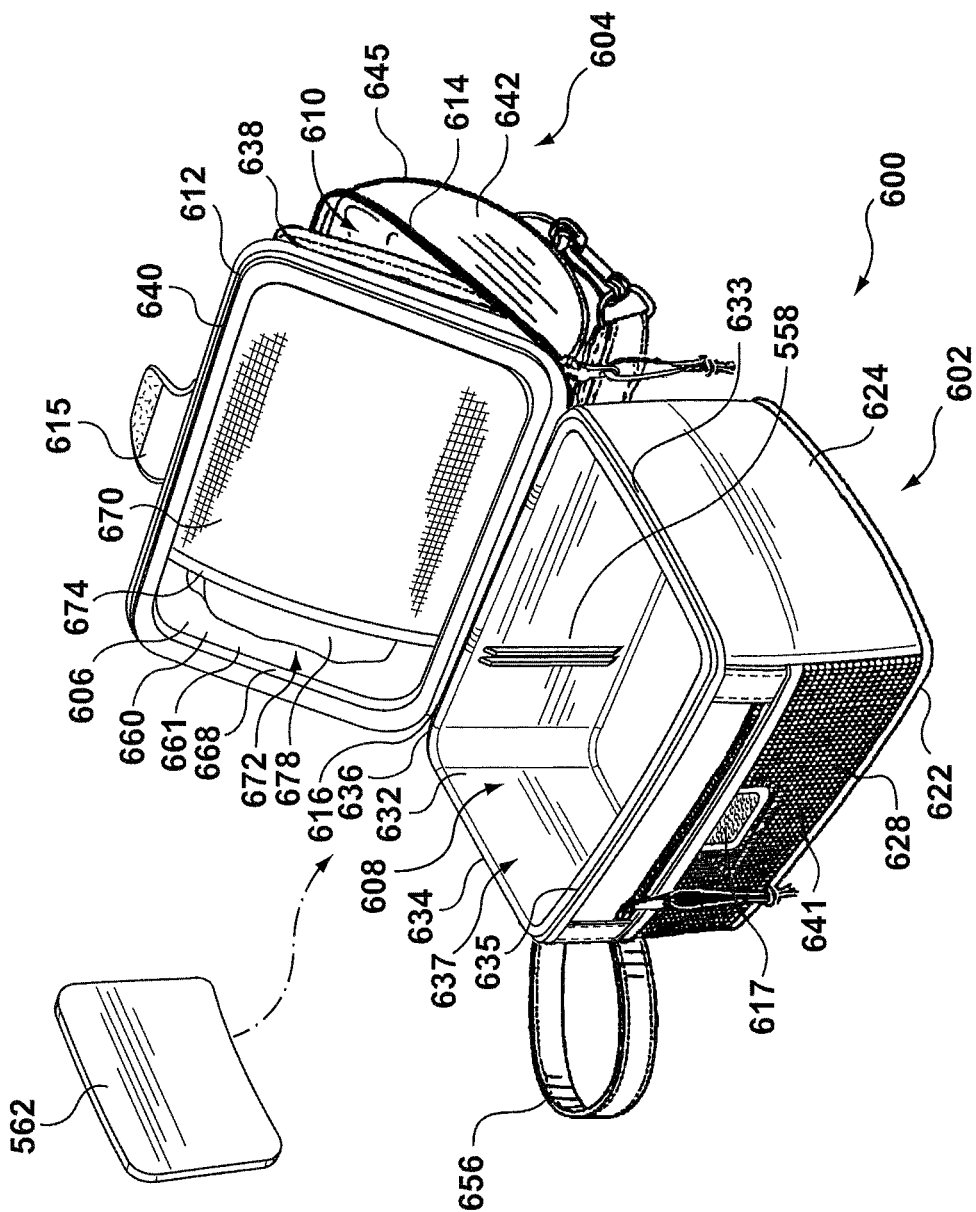
FIG. 11h is an isometric view of the assembly of FIG. 11a in an open position.
Figure 11I:
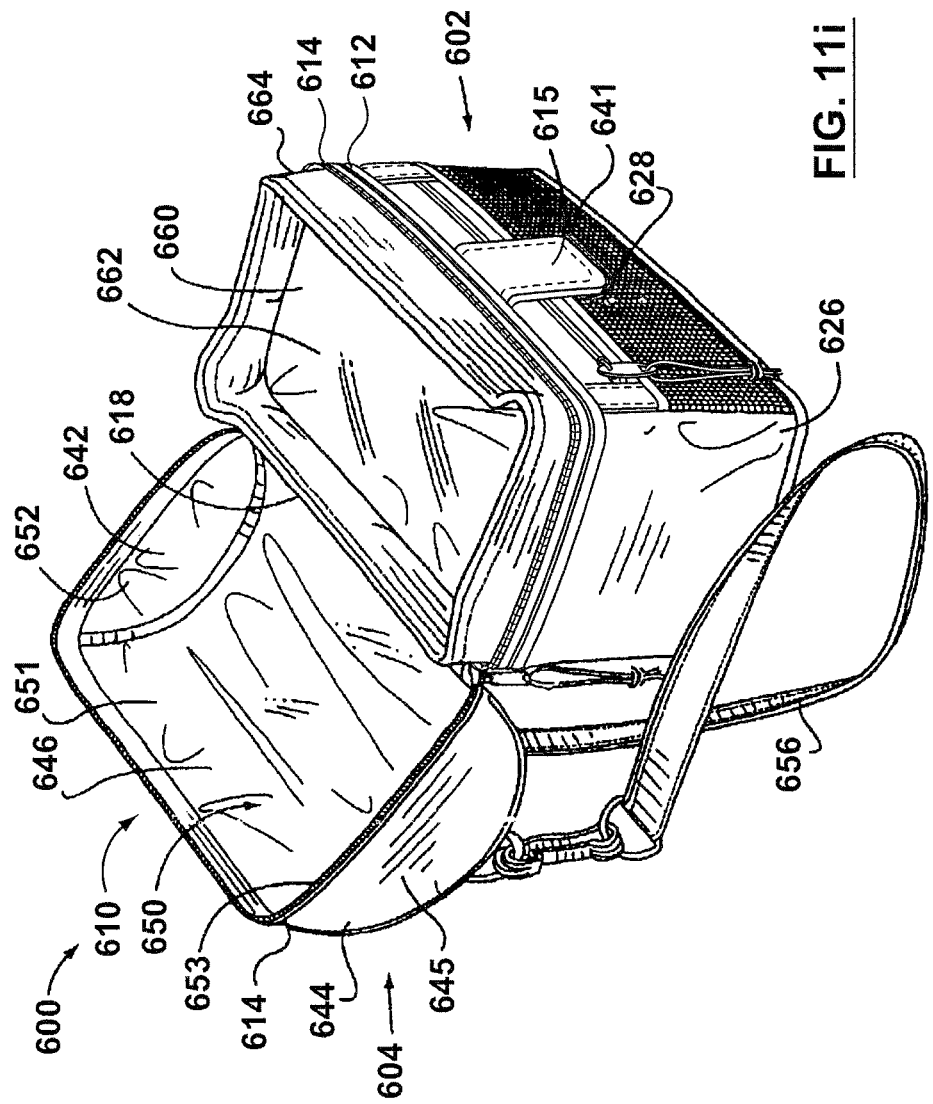
FIG. 11i is an isometric view of the assembly of FIG. 11a in a partially open position.

As shown in FIG. 11*h*, chamber 608 may have a substantially rigid walled liner 632 that may be freely removable, in the manner of other liners described above, or may be secured in place, as described above. Liner 632 may be secured about the open edges 633, 634, 635, and 636 of walls 624, 626, 628, and 630. The upper peripheral margin of lower portion 602, being made up of the upper margins of each of the sides, namely edges 633, 634, 635 and 636, defines the lip, or rim, of an opening 637 of chamber 608. At the upper margin of rear wall 630, namely edge 636, rear wall 630 is joined by hinge 616 to a rearward margin, or edge, of partition 606. Release of the tongue 615 (which may, in the closed condition, mate with a corresponding hook-and-eye fabric strip patch 617 on the front face of the assembly) allows the interference fit interface to be disengaged, thus permitting the interface to be opened and closed to yield access to chamber 608.

The insulated construction of lower portion 602 may be the same as that described above. Lower portion 602 may have an open mesh pocket 641 mounted to front wall 628 for carrying loose items, pocket 641 being opened and closed by a closure member in the nature of a zipper 643.

Upper portion 604 is an upper, or second, soft-sided insulated wall structure. It has a pair of flexible, insulated end walls 642 and 644 that have a shape similar to a 'D' placed on its side, or a rounded, inverted 'U', such as to give upper portion 604 a profile when seen from an end view as in FIG. 11*d* or 11*e* (or, in the case of the embodiment of FIG. 12*a*, FIGS. 12*g* and 12*h*) that defines a container lid contour similar to the end view of a rounded top of a lunch bucket. While a generally semi-circular profile is shown, alternative embodiments need not be precisely semi-circular, but may include an arc describing less than 180 degrees, may include straight portions adjoining radiused portions, or may include a parabolic or elliptic curve, or an arbitrarily chosen curve giving a generally arch-like, domed profile.

A flexible, insulated top panel 646 extends between end panels 642 and 644 and is joined to them at sewn end seams such that panel 646 has a curved form to follow the end profile described in a rounded, generally semi-cylindrical, or partially cylindrical manner, the lower margins of each of end walls 642 and 644 forming a chord of the curved shape. When formed on an arc in this way, top panel 646 may tend, in co-operation with end panels 642 and 644, to form a stiffer section than if panel 646 were replaced by a planar top panel. The cover, or lid structure, indicated generally as 645, that is formed by the co-operation of panel 646 and end walls 642, 644 defines within it upper chamber 610. Lid structure 645 may have the general appearance of the top of a lunch bucket, although it may be soft-sided and relatively flexible, rather than rigid in the manner of a metal structure. The lower margin of lid structure 645, namely the lower front and rear edges of longitudinal panel 646 and the lower edges of the left and right hand end panels, 642 and 644, is of a size and shape that corresponds to the upper margin of lower portion 602 such that the one soft-sided insulated wall structure can sit upon the other in an aligned manner, the respective lengths and widths corresponding one to another.

Panel 646 is joined along its rearward lower margin, or edge, to partition 606 by flexible hinge 618. One set of teeth of zipper 614 is mounted along the lower margins of end walls 642, 644 and the front lower margin of panel 646, with the corresponding set of mating teeth being mounted to adjacent edges of partition 606 such that zipper 614 has a three-sided U-shape, and is moveable between open and closed positions to govern access to chamber 610 defined within panel 646 and end walls 642 and 644. Chamber 610 has a generally rectangular opening 650 defined by the lower margins, or edges of panel 646 and end walls 642 and 644 as described above. Objects can be introduced into chamber 610 through opening 650 when zipper 618 is in its open position. The construction of panel 646 and end walls 642 and 644 is generally as described above, incorporating an external skin of a flexible, wear resistant material such as a woven nylon; a medial, closed cell insulation layer; and may include a reflective inner skin such that inside surfaces 651, 652 and 653 of panel 646 and end walls 642 and 644 respectively, have a shiny finish.

A suspension member, in the nature of a carrying handle 654, may be mounted centrally on panel 646, with its bail and reinforcement webbing oriented to run longitudinally, that is, parallel to the crest of panel 646. Another suspension member, in the nature of a carrying strap 656, may be connected by releasable clasps to mounting rings lying adjacent to the apices of either end wall, 642 or 646 (such a carrying strap and releasable clasps may be used with the embodiment of FIG. 10*a*, as well). In alternative embodiments, a suspension member, whether in the nature of handle 654 or in the nature of carrying strap 656 or another suspension means, need not be mounted precisely at the crest of panel 646, or at the respective apices of end panels 642 and 644, but may be mounted in such a manner that the center of lift of the suspension member is at a level, measured relative to the base side, lying above the level of the center of gravity of the container when packed. It is preferable that the center of lift lie directly above the center of gravity such that an axis intersecting both the center of lift and the center of gravity is perpendicular to the base side.

Partition 606 may be a flexible insulated structure, including a panel 660 having a closed cell foam insulation layer such as shown in FIG. 11*j*, such as may lie between an upper skin 661, which may be reflective, and an optional lower skin 662. A panel reinforcement member 663 may be substantially the same (other than in length and width, which may be different) as lip member 530 and panel member 532.

A ventilated panel, in the nature of a mesh web 670 is attached to the underside of panel 660 by having its edges sewn into the same seam as three sides of lip 668, such that a receptacle in the nature of a pocket 672 is defined between web 670 and lower surface 661 of panel 660. Pocket 672 has a lip 674, and immediately inside lip 674 there is a pocket closure, or fastener, in the nature of a fabric hook and eye strip closure 676. Pocket 672 is of a size to enclose a thermal energy storage element 678, such as an ice pack or heating pack, such that the temperature in chamber 608, and of objects therein, can be influenced to have a warmed or cooled condition relative to external ambient. In an alternative embodiment, lid structure 645 can also be provided with a similar pocket and thermal energy storage element.

The embodiment of container assembly 680 FIG. 12*a* differs from the embodiment 600 of FIG. 11*a* in having a different upper region closure member arrangement 682. That is, whereas the embodiment of FIG. 11*a* may have an upper region that is hinged along its rearward edge, and may have a tracked fastener running about the other three edges to govern access to the upper region, the embodiment of FIG. 12*a* may employ a tracked fastener arrangement that may run over the crest of the arcuate top wall of the upper region 684, then predominantly longitudinally along the lower front margin 686, and the back over the crest 688 toward the hinged margin of the internal partition. This may yield a continuous arcuate profile that may bear some resemblance to a large smile, and is shown in closed form in FIG. 12*a* and open form in FIG. 12*b*. In this large smile arrangement the lower peripheral margin of the upper wall structure may remain fixedly attached to the upper edge of the periphery of the internal partition between the upper and lower enclosed regions, rather than being releasable from the partition itself.

FIGS. 11*j* and 11*k* show alternate arrangements of reinforcement members for obtaining an interference fit at the peripheral interface between the lower land member and the upper engaging member. These interfaces are as described in the context of FIGS. 10*j* and 10*k*, but differ in the existence of an upwardly extending insulated wall portion, illustrated in scab section, of the upper enclosure or chamber. FIG. 10*j* might be typical of an end wall connection of container assembly 680, container assembly 600 (and 680) having a hinge along one edge, and container assembly 600 having a tracked fastener portion along the other three edges between the internal partition and the commencement of the upwardly extending insulated wall, symbolised by item number 690.

In one embodiment, the proportions of container assemblies 600 and 680, for the lower region may be of the order of about L:W:D of 5:3:2 (all +/−25%), with the ratio of lower depth to upper depth being in the range of about 1:1 to about 4:3 (+/−25% at either end of the range).

Although the various embodiments have been illustrated and described herein, the principles of the present invention are not limited to these specific examples which are given by way of illustration.

I claim:

1. An insulated, soft-sided container assembly comprising:
a body assembly and a lid assembly hingedly joined to said body assembly;
said body assembly including a soft-sided outer casing;

said soft-sided outer casing being insulated;
said body assembly having a chamber defined within said insulated soft-sided outer casing;
said lid including a formed structural member;
said lid assembly having a periphery for mating engagement with said body assembly;
said lid assembly being movable between a first position obstructing access to said chamber, and a second position permitting access to chamber;
said formed structural member including a substantially planar medial web portion;
said lid assembly having a table top portion defined thereon, whereby, when said soft-sided insulated container is placed in an upright position and said lid assembly is in said first position objects may be supported upon said table top portion.

2. The insulated, soft-sided container assembly of claim 1 wherein said formed structural member includes a peripheral flange extending about said substantially planar medial web portion.

3. The insulated soft-sided container assembly of claim 2 wherein said chamber has an opening, said opening having a shape, said peripheral flange defines a surround, and said surround has a shape corresponding to said opening of said chamber for engagement therewith.

4. The insulated soft-sided container assembly of claim 3 wherein said surround is rectangular in plan view.

5. The insulated soft-sided container assembly of claim 1 wherein said lid assembly has a first recess formed therein defining said table top portion.

6. The insulated soft-sided container assembly of claim 5 wherein said lid assembly also has a second recess formed therein.

7. The insulated soft-sided container assembly of claim 5 wherein table top portion has a peripheral retaining wall for discouraging objects from sliding off said table top portion.

8. The insulated soft-sided container assembly of claim 7 wherein said lid assembly has a recess for accommodating a beverage.

9. The insulated soft-sided container assembly of claim 7 wherein said table top portion is substantially rectangular and there are two beverage container recesses formed in said lid adjacent to said table top portion.

10. The insulated soft-sided container assembly of claim 7 wherein said formed structural member includes a peripheral flange extending about said substantially planar medial web portion.

11. The insulated soft-sided container assembly of claim 10 wherein said chamber has an opening, said opening having a shape, said peripheral flange defines a surround, and said surround has a shape corresponding to said opening of said chamber for engagement therewith.

12. The insulated soft-sided container assembly of claim 11 wherein said table top portion is substantially rectangular and there are two beverage container recesses formed in said lid assembly adjacent to said table top portion.

13. The insulated soft-sided container assembly of claim 11 wherein said peripheral flange mates with said body assembly in an interference fit.

14. The soft-sided insulated container assembly of claim 11 wherein said assembly includes a hard-shell receptacle mounted within said body assembly, said receptacle has a mouth, and said peripheral flange mates with said mouth in an interference fit.

* * * * *